United States Patent [19]
Jeffrey et al.

[11] Patent Number: 6,085,233
[45] Date of Patent: *Jul. 4, 2000

[54] SYSTEM AND METHOD FOR CELLULAR NETWORK COMPUTING AND COMMUNICATIONS

[75] Inventors: Francis Jeffrey, Malibu; Richard W. Benster, Woodside, both of Calif.

[73] Assignee: Pankosmion, Inc., Malibu, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/580,921

[22] Filed: Dec. 29, 1995

[51] Int. Cl.$^7$ .............................. G06F 13/38; G06F 15/17
[52] U.S. Cl. ......................... 709/216; 709/212; 709/237; 709/248; 709/300
[58] Field of Search ..................................... 395/800, 180, 395/683, 702, 705; 709/300, 303, 205, 212, 213, 237, 248, 216

[56] References Cited

U.S. PATENT DOCUMENTS

| | | | |
|---|---|---|---|
| 3,287,649 | 11/1966 | Rosenblatt | 328/55 |
| 4,149,240 | 4/1979 | Misunas et al. | 395/800 |
| 4,675,829 | 6/1987 | Clemenson | 364/513 |
| 4,864,497 | 9/1989 | Lowry et al. | 364/300 |
| 4,930,071 | 5/1990 | Tou et al. | 364/300 |
| 5,119,470 | 6/1992 | Highland et al. | 395/64 |
| 5,159,685 | 10/1992 | Kung | 395/575 |
| 5,193,180 | 3/1993 | Hastings | 395/575 |
| 5,404,550 | 4/1995 | Horst | 395/800 |
| 5,574,933 | 11/1996 | Horst | 395/800 |
| 5,692,193 | 11/1997 | Jagannathan et al. | 395/676 |

OTHER PUBLICATIONS

J. Philbin, "An Overview of the STING Operating System," Proceedings of the 4th NEC Software Conf., Oct. 1992.
S. Jagannathan, "Customization of First–Class Tuple–Spaces in a Higher–Order Language," Conf. on Parallel Architectures and Languages, Europe, Springer–Verlag LNCS 506 (1991).
J. Philbin et al., "Efficient Support for Multiple Concurrency Paradigms in Modern Programming Languages," Conf. on Parallel Architectures and Languages, Europe, Springer–Verlag LNCS 506 (1991).
Rogers et al., Supporting Dynamic Data Structures on Distributed Machines, ACM Transactions on Programming Languages and Systems, vol. 17, No. 2, pp. 238–263, Mar. 1995.
G. C. Hill, "Cyber Servants Electronic 'Agents' Bring Virtual Shopping A Bit Closer to Reality," The Wall Street Journal, Sep. 27, 1994.

*Primary Examiner*—Mark H. Rinehart
*Attorney, Agent, or Firm*—Wilson Sonsini Goodrich & Rosati

[57] ABSTRACT

A cell-based system for computation and communication. A cell is a well-defined structure that associates executable code and data into a basic computational module. A processor can traverse a cell and execute the instructions therein. Cells are arranged into a network with each cell linked to other cells by forward branches or other paths. A processor branches to a cell by loading its program counter with the address of the cell or by sending a packet of data across a communications network to activate remote processing in a cell. Cells have a path selection section for evaluating conditional branches and causing branches to be followed. Multiple branches may be followed in parallel from any cell. A tree-like organization is superimposed on the network by distinguishing one branch to each cell as a superbranch incorporating a return path (called "recession path"). A cell also has a convergence section that handles processors and threads of execution that return to that cell by this path (called "recession"). The convergence section implements rules that control which, if any, processors or threads continue to execute upon recession as well as rules for handling any resulting values associated with the processors or threads. The cellular computational module controls highly parallel and distributed processing and supports dynamic self-modification of the system. Information is acquired within the system not only through the acquisition of data and the modification of executable code within the cells, but also through the encoding of information and behavior into the structure of links that connect the cells.

14 Claims, 25 Drawing Sheets

SYSTEM AND METHOD FOR CELLULAR NETWORK COMPUTING AND COMMUNICATIONS

BACKGROUND OF THE INVENTION

1. Copyright Authorization

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

2. Field of the Invention

The field of the present invention relates in general to a system and method for structured computing and communications. More particularly, the field of the invention relates to structured computational cells linked together to form a highly flexible, dynamic computing and communications environment.

3. Background

Traditional notions of computer programming focus upon computer languages which are compiled to form executable code. These languages abstract away from the underlying machine language complexities, and allow a programmer to specify behavior in a more general manner. A compiler translates the program into a detailed machine specific implementation in the form of object code. In conventional procedural programming, the data and behavior of the program (i.e. the executable instructions) are distinct. In addition, these programs typically consist of sequential procedures or modes. As such these programs have a well-defined beginning, middle, and end, with little or no flexibility for the user to vary this predetermined sequence.

Procedural programming has been found inadequate in many respects. First, it does not provide a programmer with a paradigm for modeling real world objects and behavior. In particular, procedural programming is not readily adapted for sharing behavior among different computational units or objects. Second, the behavior of a procedural program at run time is typically determined by its data inputs. Since in the procedural model the data is distinct from the executable instructions, the level to which a user may interact with and modify the behavior of a program is limited. While it is possible to use procedural languages to write programs that are self-modifying, the complexity of the program may become unmanageable.

More recently, Object Oriented Programming (OOP) systems have been developed to overcome some of the limitations of procedural programming. OOP systems are based around objects that contain both data (the object's attributes) and executable code (the object's methods). While procedural languages tend to separate data from the processes that operate on it, OOP systems encapsulate the data that defines an object's attributes along with the methods that define the object's behavior. An object's methods may be accessed by sending a message to the object. For instance, a programmer may define a "Clock" object containing an attribute called "Current Time" (which is simply a variable containing the current time) and a method for displaying the time (which may be executable code that draws a clock on the screen showing the current time). The method might be activated by sending a "Display Time" message to the Clock. Once the Clock object is defined, the programmer may abstract away from its implementation. Rather than remembering how to calculate the current time and draw a clock on the screen, the programmer only needs to send a "Display Time" message to the Clock object.

OOP systems also provide a programmer with another method of abstraction called inheritance. A programmer may define a general class of objects having common attributes and methods. Subclasses may also be defined which inherit the attributes and methods from the parent class, but also add or modify attributes and methods. Thus, complex class hierarchies can be developed to define objects that share common attributes and behavior. To use an object from a particular class or subclass, the programmer simply instantiates an "instance" of the object. For example, a class may be defined called "Clock" with a method for calculating and displaying the current time. Subclasses of "Digital Clock" and "Analog Clock" may be defined that behave just like a Clock object, but display the current time differently—either in digital or analog form respectively. The programmer may use both digital and analog clocks in his program by declaring instances of each. Importantly, inheritance allows a programmer to add additional types of clocks without redefining how the current time is calculated. That ability may be inherited from the parent class—only additional or modified attributes and behavior need to be defined in the subclass.

Another aspect of many OOP systems, particularly OOP graphical user interfaces (GUIs), is that they support a "modeless" model, that is, one not tied to any particular predefined sequence of modes or procedures. These systems introduce the notion of "events." An event is any activity of interest, such as the press of a key on a keyboard or movement of a pointing device. The system responds to an event by sending a message to the currently executing application or object. This allows the sequence of events to be determined dynamically by a user's actions at run time.

While the OOP methodology provides for useful abstraction during development and more dynamic interaction at run time, current OOP systems have several limitations. First, application development in an object-oriented programming language, such as C++, brings with it a host of new complexities which the application developer must somehow manage. For instance, a C++ program of even modest complexities requires the creation and maintenance of immense class hierarchies—sophisticated data structures with complex interdependencies. Thus, while a programmer may encapsulate the complexities of an application in an object-oriented framework, the complexities of the framework itself must be managed. As object hierarchies grow, their own complexity obscures the simplicity of the OOP development model.

Second, the OOP model, while often adhered to during development, is rarely adhered to at run time. The attributes and methods of an object are spread across a number of classes and subclasses, and are not encapsulated at a single location in memory as the conceptual model would suggest. This limits the extent to which objects may be modified and restructured at run time. While OOP abstraction allows a programmer to readily define new objects during development, it is much more difficult for a user to do so at run time. This limitation on the ability to modify, add., or restructure objects at run time means that typical OOP systems cannot capture information and modify behavior based on a pattern of linkages and communicative interrelationships between objects. That is, the structure of the system cannot readily adapt and modify itself in response to interaction with a user or environment.

Neural network models suggest that this may be a major drawback to conventional OOP systems. Neural network models demonstrate that an immense amount of information and behavior may be defined based upon the way that neurons, or other simple computational units, are linked together into patterns of communicative interrelationships. Neural network models, however, tend to be primitive in nature and have failed to develop into a useful program development paradigm such as OOP.

What is needed is a development and computing system that is based upon structured, encapsulated computational units similar in some aspects to objects. Preferably, however, the system should provide the advantages of OOP systems without necessitating the creation and maintenance of complex class hierarchies. Further, such a system should preferably maintain its structure and encapsulation at run time, so that the system may be seamlessly modified based on interaction with a user or environment. The system should support dynamic modification of the internal behavior of the computational units, as well as the linkages and relationships among the units. The computational units should provide a basic structure that allows the system to be incrementally scaled to encompass different levels of complexity. Furthermore, it is preferred that the linkages among the basic computational units readily support massively parallel and distributed processing.

It is also desirable that such a computing system map across telecommunications networks. Generally, telecommunications systems of any sophistication are implemented as combinations of computers and interconnecting transmission lines. By design such networks are content-neutral— that is they do not discriminate based on the content of the messages they transport, provided the messages are supplied within defined constraints. Transmission lines are designed to be as nondistorting to the messages as possible, and nodes in the network are treated as "black boxes" whose internal operations—however diverse—are treated as irrelevant to the message traffic being handled by the network.

Intended to be content neutral, communications networks have accrued their own overwhelming complexities, quite apart from the arbitrary features of the messages passing through the system. Similar to procedural programming models, the data is isolated from the processes handling it. What is desired is a computing and communications system that allows the operation of a network and its components to be described in the same form as the content contained in the nodes and transported across the transmission lines of the network. In the ideal expansion of this concept, the entire telecommunications network assumes the capabilities of a general-purpose programmable computer serving its many users; although more limited expressions of the concept may provide for a mix of content-neutral transport of messages and programming of the network. What is desired is a computing and communications system that provides for the programming of the entire communications network in the same terms as the programming of individual computers (which may comprise nodes of the network).

Therefore, what is needed is the seamless integration of data, communications and procedure into a structured computing and communications environment. The behavior of such a system should not only account for data and procedures, but also the linkages and communicative relationships in the environment. Preferably, the system should be incrementally scalable, reuse tested atomic units of computation that are encapsulated and relocatable within the system, support highly parallel and distributed processing, and allow dynamic self-modification. In addition, the system should preferably support the dynamic acquisition of information not only through the acquisition of data and the modification of procedural code, but also through the encoding of information and behavior into the structure of the computing environment.

SUMMARY OF THE INVENTION

Aspects of the present invention provide a cell-based system for computation and communication. A cell associates executable code and data into a basic computational unit. A processor can traverse a cell and execute the instructions therein. Cells may be arranged in a network with each cell linked to other cells by paths or branches. In an exemplary embodiment, a processor branches to a cell by loading its program counter with the address of the cell. In other embodiments, a processor may send a packet of data across a communications network to activate remote processing in a cell. Various implementation technologies may be integrated into heterogeneous systems. Each cell may have a path selection section for evaluating conditional branches and causing branches to be followed. In an exemplary embodiment, multiple branches may be followed in parallel by initiating additional threads of execution on a single processor, or by causing additional processors to follow parallel branches. Each cell may also have a convergence section that handles processors and threads of execution that flow back to the original cell (called "recession"). The convergence section implements rules that control which, if any, processors or threads continue to execute upon recession as well as rules for handling any resulting values associated with the processors or threads. It is an advantage of the above aspects of the present invention that a basic atomic computational unit may be used to control multiprocessing. Both the linkages between the cells and the content of the cells determine the overall operation of the system.

Another aspect of the present invention provides for dynamic modification of a network of cells. The well-defined structure of a cell in the exemplary embodiment allows new cells to be constructed and added to the network by building a cell and adding a branch that leads to the new cell in the path selection section of an existing cell. In addition, cells may add executable code and/or data to other cells. In an exemplary embodiment, each cell is stored in a continuous portion of the virtual memory address space of a computer system. If the cells exceed the continuous address space available (i.e., such that if the cell expands it will overwrite a neighboring cell), the cell may be moved to another area in memory. Preferably, each cell keeps a list of the other cells that it references (referred to as forward links) as well as a list of the other cells that reference it (referred to as backward links). Preferably, these lists have a standard order and structure within the cells. These lists allow cell references to be dynamically modified and updated when cells are added, moved or deleted. If a cell should be required to move and has references to and/or from another cell, the cell may still be moved without disrupting continuity by leaving a reference to the new location at the old address (referred to as a "cell husk"). Once all the cells referencing the husk have been updated to reference the new cell location, the cell husk may be removed.

A system of locks regulates potentially conflicting references to a cell. There are several types of locks but all fall into three basic classes: 1) locks for execution, 2) locks for modification, and 3) locks for passive reference. In cases where a cell is being executed or modified by one or more threads of execution, updating of the cell is delayed (lock not granted) until all active references are completed. In cases where a cell has only passive references to it, updating the cell is allowed. Any updating may lead to a cell moving, which causes husking (the old cell is left in place and serves as a gateway to the new, moved cell). Husking is a mechanism whereby a cell's public address remains constant and in turn provides a lock-stepped gateway to a moveable operational cell (trueCell) so that processionists can always locate both the husk and the trueCell under all operational conditions.

Another aspect of the present invention imposes a hierarchical structure on a network of cells using a special branch called a "superbranch." In an exemplary embodiment, each cell may be referenced by a single superbranch from a "superspace" cell linked to the cell in a parent/child relationship. The cell being accessed is referred to as being in the immediate subspace of the superspace cell. The immediate subspace may also include other cells which have a sibling relationship to one another. The general subspace of a cell includes cells in its immediate subspace as well as the subspaces (if any) of those cells. A superbranch establishes a branch from the superspace cell to an immediate subspace cell, as well as a recession path back from the immediate subspace cell to the superspace cell. When a processor or thread of execution reaches the end of a cell without branching elsewhere, it normally recesses back to the superspace cell (i.e. it jumps to the convergence section of the superspace cell).

At each cell, multiple processors or threads of execution may diverge, following parallel superbranches to subspace cells. As execution in subspaces is completed, the processors or threads of execution may recess back up the cell hierarchy. Each cell may have a convergence section for receiving recessing processors and threads of execution. The convergence section determines which processors and threads of execution (as well as which results from computation in the subspace) may recess further up the cell hierarchy. The above described cell hierarchy provides for structured multiprocessing by linking basic computational modules.

In general, cells may include branches that do not have a corresponding recession path (simple branches) to any cell in the cell network. Thus, for example, a cell may branch to a cell in the subspace of a different cell. When that subspace cell completes execution, the processor or thread of execution will follow the recession path to the corresponding superspace cell and generally will not return to the cell from which it branched. Thus, a cell may activate other networks of cells as well as its own subspace. The other network of cells may be activated even though the current cell does not control divergence and convergence of processing within that cell network.

It is an advantage of the above aspects of the present invention that computation and communication may be controlled by linking modular structures. These computational modules may be activated in parallel over branches. Branching may entail any variety of methods for activating cells and includes causing a processor or thread of execution to jump to a specific address in the memory of a computer system or sending a signal or packet of data over a communications network to activate a remote cell. Such a system is readily adapted for highly parallel and distributed processing and dynamic self-modification. Information may be acquired within the system not only through the acquisition of data and the modification of executable code within the cells, but also through the encoding of information and behavior into the structure of links (i.e. branches and recession paths) that connect cells in the computing environment.

BRIEF DESCRIPTION OF THE DRAWINGS

These and other features and advantages of the present invention will become more apparent to those skilled in the art from the following detailed description in conjunction with the appended drawings in which.

DESCRIPTION

One aspect of the present invention provides a computing and communications system and method. The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
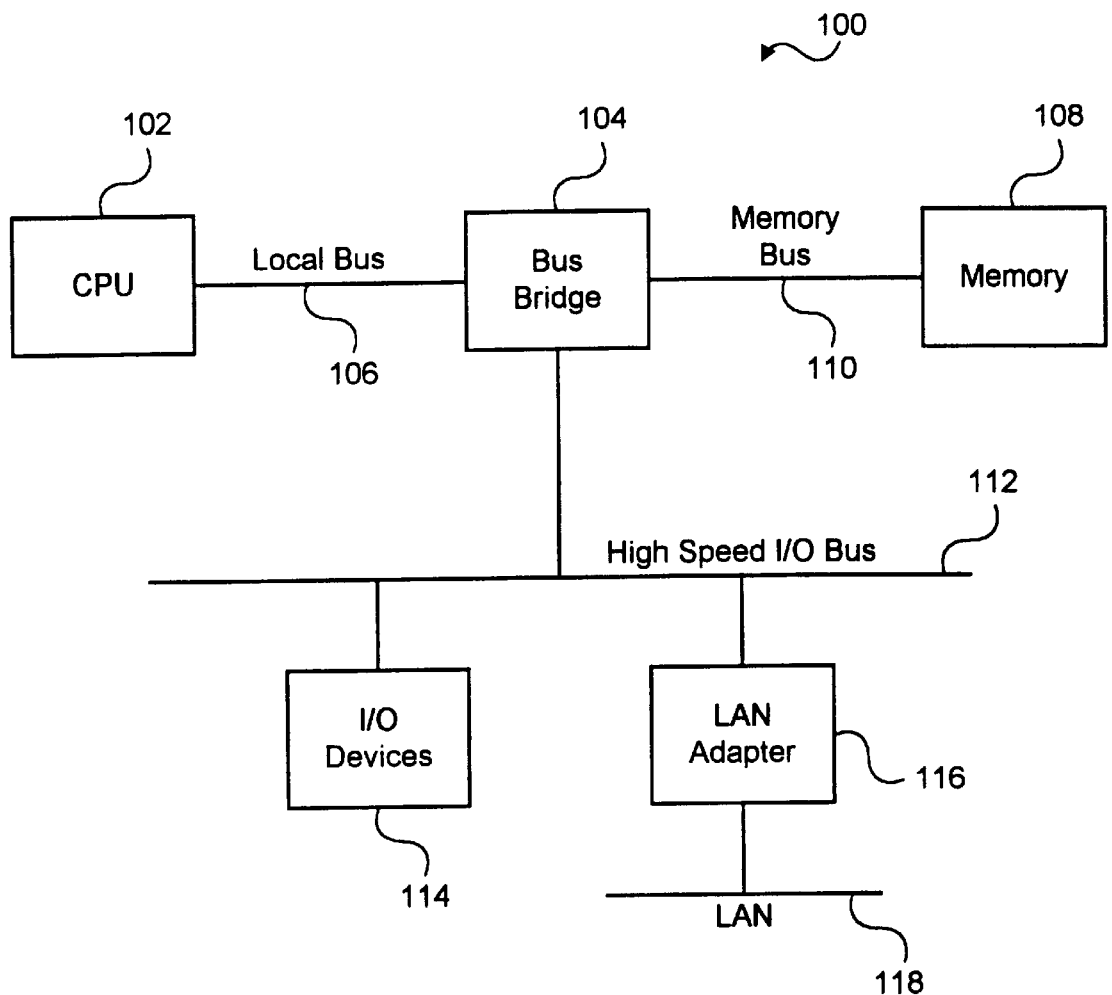
FIG. 1 is a simplified block diagram illustrating a computer system which may be used in conjunction with a first embodiment of the present invention.

This description is presented in the following order:

I. Overview
　1. Exemplary Computer and Network System
　2. Computational Model (Cells, Paths, Processionists)
　3. Basic Cell Structure (Header, Name Section, Entry Zone, Output Behavioral Section, Path Selection Section, Convergence Section, Exit Zone, Additional Components)
　4. Cell Linkages (Evocation, Invocation, Coupling)
　5. Current Value
　6. Basic Multiprocessing Techniques (Locking, CellFrame, Stated Processionists)
　7. Exemplary Cell Network: Dynamic Filing Tree
II. Detailed Cell Structure
　1. Entry Zone and Activation Conditions
　2. Output Behavioral Section and the Current Value (Evaluation Space, Current Value, Current Value in Progress, Lineal Code, Data Units)
　3. Path Selection Section and Branch Evaluator
　3.1 Overview of Branch Evaluator
　3.2 Branch Evaluator Algorithm
　3.3 Serialization/One Shot Jump (OSJ) Operation
　4. Convergence and Result Forwarding Rules
　4.1 Convergence/Recession Rules
　4.2 Result Forwarding Rules
　4.3 Combining Convergence and Forwarding Rules
　5. Exit Zone and Repetition
　5.1 Return from Invocation
　5.2 Repetition Modules
　5.3 Exemplary Cell Network: Encore Repetition Tree
　5.4 Coupling
　5.5 Exemplary Cell Network: Remote Agent
III. Specific Operation
　1. Cell Building and Linking
　2. Creating and Maintaining Network Continuity
　3. Concurrent Cell Builders and Linkers & Network Self-Modification
　4. Cell Locking
　4.1 Protecting Cell State in a Multi-Threaded Environment
　4.2 Locking and Unlocking Cells, Wait-Queuing and Dequeuing Lock Requests
　4.3 Shareable and Unshareable Evoke and Invoke Locks
　4.4 Additional Discussion of Convergence Locks
　4.5 Lockable Cell Sections
　5. Evaluation Space, Forwarding Handling, and I/O Model
　5.1 Terminology: Forwarded Value Is Identical to Current Value (CV)
　5.2 Terminology: Evaluation Space (ES)==CV and CVIP
　5.3 Current Value (CV), Current Value In Progress (CVIP) and Evaluation Space (ES)
　5.4 ES (CV and CVIP) Handling Rules
　5.5 Discussion on Processionist's Frame for a Cell (cellFrame)
　5.6 Convergence Rules and Their Role in CV Handling
　5.7 Some Notes on Branch Evaluator Interaction with CV and One Shot Jump (OSJ)
　5.8 Consumption of a CV and Resulting Resource Releasing
　5.9 Additional Protracted Reference Discussion Regarding PROTRACT_REF Locks, Storage Operations, and Resultant Husking, and Possible Ghosting
　5.10 Considering ES In-Cell References Relative to Potential Husking, True Cell Creation, and Ghosting
　5.11 Protracted References to Cells and Their Role in ES's
　5.12 Input/Output Model As Related to CV and Output Section Elements
　6. Partial Redundancy
　7. Under-Specification & Deferred Resolution
　8. Cloning and Inheritance
　9. Exemplary Network Utilities
IV. Appendix A: Lineal Code and Lineal Translation Rules
V. Appendix B: The Cell Finder
VI. Appendix C: Notes on Implementation and Lineal Code of Branch Evaluator I. Overview
　1. Exemplary Computer and Network System The first embodiment of the present invention provides a computing and communications system and method that may be used both in a computer system and across a communications network. FIG. 1 is a simplified block diagram illustrating a general purpose programmable computer system, generally indicated at 100, which may be used in conjunction with a first embodiment of the present invention. In the presently preferred embodiment, a Next™ computer containing a Motorola 68040 microprocessor, and running the NextStep operating system is used. Of course, a wide variety of computer systems may be used, and it should be understood that it is an advantage of the present invention that it may be used across different computer architectures. Examples of such computer systems include without limitation workstations or servers running Unix versions such as BSD 4.3 (or later) or System V Release 4.3 (or later), or other operating systems such as SunOS 4.1, DEC OSF/1, Open VMS, or Microsoft NT, and IBM compatible personal computers running Windows NT, O/S2 or Plan 9. FIG. 1 shows one of several common architectures for such a system. Referring to FIG. 1, such computer systems may include a central processing unit (CPU) 102 for executing instructions and performing calculations, a bus bridge 104 coupled to the CPU 102 by a local bus 106, a memory 108 for storing data and instructions coupled to the bus bridge 104 by memory bus 110, a high speed input/output (I/O) bus 112 coupled to the bus bridge 104, and I/O devices 114 coupled to the high speed I/O bus 112. As is known in the art, the various buses provide for communication among system components. The I/O devices 114 preferably include a manually operated keyboard and a mouse or other pointing device, sound recording devices, voice (with touch-tones) and data telephony for input, a CRT or other computer display monitor, speakers, head phones, voice (with touch-tones) and data telephony for output and a disk drive or other storage device for nonvolatile storage of data and program instructions. In addition, a local area network (LAN) adapter 116 is connected to the high speed I/O bus 112. The LAN adapter 116 allows computer system 100 to communicate with other devices over a LAN 118. Of course, other networking and communications connections may be supported through other adapters, modems, and the like.

The operating system typically controls the above identified components and provides a user interface. The user interface is preferably a graphical user interface which includes windows and menus that may be controlled by the keyboard or pointing device, plus voice sound and music recording and playback devices. Of course, as will be readily apparent to one of ordinary skill in the art, other computer systems and architectures are readily adapted for use with embodiments of the present invention.

Figure 2:
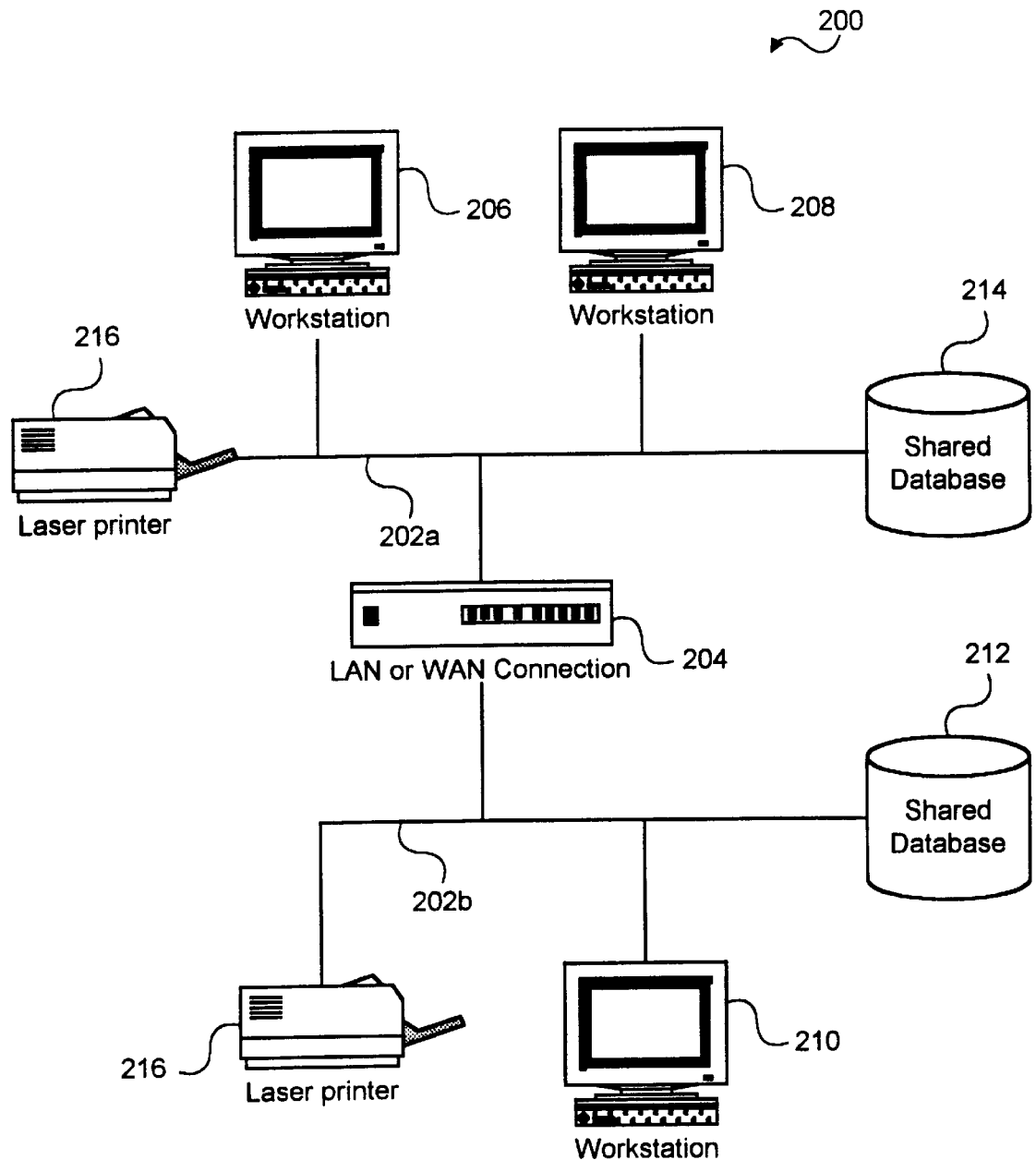
FIG. 2 is a simplified block diagram illustrating a computer network which may be used in conjunction with the first embodiment of the present invention.

FIG. 2 is a simplified block diagram illustrating a computer network, generally indicated at 200, which may be used in conjunction with a first embodiment of the present invention. For illustrative purposes, aspects of the first embodiment will be discussed within the context of LAN segments connected by a bridge or router. However, it should be understood that aspects of the present invention may find application in a virtually limitless number of networking arrangements and that it is an advantage of the present invention that it may be applied across different network architectures and protocols. Examples of networking configurations include without limitation Ethernet LANS, token ring LANS, wide area networks, and the internet. FIG. 2 illustrates an exemplary computer network which includes two Ethernet LAN segments 202a and 202b. The LAN segments 202a and 202b are connected to one another by bridge 204. Connected to each LAN segment are network nodes including workstations 206, 208 and 210, shared database servers 212 and 214, and laser printers 216. As is known in the art, other network nodes and other network segments may be added as well. The various network nodes 204–216 may communicate with each other across LAN segments 202 using the Ethernet protocol. Network nodes connected to LAN segment 202a may communicate with network nodes connected to LAN segment 202b across bridge 204 as is known in the art.

2. Computational Model (Cells, Paths, Processionists)

The exemplary computer system of FIG. 1 and the exemplary computer network of FIG. 2 will be used to illustrate the system and method of controlling computation and communication according to the first embodiment of the present invention. In order to appreciate aspects of the first embodiment, it is useful to approach the process of computation and communication from the perspective of process flow through a logical network of computational nodes rather than as a collection of objects or procedures. In order to understand embodiments of the present invention, it is desirable to describe a conceptual model that allows computation and communication of a wide variety of types using consistent terminology. Based upon this model, embodiments of the present invention are able to provide useful structures for the seamless integration of data, communications, and procedural computation. Computation and communication are based upon three components: cells, paths, and processionists. Cells are the basic structural elements of the system according to a first embodiment. In the first embodiment, cells may be implemented each as a contiguous area in the memory 108 of computer system 100 or as network nodes in computer network 200. One cell is connected to another cell by a path. A path may be a pointer or other reference from one cell to another in memory 108 of computer system. In a network such as that shown in FIG. 2 paths may be defined between different nodes in the network. If a node is designed to act as a single cell, a LAN address may be used to define a path to the node. If the node is a computer system whose memory hosts a network of cells, each cell may be referenced from another node using a path comprising a LAN address (to the node) and a symbolic reference (to the particular cell). A processionist is something capable of traversing a path. As processionists encounter cells, they are redirected to other paths or removed from the system. In addition, processionists may execute instructions in a cell, and carry values between cells.

Processionists may come in a variety of types. Processionists may be categorized based upon whether they can carry values between cells and/or execute instructions found in cells. The following are types of processionists that may be applicable in specific embodiments of the present invention:

1. A "Bare Processionist" is a processionist that merely moves from one cell to another without carrying a useful value. It simply causes the next cells along the path to be entered and activated. An example of a bare processionist would include a pulse on a LAN segment 202.

2. A "Simple Processionist" is a processionist that carries a useful value between cells. An example of a simple processionist would include signals on LAN segment 202 that represent binary data.

3. An "Operating Processionist" is a processionist capable of following or executing instructions it finds in a cell. An operating processionist may carry a value between cells.

4. A "Virtual Processionist" is a processionist that references different positions along a path or within cells, rather than physically moving along a path. A virtual processionist may use an offset counter or pointer to a position. As the counter or pointer is updated, the virtual processionist is said to traverse the path.

5. A "Virtual Operating Processionist" is a virtual processionist capable of following or executing instructions it finds in a cell. An example of a virtual operating processionist is CPU 102. In a multiprocessing system, multiple paths may be followed by different "threads" executed by CPU 102. In that case, each thread may be thought of as a virtual operating processionist. In a multiprocessing system with multiple CPUs, each CPU (or each thread for each CPU) may be a separate virtual operating processionist.

It should be noted that at a given cell, multiple paths may diverge from the cell. Therefore, a processionist must be able to create or recruit additional processionists. In a multiprocessing system, this means for instance that a single thread (acting as a virtual operating processionist) may create additional threads to follow additional paths from the cell. In addition, the type of path leading to a cell may be different from the type of path leading away from a cell. For instance, the path leading into a cell may be represented by a pointer in memory, while the path leading away from the cell may be a LAN address for a remote node in a network. Thus, processionists may have to transform as they pass between cells. For instance, a CPU (acting as a virtual operating processionist) may enter a cell, but the path leaving the cell to go to another cell may indicate a connection over a LAN segment. Therefore transduction must occur (at an appropriate adaptor) from one form of progression to another. Nevertheless, they can be regarded as a single processionist following a path among cells. It should be noted that with appropriate adaptors for transduction, biological or chemical signals, light or other physical signals may be included as part of a path between cells and may provide an interface between cells implemented in heterogenous technologies.

In computer system 100, the processionist is the CPU which traverses pointers in memory and executes code in the various cells (a virtual operating processionist). In computer network 200, the processionist may be a simple signal on the transmission lines, a packet of data, or a network agent capable of executing instructions at each node.

While it is possible to enumerate processionists, nodes and paths in many conventional systems, conventional systems are not designed based on these categorizations and therefore do not provide a consistent structure for describing and programming such a system. If computation and communication are modeled as processionists traversing paths from cell to cell, it can be seen that a consistent structure for cells provides the basis for a seamlessly integrated computing and communications environment. Further, by structuring the internal memory of a computer in a manner consistent with physical computer networks (that is by encapsulating cells in contiguous memory locations and connecting them by paths) parallel and distributed processing become seamless whether occurring within the computer system or across a physical transmission line in a computer network. In addition, information and behavior can be encoded in the pattern of paths connecting cells as well as within the cells themselves.

3. Basic Cell Structure (Header, Name Section, Entry Zone, Output Behavioral Section, Path Selection Section, Convergence Section, Exit Zone, Additional Components)

Figure 3:
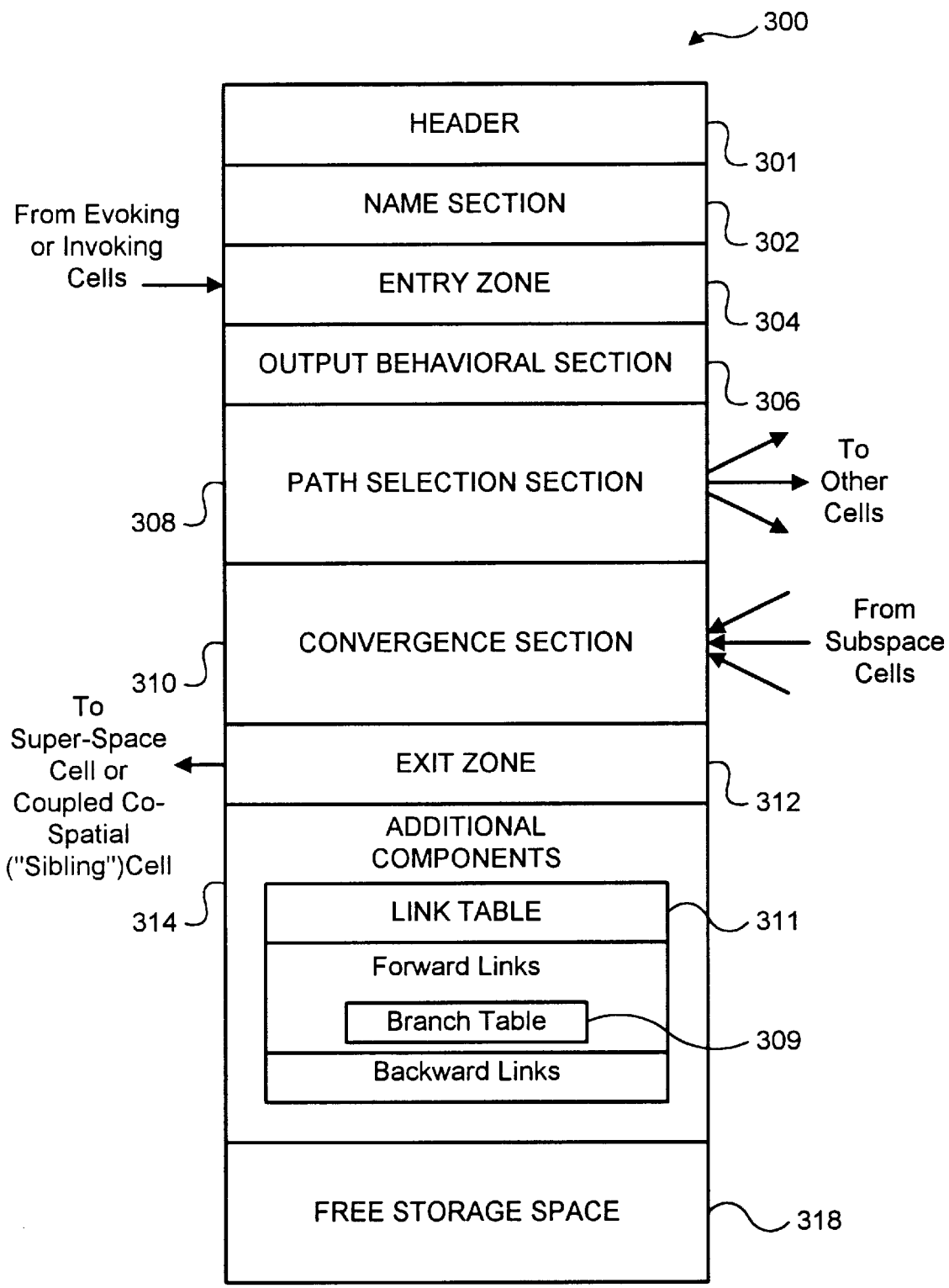
FIG. 3 is a simplified block diagram showing the basic structure of a cell according to the first embodiment of the present invention.

FIG. 3 is a simplified block diagram showing the basic structure of a cell, generally indicated at 300, according to embodiment, a cell is a present invention. In the first embodiment, a cell is a preferably contiguous block of memory in the virtual address space of computer system 100. As shown in FIG. 3, the cell of the first embodiment contains a plurality of cell segments including: a header 301, a name section 302, entry zone 304, output behavioral section 306, path selection section 308, convergence section 310, exit zone 312, and additional components 314. Each of these cell segments in the first embodiment comprises a block of virtual memory address space. Each of these sections will be described briefly below followed by a discussion of the various ways that cells may be linked to one another. The structure of the cell will then be described in greater detail.

The header 301 contains offsets or pointers to the other sections of the cell, plus a lock table and other state information. The name section 302 is used to store a name for the cell. The name is a piece of text that provides a default output or return value for a cell as well as a local identifier. In the first embodiment, names are not required to be unique, since identification ultimately relies on location in memory and the linkages between cells.

A cell is typically accessed by a branch from another cell. While branches may exist between any two cells, there is a special "superbranch" that creates a hierarchical structure among cells. Each cell has one superbranch leading to its entry zone from a "superspace" cell linked to the cell in a parent/child relationship. The cell 300 being referenced by the superbranch is referred to as being in the "subspace" of the superspace cell. The subspace may also include other cells which have a sibling relationship to one another as well as the subspaces of those cells. The immediate subspace of a cell contains only the direct children of the superspace cell, while the subspace generally also includes the children's subspaces. In addition to super branches, regular branches may be used to branch between any two cells. A cell may branch to: (1) a cell in its immediate subspace using a regular branch even though a superbranch also exists between the two cells (this is an example of an "inner branch" meaning it is a branch into the subspace); (2) a cell in its indirect subspace (this is also an example of an "inner branch"); (3) any other cell; or (4) the current cell itself in which case the processionist jumps back to the entry zone of the current cell. (3 and 4 are "outer branches" meaning it is a branch to a cell outside of the subspace.) The arrangement and linking of cells will be described further below.

A cell 300 is accessed when another cell sends a processionist along a path to entry zone 304. First the cell's lock is consulted which may result in waiting. The processionist then enters the cell at entry zone 304. In the first embodiment, this means that the preceding cell will load the program counter of CPU 102 with the address of entry zone 304 through a branch instruction. CPU 102 will then start executing instructions for the cell 300 at the first address of entry zone 304. The entry zone 304 contains conditions that may be tested regarding activation of the cell 300. These conditions may include modulators of the cell, activation rules, and inhibitory indications. Each of these conditions will be discussed further below.

In the first embodiment, after the code in the entry zone 304 is executed, the processionist (which is a thread of execution for CPU 102) then moves on to the output behavioral section 306. The output behavioral section 306 contains executable code for outputting values from the cell and performing other operations. The output behavioral section 306 may be blank for cells without output or it may include extensive code for generating complex output. By isolating output related code from other sections, the behavior of a cell may be modified at run time ("on the fly") simply by overwriting this section with new instructions and contents. The output behavioral section 306 also generates and/or modifies a data value carried by the processionist (referred to as the "current value") as it passes through the cell. See Section I.5 below. The current value may be returned with the processionist when it exits the cell.

After the output behavioral section has been completed, the processionist executes instructions in the path selection section 308. The path selection section 308 contains executable code and conditions for determining which paths emanating from cell 300 should be followed by the processionist. As will be described further below, there may be paths leading to cells in the immediate subspace via a special path called a superbranch. This superbranch establishes the parent/child relationship between the cells. Other types of branches may exist between cells whether or not the cells have a superspace/subspace relationship. A special module of code called the branch evaluator is used to determine which paths to follow from among the extant set of super and simple branches. (The branch evaluator may be reentrant code shared by many cells within the same address space.) The branch evaluator implements a branch selection rule that regulates whether processionists move from one cell to another within the system. The actual conditions that are evaluated and addresses for each referenced cell are contained in a branch table 309 within the cell. The branch table 309 makes up part of the cell's link table 311 which contains the addresses of all the other cells referenced by the current cell (forward links) and the addresses of all the other cells that reference the current cell (backward links). Forward links are used when a processionist branches from the current cell and backward links are used for memory management (e.g. updating the addresses used by other cells to reference the current cell in the event the current cell moves or is deleted). The addresses in the link table 311 may be virtual memory addresses for cells in the same address space or network addresses for cells on other nodes in a network or symbolic references.

The path selection section 308 contains a mechanism for dispatching processionists on the appropriate paths. In the first embodiment, this may be accomplished by requesting new threads of execution from CPU 102 to follow additional paths (the existing thread would follow one of the paths itself). The appropriate address for the branch may be loaded into the program counter of CPU 102 for the appropriate thread. For cells on other nodes in a network, the paths may be followed by sending a packet or other signal to the appropriate network address for the cell. In this way, cells branched to by cell 300 are activated in parallel using multiprocessing techniques. For systems that do not support multiprocessing, the selected paths can in some circumstances be taken up serially, with the order preferably determined based on the order of entries in forward branch table 309.

After processionists are dispatched along the selected paths from cell 300, the cell becomes dormant (that is, none of the executable code in the cell 300 is executed) until another processionist enters the cell or a processionist returns ("recesses") from the subspace to convergence section 310 (if no dispatching occurs then the processionist jumps directly to the exit zone 312, retaining its current value). The convergence section 310 contains rules for handling values returned from the various paths traversed in the subspace of cell 300. Based on conditions stored within the convergence section 310, some, all or none of the values returned by the paths may be forwarded by cell 310 back to its superspace cell. Locking mechanisms described in detail below may be used to prevent other processionists from entering the cell or specific sections of the cell as necessary to provide for controlled convergence of processionists from the subspace, and generally to preserve state to the extent a cell may not be fully reentrant.

When the conditions in the convergence section 310 are met, exit zone 312 is activated. The exit zone 312 contains code that should be executed and other conditions that should be evaluated before the processionist exits the cell. Among other things, the exit zone 312 may contain repetition control which causes the output behavioral section 306 (and what follows) to be repeated under a certain condition or a certain number of times before the processionist is allowed to leave the cell. Repetition is accomplished by sending a processionist back to the start of the output behavioral section 306. This may be accomplished in the first embodiment by using a conditional branch statement in exit zone 312. When the exit zone is entered by the processionist, a current value has already been set by the output behavioral section as modified and/or replaced by the subspace and any subsequent convergence and the exit zone performs no further modification.

The address of the superspace cell may be located in link table 311. While the address of the superspace cell's convergence section could be stored directly in the link table, preferably cells are referenced consistently by using the starting address of the cell. Offsets and/or pointers to specific sections may be retrieved from a standard location at the beginning of the cell and used to access a desired section of the cell. Indirect addressing, which is supported by standard programming languages such as "C" and "C++," may be used for this purpose. Thus, to send a processionist to the convergence section of the superspace cell, the cell address ("starting address") of the superspace cell is retrieved from the link table 311. A request is then made to lock the cell for convergence using a "lockCellFor" convergence function. In certain circumstances when a cell has been moved, the starting address of the cell as stored in link table 311 will not reflect the address of the cell contents (the "trueCell" address). Rather a "cell husk" remains in the previous location and references the trueCell address. The trueCell address is returned by the cell or cell husk in response to the "lockCellFor" function. An appropriate offset is then retrieved from a table 301 in the header of the superspace cell. The offset is then added to the trueCell address to provide the address of the superspace cell's convergence section The additional components 314 provides storage for various tables, conditions, and data used by the sections described above. This may include, among other things, the link table 311 used by path selection section 308 and exit zone 312, storage for conditional parameters, and the actual output contents of the output behavioral section 306, plus pre-allocated extra space for the cell to grow.

It should be noted that excepting the cell header, the actual physical ordering of each section is irrelevant, whereas the execution order of active sections is crucial. Any physical ordering of sections will work so long as the sequential section-to-section execution transitions (jumps or branches) are properly constructed. For instance, in the first embodiment, the output behavioral section 306 is actually located just prior to the free storage area 318 in contiguous memory. This allows the output behavioral section 306 and free storage area 318 to be allocated and deallocated together for certain memory management techniques discussed below. See Section III.2 on husking and dehusking.

The detailed structure and implementation of a cell will be described further below. It will be noted, however, that a cell is structured such that instructions and conditions affecting entry, output behavior, branching, convergence, and exit are grouped into separate sections. The behavior of a cell may be modified simply by changing the executable code or conditions in the appropriate section. The cell structure also allows cells to be linked together through the path selection section 308 linking to the entry zone 304 of a subspace cell (via a superbranch) or of any cell (via an ordinary branch), and linking the exit zone 312 (via a recession path) to the convergence section 310 of the superspace cell or (via a coupling link) to the entry zone 304 of a co-spatial cell (i.e, one that is a subspace of the same superspace cell as the current cell). This provides a consistent structure for computation and communication and allows behavior to be controlled by the executable code and conditions in the cells as well as the linkages between cells.

4. Cell Linkages (Evocation, Invocation, Coupling)

Figure 4A:
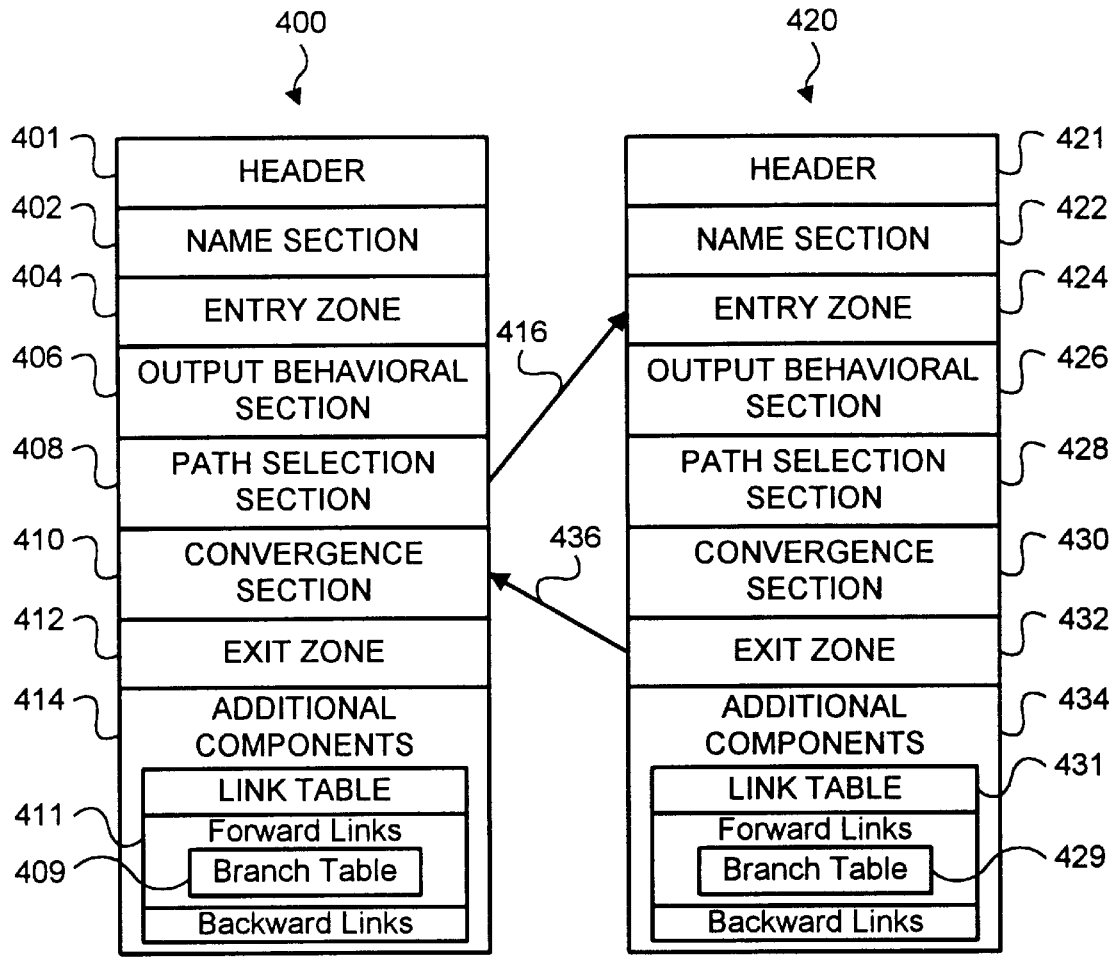
FIGS. 4A–4E are simplified block diagrams illustrating evocation branching between cells according to the first embodiment.

In the first embodiment, cells may be linked using a variety of mechanisms. These cell linkages allow the paths available for process flow to be dynamically altered in a structured manner which provides a significant advantage over typical conventional systems. The first embodiment uses two major distinct methods for linking cells. The first method, linkage for "evocation" creates explicit branches that are defined between cells based on entries in the branch table 309 contained within link table 311 FIG. 4A illustrates cells 402 and 404 which have an explicit branch between the cells (here a "superbranch"). When a processionist reaches the path selection section 408 of cell 400, the entries in the branch table are evaluated. One of these branch entries contains the address of cell 420. If any conditions that may be imposed for this branch are met, cell 400 will send a processionist to entry zone 424 of cell 420 and thereby "evoke" cell 420 as indicated by arrow 416 in FIG. 4A. This is accomplished in the first embodiment by locking the cell (a husk or singular cell) for evoking, receiving its trueCell or singular cell address back, and then loading the program counter of CPU 102 with the address of entry zone 424 of cell 420. Unlike conventional procedure calls (such as that implemented by a conventional "JSR" assembly language instruction), the evocation branches in the first embodiment are stackless. This means that the address of cell 400 is not stored when the branch is made, and cell 420 has no record of which cell is responsible for evoking it among all those cells which may have branches to it potentially capable of evocation. For paths that cross communications networks, the address stored in forward branch table 409 is a network address, and/or symbolic link and the target cell is evoked by sending a packet or signal to the appropriate network address.

Cell 420 will also contain a corresponding link from the exit zone 432 of cell 420 to the convergence section 410 of cell 400. This link is called a "recession path." Once a processionist crosses the exit zone 432 of cell 420, it will look up the address of superspace cell 400 in the link table 431 by locking the superspace cell (a husk or singular cell) for convergence, receiving its trueCell or singular cell address back, and then recess to convergence section 410.

Forward links are links leading away from the current cell that may be followed by a processionist. Backward links are merely addresses of cells that reference the current cell and are used for maintaining continuity if the current cell is moved or deleted. As discussed previously, the address of cell 400 (which is retrieved from link table 431) is used to indirectly retrieve via cell-locking an offset or pointer from the header 401 of cell 400 to determine the address of the convergence section 410 of cell 400. The processionist will then jump to the convergence section 410 by loading the program counter of CPU 102 with the appropriate address as indicated by arrow 436 in FIG. 4A.

Figure 4B:
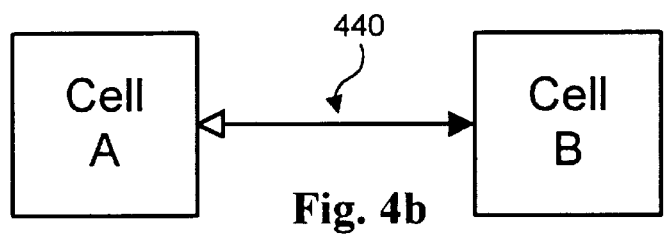

If such a corresponding recession path exists, the combination of the branch 416 and recession path 436 is referred to as a "superbranch", which shall be designated herein using a bidirectional arrow 440 connecting cells in opposing directions as shown in FIG. 4B with a solid arrowhead pointing at the evoked cell, and a hollow arrowhead pointing at the evoking cell (to represent the corresponding recession path). The system of the first embodiment is preferably structured such that exactly one superspace branch leads to the entry zone of a given cell (with a single corresponding recession path), although multiple superspace branches may emanate from the path selection section of a cell (to those cells called its subspaces).

Figure 4C:
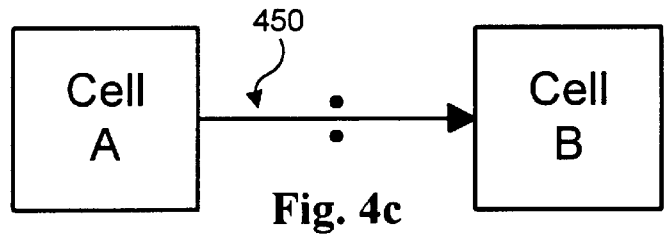

Evoking branches do not, however, require a corresponding recession path in the first embodiment. Where an evoking branch links two cells without a corresponding recession path, a single arrow with a dot on either side 450 will be used to designate the link as shown in FIG. 4C. This will be referred to as a "simple branch". In this case, the evoked cell will execute, but when the exit zone of the evoked cell is reached, it will not recess to the evoking cell, but may recess to another cell through a recession path (which is part of a different superbranch). While only one super branch leads to the entry zone of a cell in the first embodiment (and only one recession path leads away from the exit zone), multiple simple branches may lead to the entry zone of a cell.

Figure 4D:
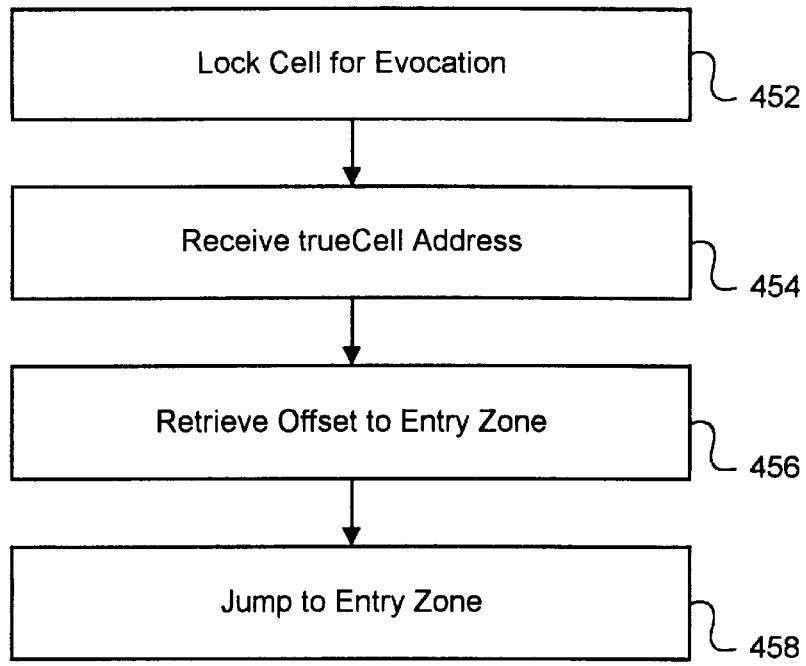
Figure 4E:
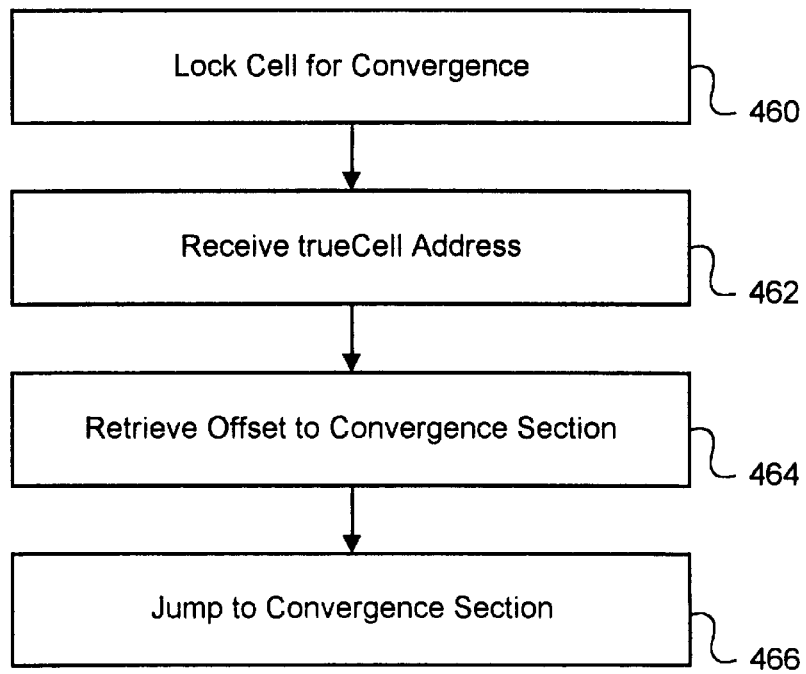

FIGS. 4D and 4E illustrate the processes of branching and convergence in additional detail. FIG. 4D shows the steps involved in following a branch (such as branch 416) in the first embodiment. As shown at step 452, the processionist first requests a cell lock for evocation from the subspace cell 420. The subspace cell 420 (or cell husk at that location) then returns the trueCell address—the actual address of the cell contents (step 454). The processionist then retrieves an offset from header 421 that indicates the offset to the entry zone (step 456). This offset is added to the trueCell address and loaded into the processionist's program counter, thus causing the processionist to jump to the entry zone 424 of the subspace cell 420 (step 458).

FIG. 4E shows the steps involved in converging back to a cell (such as along recession path 436). As shown at step 460, the processionist first requests a cell lock for convergence from the superspace cell 400. The superspace cell 400 (or cell husk at that location) then returns the trueCell address—the actual address of the cell contents (step 462). The processionist then retrieves an offset from header 401 that indicates the offset to the convergence section (step 464). This offset is added to the trueCell address and loaded into the processionist's program counter, thus causing the processionist to jump to the convergence section 410 of the superspace cell 400.

Figure 5A:
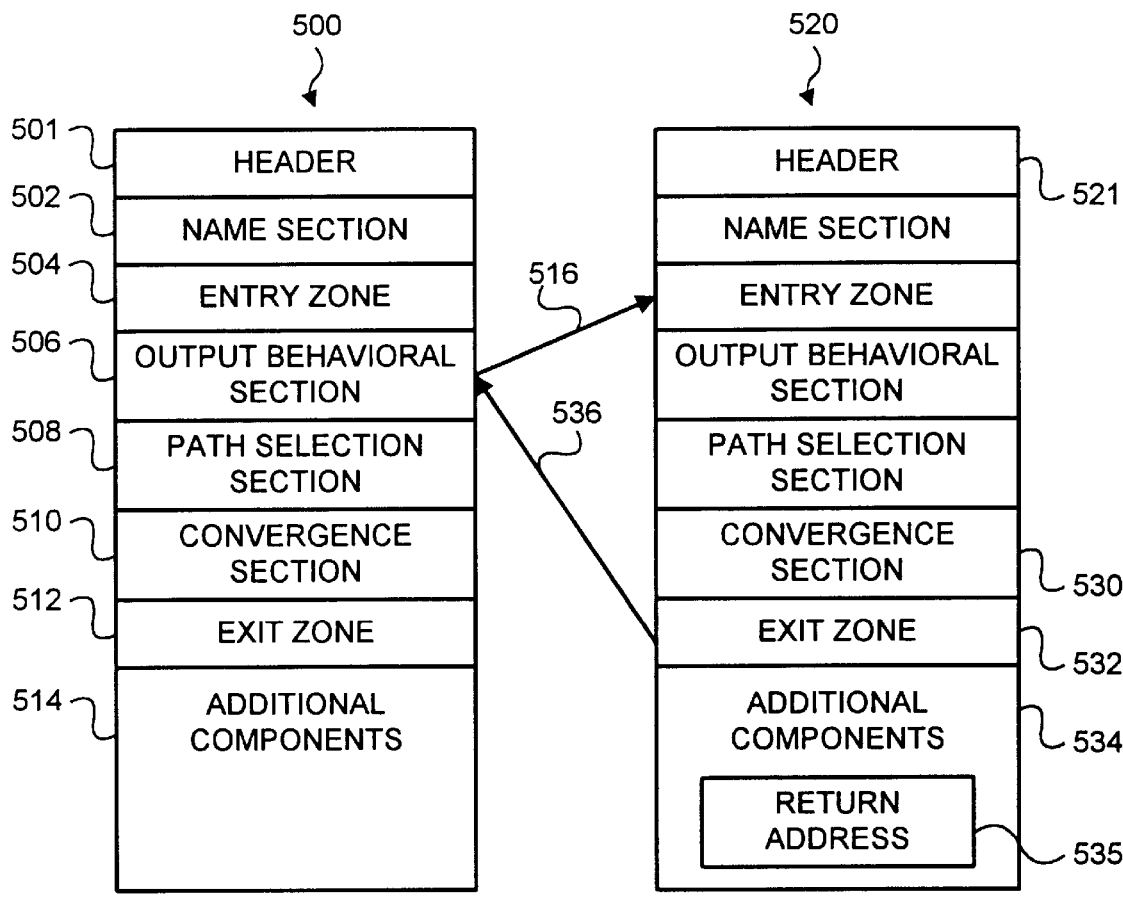
FIGS. 5A–5B are simplified block diagrams illustrating invocation branching between cells according to the first embodiment.
Figure 5B:
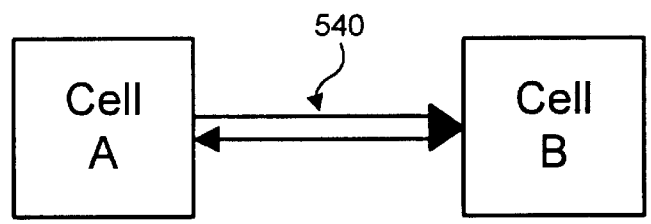

Cells may also be linked in the first embodiment through implicit links, which subsequently may be followed to "invoke" another cell. FIG. 5A shows an invoking cell 500 and an invoked cell 520. The implicit invocation link 516 is used in the output behavioral section 506 of the invoking cell 500 when it is desirable to use the behavior or output of the invoked cell 520. This is similar to a procedure call in conventional programming. Through invocation, a cell can use the functionality of other cells as part of its behavior, can effectively retrieve their contents, or can store into them or their subspace. The invoking cell can invoke any number of cells, and may invoke the same cell more than once in different parts of the output behavioral section. Unlike evocation, a return address is saved. Certain state information (such as the values of registers for CPU 102) may also be preserved (preferably in the processionist stack). The return address and related state information may be stored on a system stack using a push operation as with conventional procedure calls or it may be stored in the storage section 534 of the invoked cell 520 (as indicated at 535). Once the invoked cell 520 completes execution, the return address is popped off the system stack and used to return to the output behavioral section 506 of the invoking cell 500 (as indicated by arrow 536). Execution resumes at the next address in the output behavioral section 506 of the invoking cell 500. Like an evoked cell, the invoked cell 520 executes its entry zone 414 (although certain access control is skipped), output behavioral section 526, path selection section 528 (and contingent on subsequent events), convergence section 530, and exit zone 532. This may in turn involve further evocations and invocations of other cells. However invoked cells have their last output suppressed. All calculations are performed, so a proper value can be returned to the invoking cell. However, the output of a cell's value is suppressed, so an invoking cell 500 can use the invoked cell's functionality or contents without causing its output as well. When a cell invokes another cell, it will be designated herein using an arrow with two lines 540 as shown in FIG. 5B with a large arrowhead pointing at the invoked cell, and a small arrowhead pointing at the invoking cell (which represents the return path to the invoking cell).

Figure 6A:
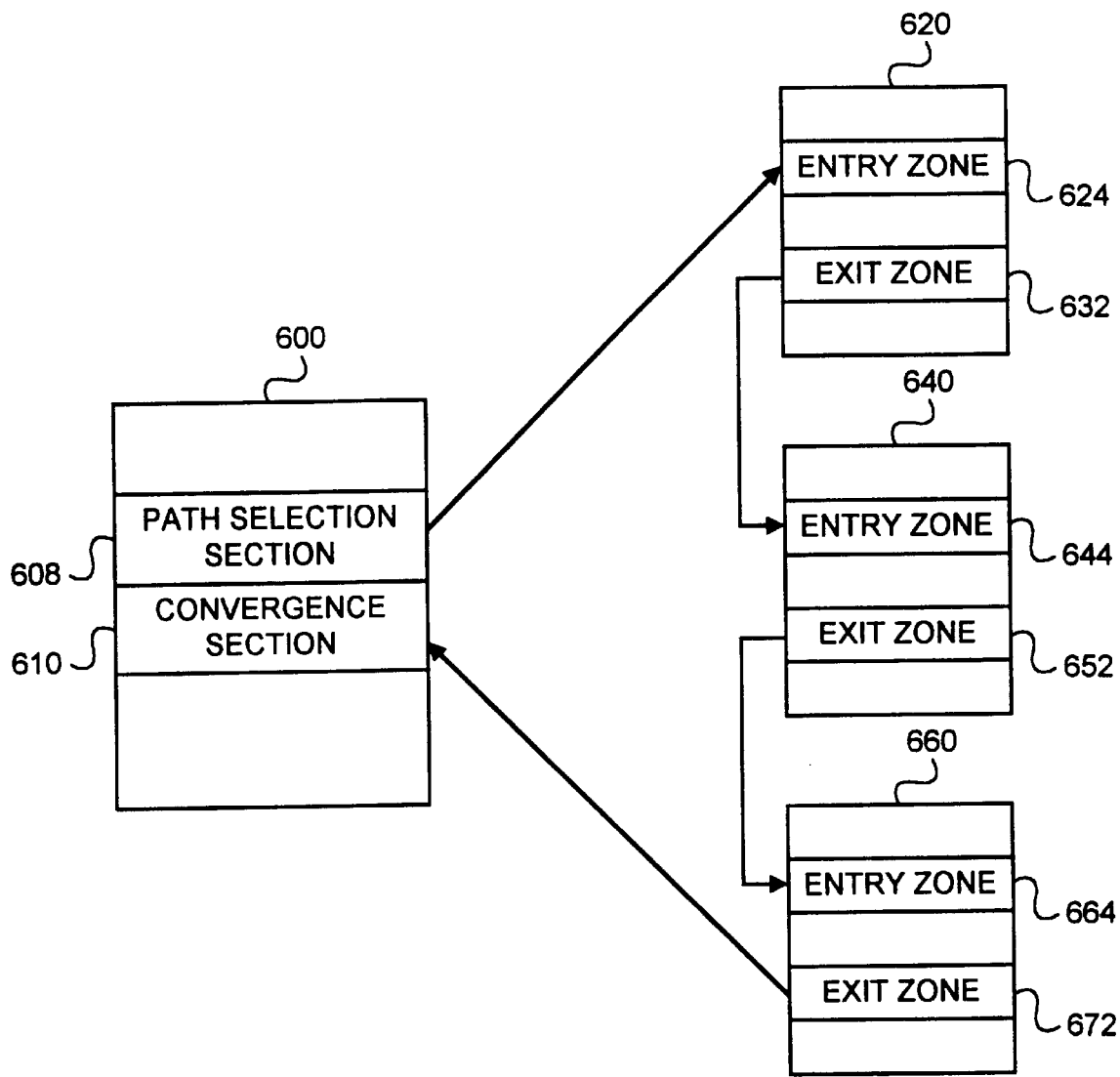
FIGS. 6A–6B are simplified block diagrams illustrating coupling links between cells according to the first embodiment.

Yet another type of link used in the first embodiment of the present invention is referred to as "coupling". Coupling allows for sibling cells in a subspace to be executed serially rather than in parallel. As shown in FIG. 6, a superspace cell 600 may evoke multiple subspace cells 620, 640 and 660. These subspace cells are said to have a sibling relationship. Ordinarily each subspace cell 620, 640 and 660 may be executed by a separate thread or processing unit in parallel. Alternatively coupling may be used to designate a serial order for executing the cells. The subspace cells are ordered according to the way they are listed in the branch table of superspace cell 600. Only after the first subspace cell 620 completes execution is the processionist sent to the second subspace cell 640. This process will continue for subsequent coupled cells (640 and 660) until all of the coupled subspace cells have been executed. The exit zone 672 of the last subspace cell 660 will then return to the convergence section 610 of superspace cell 600. Alternatively, only the first two cells 620 and 640 may be coupled. A processionist would not be sent to cell 640 until cell 620 had completed executing. The third cell 660 might be executed in parallel. This process of coupling can thus be used to serialize execution of sibling cells when a certain deterministic order of execution is required (or when multiprocessing is unavailable).

Figure 6B:
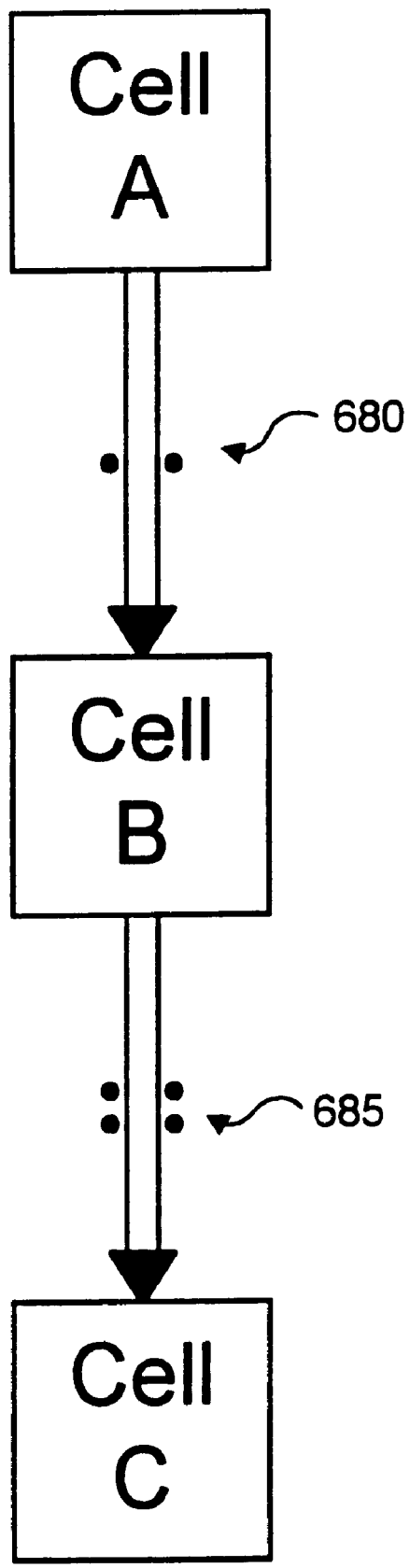

Coupling shall be designated herein using a double lined branch with one or two dots on either side as shown at 680 and 685 in FIG. 6B. A coupling branch with single dots 680 will represent tightly coupled cells. Tightly coupled cells are cells that are specified to remain coupled at all times. The principle purpose of tight coupling is to direct a recessing processionist to a sibling cell rather than having it recess directly to the superspace cell. A coupling branch with two dots on either side 685 represents loosely coupled cells. Cells are loosely coupled if the coupling may be temporarily uncoupled such that the coupled cells may be evoked concurrently rather than serially when extra processors, threads, or other processionists are available. Loose coupling is used primarily for operations that may be processed either serially or in parallel without a significant difference in the results obtained.

A number of basic computational cells may be linked together as described above. A group of cells linked together is referred to as a cell network. When a processionist moves through a cell network, it may arrive at a path selection section of a cell, from which multiple processionists are dispatched in parallel to execute multiple subspace cells, or more generally, multiple cells, some of which may be subspace cells. This process is called "divergence." When a processionist reaches the end of a path (there are no branches to pursue in a cell's branch table), the processionist proceeds to the exit zone and recesses to the convergence section of its superspace cell (assuming no coupling). Some forms of the convergence section of a cell only allows certain processionists to pass through to the next superspace cell (hierarchically "above"). When one or more processionists recess to a convergence section, the process is referred to as "convergence". (More generally, the idea of convergence encompasses also what is referred to as "uncontrolled convergence" which is the arrival of multiple processionists at a node in the cellular network, which is the entry zone of a particular cell.) Typically, processionists diverge (essentially fanning out) through a cell network causing parallel computation to occur in subspace cells. Where the computation is step-dependent, coupling may be used for serialization. As execution in subspaces is completed, the processionists then recess and converge back up the hierarchy. While processionists often converge at the initiating superspace cell (where a desired result is typically compiled), processionists are not required, and are not guaranteed, to recess and converge at the initiating superspace cell. This result depends on design of the network and conditions.

As described above, a cell may include simple branches to any cells including those outside of the immediate subspace of the cell. Unlike superbranches these simple branches do not include a corresponding recession path between the linked cells. A processionist following a simple branch may not recess to the evoking cell. When a simple branch is not expected to lead to recession to the cell where the evoking processionist originated, it is referred to as a wild branch. It may be difficult to determine whether a simple branch will lead to such recession, so a simple branch is presumed to be wild unless eventual recession is apparent. The default type for a simple branch is wild unless a programmer or software tool performing network analysis determines otherwise. Wild branches shall be designated with an arrow with a single line (like a simple branch), but with two pairs of dots on either side instead of a single pair (see 704 in FIG. 7). In addition, super branches that lead to cells having wild branches shall be designated stray super branches, since there may be no recession to the evoking cell if the wild branch is followed thence by a processionist. A stray super branch shall be designated using a super branch bidirectional arrow with a diamond in the middle (see 708 in FIG. 7). The cell to which it points is called a "stray subspace cell."

Figure 7:
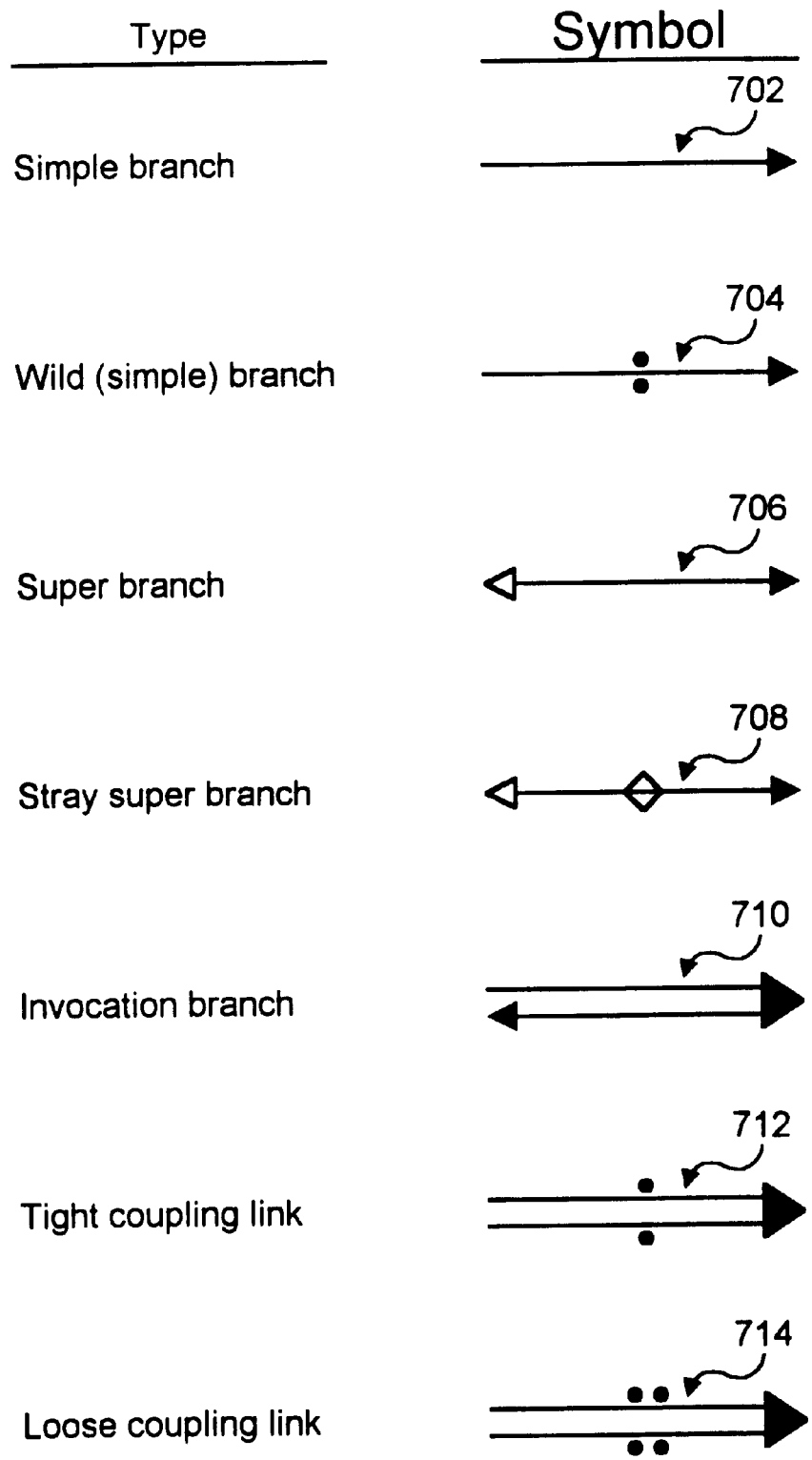
FIG. 7 illustrates symbols used to indicate different types of links used in the first embodiment including branches.

FIG. 7 summarizes the graphical symbols which will be used to represent the various types of branches for the first embodiment. These graphical symbols include simple branches 702, wild (simple) branches 704, super branches 706, stray super branches 708, invocation branches 710, tight coupling links 712, and loose coupling links 714.

The various branches described above allow the cells of the first embodiment to be linked together to perform computation. The superspace/subspace relationship among evoked cells in a network provides a convenient facility for controlling multiprocessing through divergence and convergence of processionists. To a large extent, the behavior of the system of the first embodiment is determined by the arrangement of cells within the above described network of cells as well as the particular types of branches linking the cells. These techniques allow the behavior of the system to be programmed into the system based on the interconnection of cells as well as the executable code contained within the cells.

5. Current Value

The behavior of the system of the first embodiment is also determined by the contents of the output behavioral section of individual cells and the effect it has upon values carried by a processionist through a cell. In the first embodiment, processionists may carry values between cells. Each processionist may be associated with a pointer to a location in memory which holds a processionist's data value. In the first embodiment, for each thread of execution (which is a virtual operating processionist) an address register may be designated for holding a pointer to the processionist's data value.

The value that is carried by a processionist as it passes through the output behavioral section of a cell is called the current value. The processionist enters the output behavioral section with an associated pointer to its current value, which is forwarded along with the processionist from the cell that evoked or invoked the current cell. As the processionist passes through the output behavioral section, the current value may be modified or replaced. At specific points, the current value may also be copied to other memory locations or output devices.

As will be discussed in further detail below, the output behavioral section may include any variety of functional instructions such as invocations of other cells, explicit executable instructions, lineal code to variably build or modify other cells based on run-time information, or references to executable programs of any scope. In this way, the cell structure can be used to encapsulate and organize conventional computational modules in a new way. Such executable code may be stored within the output behavioral section of a single cell, or it may be distributed across several cells in cases where additional advantages can be realized from the cell-based computational system of the first embodiment.

After the current value has been modified or retained by the output behavioral section, it will be forwarded along any branches that are selected by the path selection section. The evocation branches to be considered by the path selection section are listed in the branch table along with conditions that determine when the paths should be followed. The branch table is part of the link table and contains a subset of the forward links in the link table. Invocation and coupling links are not contained in the branch table, but are contained in the link table. Where multiple paths are followed, additional processionists (threads of execution in the first embodiment) must be generated along with copies of the current value (or in cases where the size of the current value exceeds a tuneable threshold, a pointer to the current value). These values are then forwarded along the paths emanating from a cell.

Similarly, values are forwarded back from subspace cells to the convergence section. The convergence section evaluates convergence rules (discussed further below) to determine which, if any, values returned from subspace cells should be forwarded back through the exit zone of the current cell. The selected value(s) is then forwarded back to the superspace cell along the recession path linking the current cell to its superspace cell.

6. Basic Multiprocessing Techniques

As multiple processionists (multiple threads of execution) traverse the network of cells through evocation and invocation, locking techniques must be used to prevent conflicting references to a cell. A system of locks is used to regulate cell references. When a processionist references a cell, it requests a lock for the specific activity it will be performing. There are three classes of locks in the first embodiment: 1. locks for execution (e.g., when a processionist is evoking, invoking or converging to a cell); 2. locks for modification (e.g, when a processionist wishes to store or modify information in a cell); and 3. locks for passive references (e.g, when a processionist reads data from a cell without modifying it). A lock table in the header 301 of the cell keeps track of which locks are in place and which locks can be granted.

Generally a cell can be shared by multiple processionists for evocation. Evocation is stackless and preferably allows cells to be shared to the extent possible. However, some state information may be maintained for the cell and accessible by a processionist that recesses back to the cell. This state information is stored in a "cellFrame" associated with the cell, and can be accessed by any processionists that are part of the same session (in the same "processionist group"). Processionists from other sessions (e.g, generated by another user who is concurrently using the same cell network) would maintain separate cellFrames and are not considered to be in the same processionist group. By maintaining a shared cellFrame with state information, any processionist in the same group that converges back from the subspace can continue executing the cell using the state information stored in the cellFrame. Essentially processionists can drop off cellFrames in a group resource linked list when they leave a cell and pick them up for continued execution when they recess to a cell if necessary. Alternately, the cellFrames can be associated with specific processionists. In such cases, however, the cellFrame is not available to other processionists converging back to the cell. Therefore, the cell has to wait for the specific processionist with the cellFrame to converge before execution could continue.

In contrast to evocation, invocation causes state information to be preserved on a system stack associated with a particular processionist. Each processionist maintains a variable that keeps track of the invocation level (i.e, the number of times state information has been pushed on the stack). When the invocation level is greater than zero (i.e, at least one invocation has been performed), the processionists is referred to as a "stated processionist." This means that the specific stated processionist must be returned from the invocation so the state can be restored from the stack. When a cell is invoked, multiple processionists may be initiated and caused to branch from the cell. Multiple processionists may then converge back to the cell. However, the invocation cannot be completed until the stated processionist converges. The stated processionist must be the processionist that is returned from the invoked cell, so state can be restored from its stack. For this reason, a stated processionist will not be sent on a wild branch (because by definition, it would not be expected to converge back from the wild branch).

In addition to the above techniques, processionist-specific information is maintained by a context block that is associated with each processionist in memory (e.g. via a dedicated address register). Among the processionist-specific information stored in the context block is: 1) a pointer to the current cellFrame being used by the processionist; 2) references to the current value and related data; and 3) routing information for input and output devices.

7. Exemplary Cell Network: Dynamic Filing Tree

Figure 8:
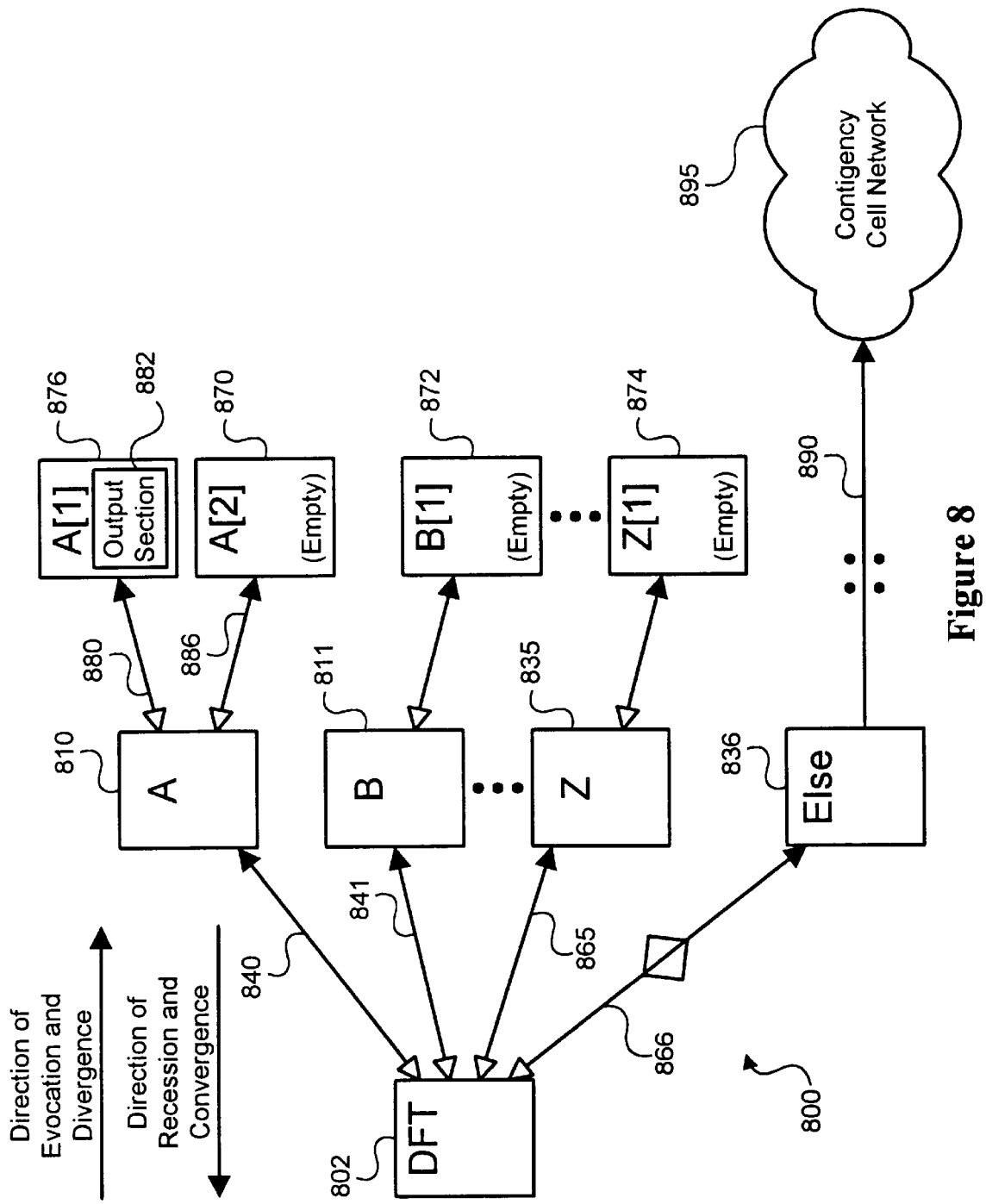
FIG. 8 is a simplified block diagram illustrating an exemplary assembly of cells (a "cell net") according to the first embodiment, having a hierarchical organization.

FIG. 8 illustrates a cell network according to the system of the first embodiment. The cell network, indicated generally at 800, implements a dynamic filing tree. This dynamic filing tree is a simple network of cells used to sort and store strings in itself based on the first letter of the string. While this is a relatively straightforward example, it illustrates several aspects of the first embodiment which have been described above. The dynamic filing tree may be initiated by invoking cell 802 (labeled "DFT") and forwarding a string to be stored in the dynamic filing tree. The string to be stored is associated with the processionist (the thread of execution that traverses cell 802) as the current value using an address pointer to a location in memory that contains the string.

The subspace of the DFT cell 802 contains a cell for each letter of the alphabet (cells 810–835, labeled A–Z in FIG. 8) as well as an additional cell 836 (labeled "Else" in FIG. 8) for strings that do not begin with a letter. Each subspace cell 810–836 is linked with the superspace DFT cell 802 by a super branch 840–866 from the super space DFT cell 802 to the respective subspace cell 810–836. Thus this small network (or "cell assembly") has a hierarchical (or "tree") structure.

The branch table in DFT cell 802 contains the addresses of each subspace cell 810–840 as well as an associated condition for each branch. In this example, the condition for each branch would be that the first letter of the current value (the string associated with the processionist) be equal to the letter for the respective cell. For instance, if the first letter of the string was an "A", branch 842 would be taken to the cell 810 (labeled "A"). Each of the conditions for cells 810–835 (A–Z) would be marked as an exclusive contingency, which means that if a condition is met and the respective branch is taken, no other conditions will be evaluated and no other branches will be taken. Thus, the first branch whose condition is satisfied will be the only branch followed. The corresponding cell 810–835 will be evoked and the string value will be forwarded to the evoked cell along with the processionist. The final entry in the branch table for cell 802 contains the address of cell 836 and the branch is unconditional (which means the branch 866 will always be taken unless one of the exclusive branches to cell 810–835 is taken first). In this way, DFT cell 802 sorts strings based on their first letter.

Each cell 810–835 (A–Z) is initially associated with a cell (870–874) in its subspace. A string may be stored in the dynamic filing tree by placing it in the output behavioral section of a cell (870–874) in the subspace of the cell (810–835) for the respective letter of the alphabet.

This storage operation will be explained with reference to cell 810 (labelled "A") with the assumption that a processionist has entered cell 810 pursuant to a condition on branch 840 with an associated string that begins with the letter "A". The condition for the branch to the first cell 876 (labeled "A[1]") in the branch table of cell 810 will be unconditional so branch 880 will be followed. The branch 880 will then be taken which will cause cell 876 to be evoked. Then a condition for the branch 880 will be modified by an instruction in the output behavioral section of cell 876 to provide that the condition thereafter requires matching with the contents of cell 876, so it will only be taken in the future if the current value is equal to the string that has been stored here upon completion of the present storage operation to the DFT. This condition will be marked as exclusive. A new empty cell 870 will be added to the subspace of cell 810 to be used for future storage, since cell 876 will be used to store the current string. A pointer to cell 882 is returned to cell 810 when the processionist recesses along super branch 880. This pointer will be returned to DFT cell 802 as the processionist recesses along super branch 840. The pointer is returned as the answer to the invocation and then used to store the current value to the output behavioral section 882 of cell 876.

As other strings are forwarded to cell 810, new values will be stored in the preallocated cells 870 and new empty cells will be added for storage. If a string matches a previously stored string, a new cell will not be allocated. Rather a pointer to the previously stored value will be returned. This occurs since the string will match an exclusive condition in the branch table of cell 810 for an existing cell 876 before it reaches the unconditional branch to an empty cell 870.

While a similar dynamic filing tree could be implemented using conventional procedural techniques, advantages are realized by using techniques according to the first embodiment. For instance, since the cells are structured in a well-defined manner, the cell can be dynamically altered in simple ways to greatly modify behavior and accomplish new tasks. For instance, if the strings to be stored are a person's first and last name, the dynamic filing tree may be easily modified to file the string alphabetically under both the first and the last name. The conditions in the branch table of DFT cell 802 would simply be modified to follow a branch if either the first or last name started with the respective letter. For each name, two processionists would diverge from the path selection section of DFT cell 802, and two pointers would be returned to the convergence section of DFT cell 802 and thence to the invoker as a vector. The storage operations based upon the first name and last name would thus occur in parallel using multiprocessing techniques. Thus, the system of the first embodiment can readily support dynamic self-modification and parallel processing.

The dynamic filing tree of FIG. 8 may also use parallel processing techniques according to the first embodiment to handle contingencies without the usual problem that exception handling excludes or diverts the normal completion of procedures. For instance, if a string that does not start with a letter is detected, cell 836 (labeled "Else") may be evoked. The cell 836 may provide desired processing and return a value by recessing back along branch 866 to DFT cell 802. In addition, cell 836 may forward a processionist along a wild branch 890 to another cell assembly 895 for handling contingencies. If DFT cell 802 was invoked, the processionist at cell 836 will be a stated processionist (with state information maintained on its associated stack), and it will not be sent along wild branch 890. Rather, a new processionist will be initiated to follow wild branch 890, and the stated processionist will recess so the stored state can be restored. The new processionist sent to cell assembly 895 will not recess back to the DFT cell 802, but rather will initiate separate processing. For instance, cell assembly 895 may output a message to a system administrator and then recess to a superspace cell unrelated to the DFT. The wild branch 890 may be a branch within the same virtual memory address space as cell 836, or it could be a branch across transmission lines of a network to a cell network on remote equipment. It is an advantage of the system of the first embodiment that the structure and basic operation of cell 836 is the same in either event—the address in the branch table of cell 836 for wild branch 890 is the only thing that changes. Thus, linking computational modules (cells) within a memory space and across a communications network may be accomplished with a consistent structure.

II. Detailed Cell Structure

Figure 9A:
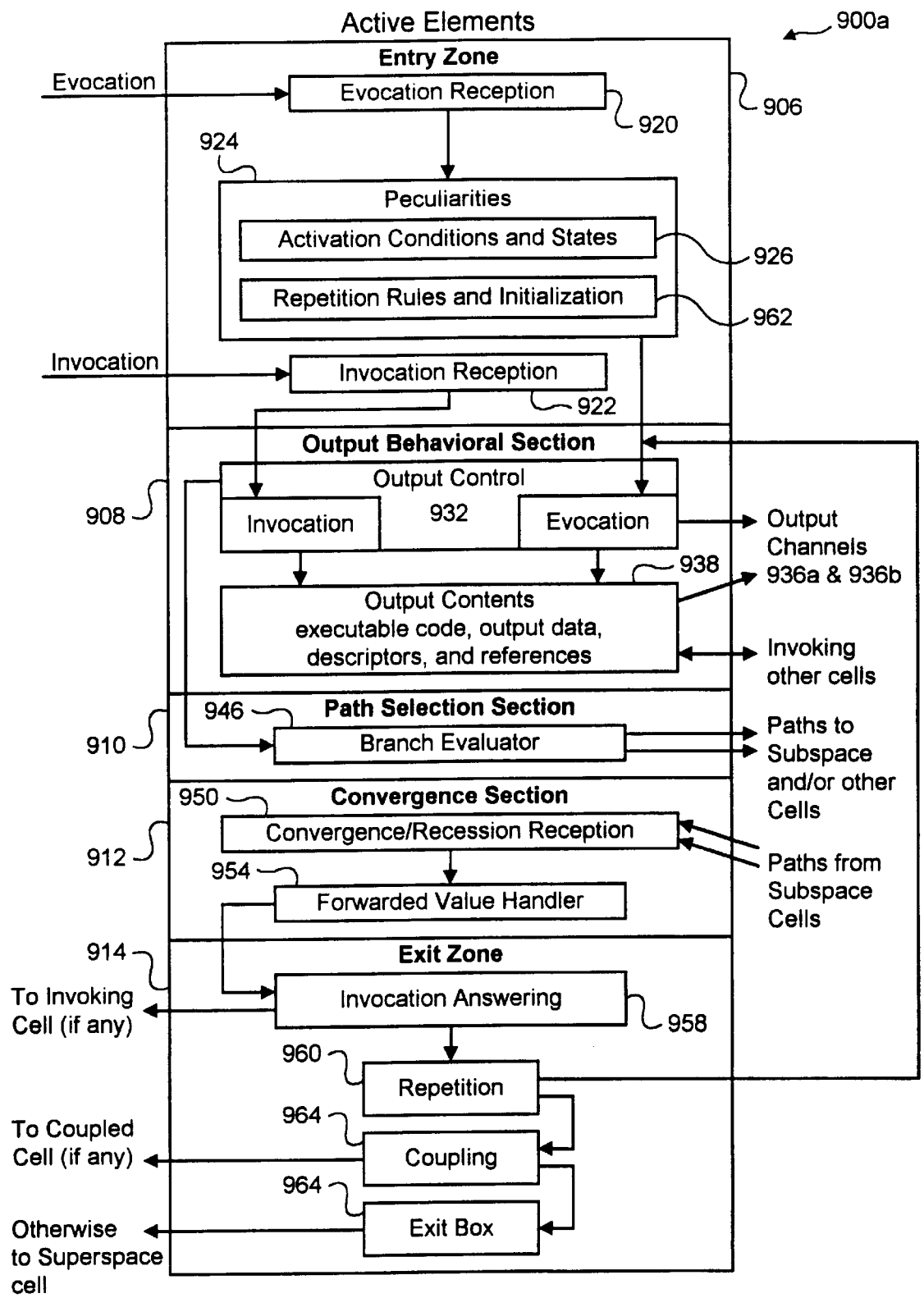
FIGS. 9A and 9B are block diagrams illustrating the structure of a cell according to the first embodiment.
Figure 9B:
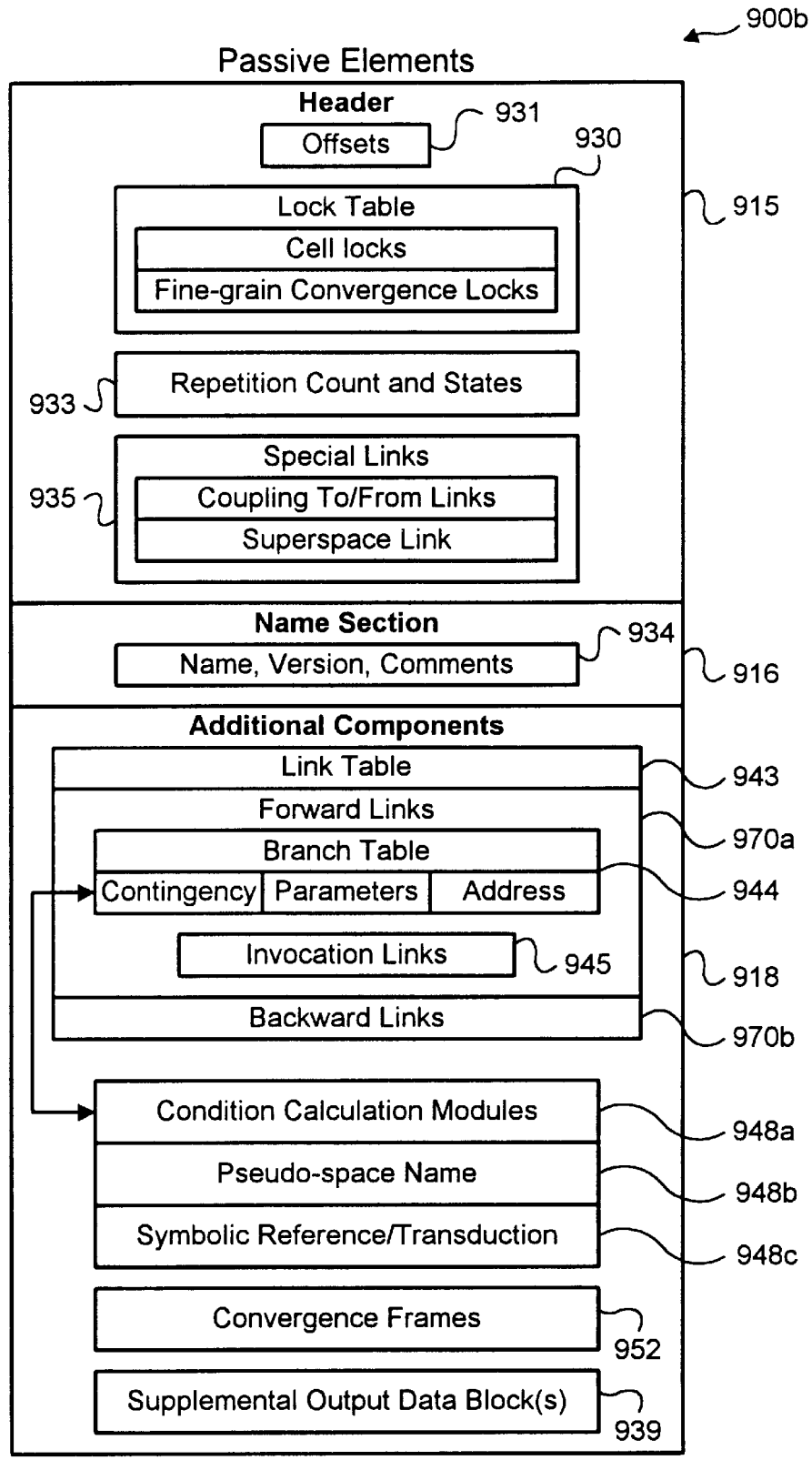

The operation and structure of a cell according to the first embodiment will now be described in further detail. FIGS. 9A and 9B illustrate the detailed structure of a cell, generally indicated at 900a and 900b (collectively "cell 900"), according to the first embodiment of the present invention. It will be readily understood by those of ordinary skill in the art that this structure is arranged in memory 108 as part of the virtual address space of computer system 100. Referring to FIGS. 9A and 9B, the elements of cell 900 may be classified as active elements 900a (set forth in FIG. 9A) and passive elements 900b (set forth in FIG. 9B). The active elements include executable code which defines the actions taken by a processionist as it passes through the cell. The active elements include the entry zone 906, the output behavioral section 908, the path selection section 910, the convergence section 912, and the exit zone 914. The passive elements include conditions, variables and other data used by the active elements to guide a processionist through the cell by evaluating branch conditions, generating output, and the like. The passive elements include cell header 915, name section 916 and additional components 918. While the specific structure of a cell may vary among embodiments, what is desired is a set of active elements that may be broadly and consistently applied throughout a system (although it will be understood that some cells, while consistently structured, may be scaled down and not include every element) and yet be robust enough to incorporate all of the behavior necessary for integration into the system. What is also desired is a well-defined structure for both active and passive elements so their contents may be dynamically altered to modify a cell's behavior.

The structure and operation of each element of cell 900 will now be described. The active elements will be described in the order that they would be encountered by a processionist passing through the cell. The passive elements will be described in conjunction with the active elements that use them.

1. Entry Zone and Activation Conditions

A cell is referenced by using its cell address (i.e, lowest numbered location in the virtual memory location of this cell). At a standard location relative to this starting address is a table of offsets 931 in the header 915. The offsets 931 can be used to determine the address of each entry point and section of the cell 900. Locks in lock table 930 are checked to determine whether a processionist can enter the cell. If a lock state that precludes evoking exists, branching to the cell will be suspended until the lock is cleared. The locks may include whole cell locks which prevent processionists from entering the cell and fine-grain convergence locks which protect state information related to certain types of convergence and recession. These locks are described in detail in Section III.4 below with reference to Tables 4 and 5.

In the first embodiment, a processionist effectively enters the cell when the program counter of CPU 102 is loaded with an appropriate address within the cell. The CPU 102 then begins executing active elements within the cell. The address at which a cell's execution begins depends upon whether the cell is being evoked or invoked. The entry zone 906 has two entry addresses, an evocation reception address 920 and an invocation reception address 922.

The entry zone 906 also includes a peculiarities section 924 which may include activation conditions and states 926 for determining whether a processionist evoking the cell should be able to activate the cell as well as repetition rules and initialization 962. The activation conditions 926 may be evaluated to determine whether an evoking processionist may activate the cell (i.e, proceed past this section). Several types of activation conditions may be evaluated, including threshold conditions, modulators, and latency periods. Threshold conditions count the number of processionists that enter the cell. The processionists are extinguished (that is each thread of execution is terminated) or forced to exit the cell (without termination) until a certain number, n, has been reached. The nth processionist is then allowed to proceed in the cell. Threshold conditions may also count based upon quantum numbers carried by processionists in their current value or may only allow processionists to enter the cell if their current value meets a condition (for instance, its current value is a number greater than some threshold number). A modulator is essentially an infinite threshold condition that extinguishes processionists (or forces them to exit the cell) as long as the modulator is on. Whether the modulator is on may be determined by a binary switch in the activation conditions 926 or by reference to an external condition (i.e, system clock). Latency periods are conditions that regulate access to the cell based upon a period of time since the cell was last activated by a processionist.

Unlike activation conditions, cell locks apply to both evoking and invoking processionists. Before a processionist enters the cell, it may place a lock on the cell which prevents other processionists from entering the cell to avoid conflicts. Alternatively, the processionist may place a conditional lock on the cell, so only certain processionists can enter the cell. The locks are typically removed when the processionist branches from the cell. Prior to entering the cell, a processionist may place its lock or conditional lock in lock table 930 in the header section 916. These locks essentially act as semaphores for a cell to avoid collisions. Processionists that are locked out of the cell wait until the lock is lifted before entering. However, in contrast to processionists ejected from the cell or terminated due to an activation condition, processionists waiting for a lock should eventually be allowed to proceed.

Later, after all processionists have proceeded from a cell on all eligible branches (as determined by the path selection section), generally locking persists only if either: a) controlled convergence according to certain convergence rules is expected, or b) the cell has a potentially private active repetition section (see Section II.5.2 below) which may cause the current processionist(s) to loop back through the cell and repeat its behavior. Otherwise the cell is unlocked as soon as the last branch is taken. This allows the rest of the cell to respond to evocation and do everything up to branching in the path selection section (which is the first action that affects the non-reentrant convergence state). In alternative embodiments, all cells (or some cells) could be designed to be completely reentrant. Generally, exclusive locking is required only to the extent a cell is not reentrant. Cell locking is described in detail below in Section III.4.

It will be noted that multiple processionists may branch to the entry zone 906 at the same time in a multiprocessing system. Thus, access to offsets 931, entry zone 906, and lock table 930 are controlled by semaphores or other conventional multiprocessing mechanisms. Thus, multiple processionists may attempt to enter a cell, but actual entry will depend on the cell locks, and be sequenced. Note, however, that in most cases parallel, shared evocation of a cell is allowed. However, the sequencing can be as rapid as few instructions of the host processor, and does not usually prevent the cell from being shared by multiple processionists (the cases where the cell cannot be shared are the stated 1) certain forms of parallel convergence; and 2) private looping constructs).

Figure 10A:
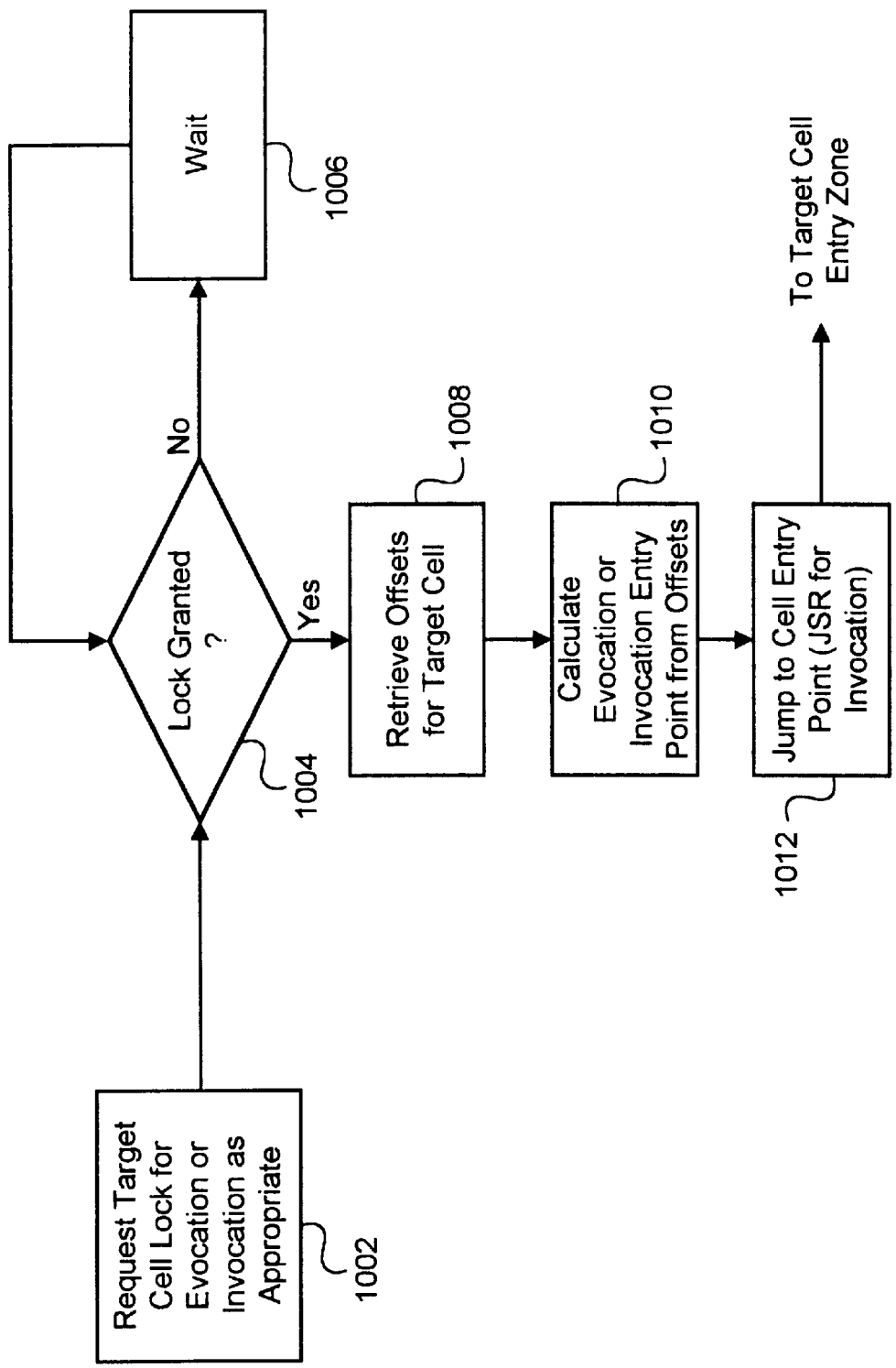
FIGS. 10A and 10B are flow charts illustrating the process of branching into the entry zone of a cell according to the first embodiment.
Figure 10B:
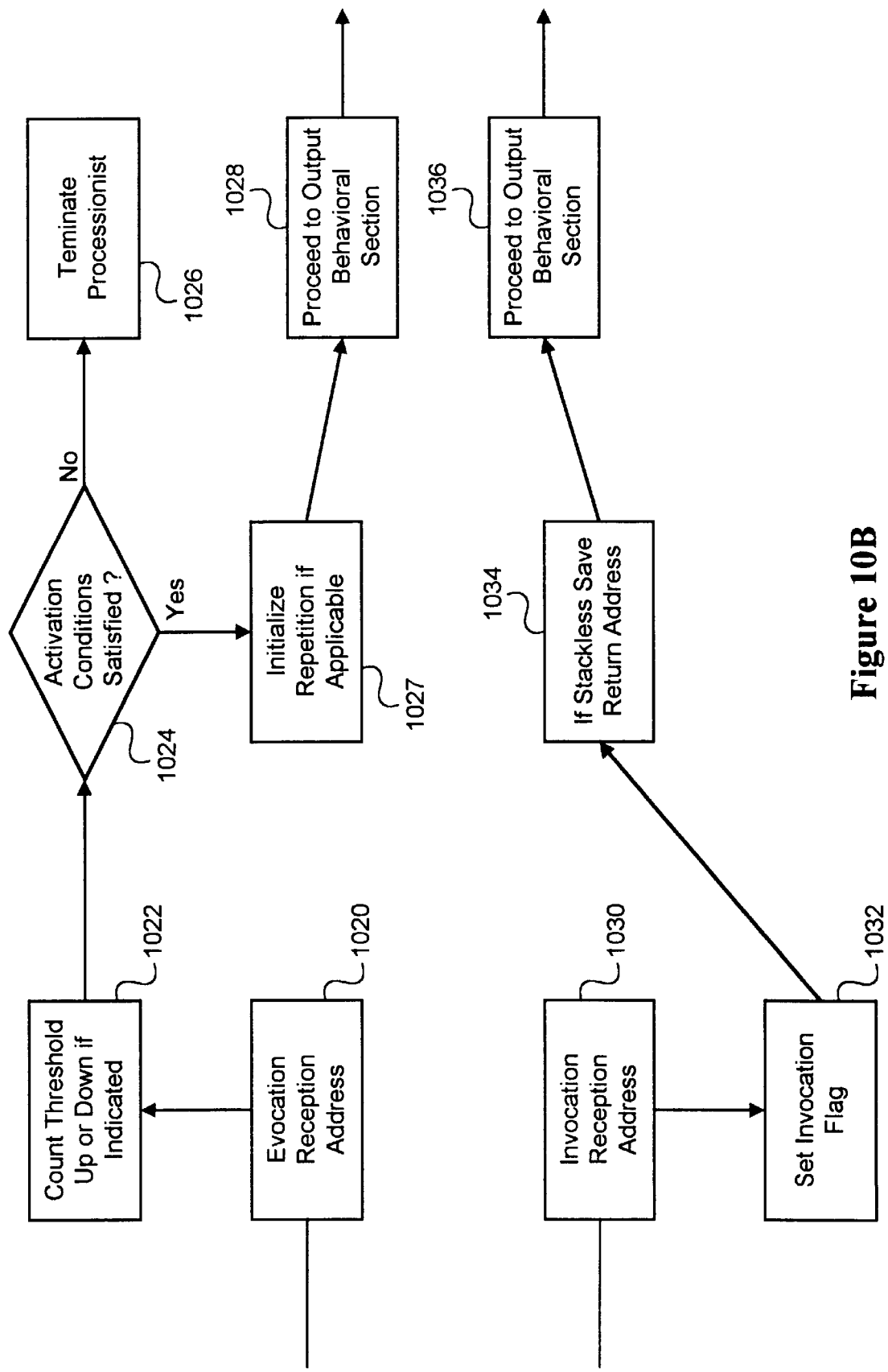

FIGS. 10A and 10B are flow charts illustrating the process of branching into the entry zone 906 of cell 900 in the first embodiment. When a processionist wishes to evoke or invoke another cell (the "target cell"), it first retrieves the address of the target cell from the current cell. The starting address is the address of the header section 915, and the contents of the header section are at known offsets from this starting address. Using this address, the processionists requests a lock for evocation or invocation as appropriate via lock table 930 (as indicated at step 1002 in FIG. 10A). If the lock is not granted (as determined at step 1004), the processionist places its process ID and thread number in a wait queue for the cell and goes dormant to save processor cycles (as indicated at step 1006). When a lock is being removed by a processionist that holds or shares a lock on the cell, it determines whether a lock can be granted to any of the processionists in the wait queue in order. If the requested lock can be granted, an operating system message is sent to the dormant processionist to awaken it and grant the lock. Once a lock is granted, the processionist retrieves offsets 931 for the target cell from the header section 915. In particular, the processionist retrieves the offset to the evocation reception address 920 for evocation and to the invocation reception address 922 for invocation. The address of the appropriate reception address is then calculated as indicated at step 1010, and the processionist jumps to the appropriate reception address (step 1012). It will be understood that a stackless jump is used for evocation, while a stacked jump (e.g. JSR) is preferably used for invocation to save the return address and current state on the stack.

An evoking processionist starts execution at the evocation reception address 920 as shown at step 1020 of FIG. 10B and a cellFrame is created for the processionist. A threshold count may be incremented or decremented as appropriate if a threshold condition is being used to control access to the cell (step 1022). The activation conditions 926 are then evaluated as shown at step 1024. If the activation conditions are not satisfied, the processionist is terminated as shown at step 1026. Once (and if) activation conditions are met at step 1024, the processionist sets any repetition count or conditional at step 1027 (which determines whether the processionist will loop through the cell more than one time) and proceeds to the output behavioral section 908 as indicated at step 1028. The processionist then proceeds to the output behavioral section 908.

When an invoking processionist enters the cell, it starts executing instructions at the invocation reception address 922 as shown at step 1030 and a cellFrame is created for the processionist. As shown at step 1032, a flag is set in the processionist's cellFrame to indicate that this is an invocation as opposed to an evocation. The return address for the invocation may also be stored if it has not already been pushed on the system stack for the current thread of execution as indicated at 1034. The invoking processionist then proceeds to the output behavioral section as shown at step 1036.

In both invoking and evoking, after passing through the entry zone 906, a processionist executes the output behavioral section 908. The behavior of the output behavior section 908 differs slightly for evocation and invocation as indicated by the separate paths shown in FIGS. 9A and 10B. However, it will be understood that the same code may be executed in large part and that the different functionality may be triggered by checking the invocation flag where appropriate. The output behavioral section 908 contains data and executable code for output and behavior as shown at 932. This may reference other cells, system variables, input sources, and additional blocks of data stored elsewhere in the cell (such as 949 FIG. 9). The output and behavior that may be specified is extremely broad.

2. Output Behavioral Section and the Current Value (Evaluation Space, Current Value, Current Value in Progress, Lineal Code, Data Units)

Figure 11:
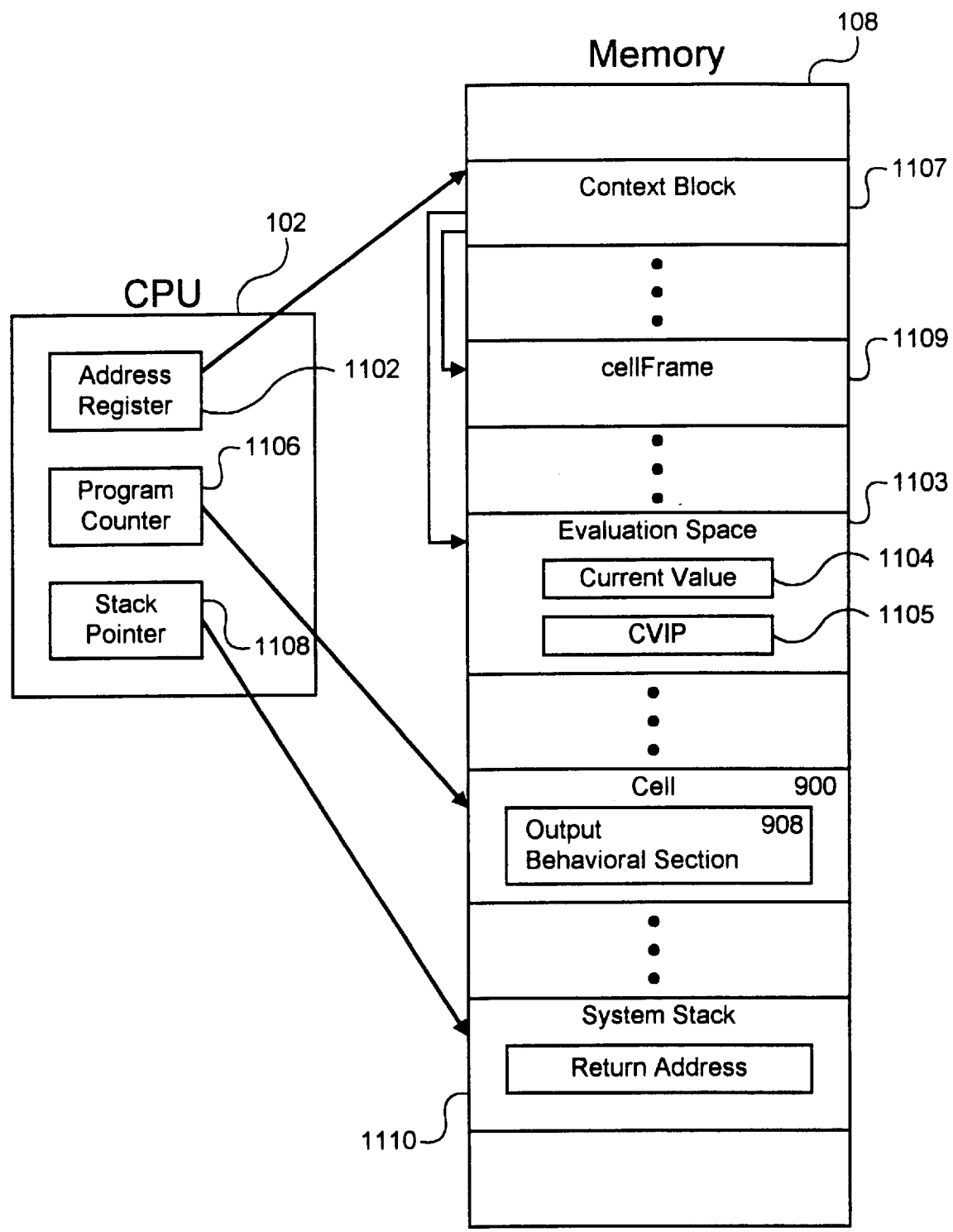
FIG. 11 is a block diagram illustrating the relationship of a processionist, a processionist's current value and a cell according to the first embodiment.

One of the main functions of the output and behavioral section 908, is to modify the current value of a processionist. As described previously, the value carried by a processionist through a cell is referred to as the current value. The processionist enters the output behavioral section carrying its current value from the respective evoking or invoking cell. FIG. 11 illustrates an invoking processionist carrying a current value 1104. As shown in FIG. 11, a processionist represented by CPU 102 in FIG. 11, contains an address register 1102 referencing the processionist's context block 1107 which in turn references an evaluation space (ES) 1103 in memory 108. The context block 1107 also references the cellFrame as shown at 1109. The ES 1103 contains the current value 1104 as well as space allocated for modifying the current value. The space allocated for modifying the current value is referred to as the current value in progress (CVIP). The program counter 1106 of the processionist points to the output behavioral section 908 of cell 900. The executable code in the output behavioral section may operate on the current value by using the address pointer 1102. Since in this example CPU 102 (or a thread of execution for CPU 102) is invoking cell 900 instead of evoking it, a return address has been stored. A stack pointer 1108 points to the system stack 1110 which contains the return address.

Thus, by using address register 1102, the current value of a processionist may be retained, modified or supplanted as it passes through the output behavioral section 908 of cell 900. All modifications are made to the CVIP and then at the end of the output behavioral section 908, the current value 1104 may be deallocated and replaced with the CVIP. See Section III.5.4 below for additional information as to how the current value is modified.

In the first embodiment, if the output section was never specified, the name of the cell as stored at 934 in name section 916 is set as the current value. Otherwise the output behavioral section consists of a sequence of executable code and data that can modify the current value, or supplant it with a new value, and there may also be additional code that does not affect the current value. Data may be output on output channels as indicated at 936a and 936b in FIG. 9. Output channels may have a standardized format similar to sockets in UNIX. An output channel receives data and a descriptor from which the system determines how to handle the output. For instance video data may be sent to an address for a video monitor with the type set to a value indicating the type of video data. The output channel will then process the data appropriately. In this way multiple cells may share output resources and each cell need not contain separate code for processing the various types of data.

At various points in the output contents 938 of the output behavioral section, data found or generated there may replace or modify the current value, and in some cases be sent to the standard output channel (or a specified output channel), or stored into the (corresponding) output contents 938 of a different cell. Output contents 938 consists, in general, of a sequence of (i.e, one or more) items, each of which may include operational code, data and references to other cells (by invocation). In addition, there may be internal references to supplemental block(s) of data 939 (e.g. within 918 in FIG. 9B). While the range of behavior and output is virtually unlimited, one cell might, as an example, output a personalized video clip to a user's screen any time the cell is activated. The current value of the processionist upon entry might be a user's customization choices for displaying the video clip. The data in the cell may include the actual video clip as an encapsulated media object. The output behavioral section might customize the video clip according to the current value and then send it to the appropriate output channel. A user-customizable video game could be implemented by linking a network of such cells together.

Figure 12A:
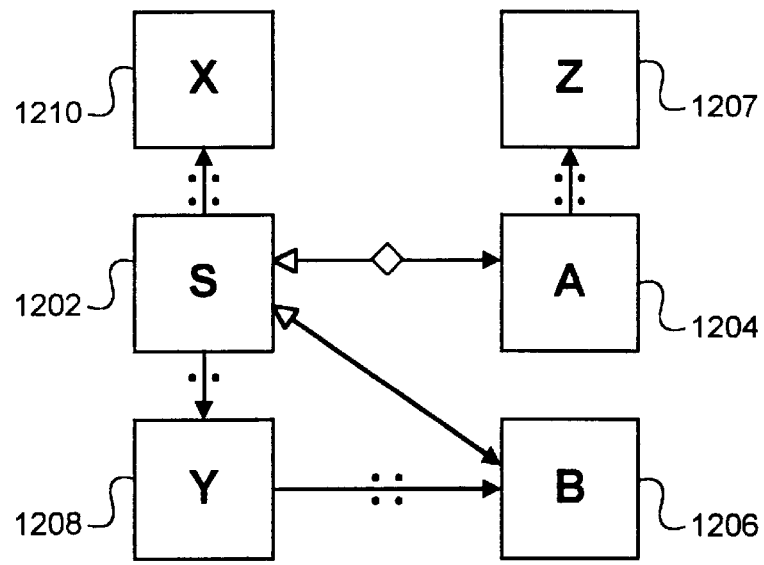
FIGS. 12A–12B illustrate equivalent representations for an assembly of cells according to the first embodiment.
Figure 12B:
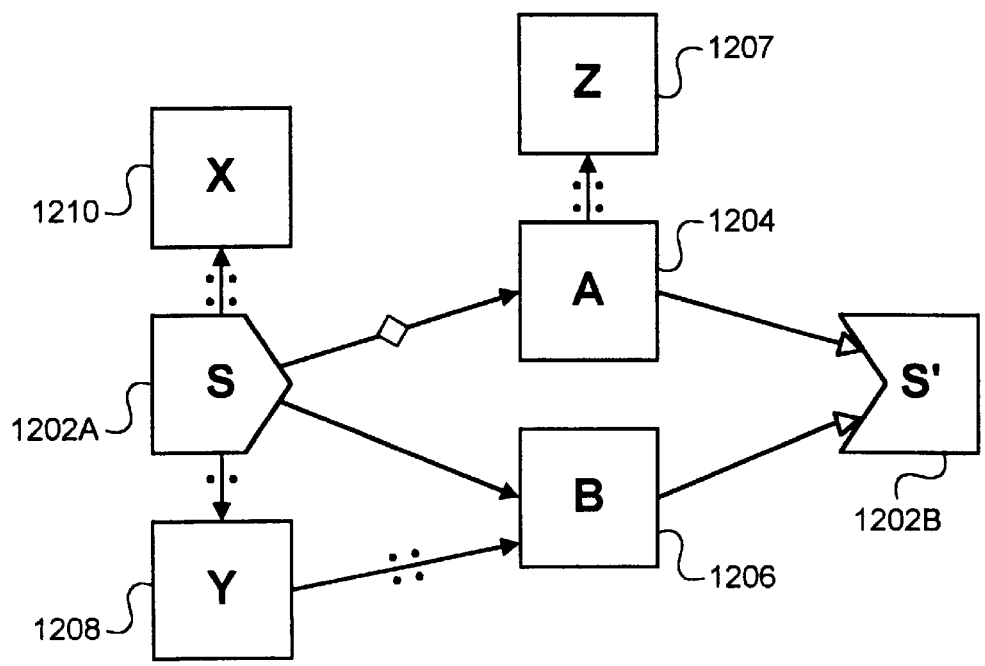

While the output contents 938 of the output behavioral section may be limited to a single item of a specialized type (such as a data structure or media object), it also may be a sequence of any number of items. When displayed for editing, the sequence is cast in the form of lineal code consisting of textual characters, plus optionally, icons representing such things as media objects which are non-literal. Certain sequences of lineal code provide for the prescription of new cells, the interconnection among groups of cells, and the modification of existing cells or the linkages between them. Thus, lineal code may be used in the output behavioral section 908 to modify portions of the current cell or to create new cells or networks of cells in the subspace of the current cell or at a specified point in the network. For instance, FIG. 12A illustrates a cell 1202 (named "S") which has stray super branch to cell 1204 (named "A") and a super branch to cell 1206 (named "B"). Cell 1204 (named "A") has a wild branch to cell 1207 (named "Z"). In addition, cell 1202 has an ordinary branch to cell 1208 (named "Y") and a wild branch to cell 1210 (named "X"). Cell 1208 (named "Y") also has a wild branch to cell 1206 (named "B"). FIG. 12B illustrates the same cells in a manner that shows the order of execution. Cell 1202 ("S") is shown as segregated into two portions 1202A and 1202B (labeled S and S'). Portion 1202A represents the entry zone, output behavioral section, and path selection section of cell 1202. These sections are executed before branching to any subspace cells. Portion 1202B represents the convergence section and exit zone which are executed after the subspace has been executed. This network of cells can be specified using a linear textual code. The code specifies the top level cell (cell 1202 "S") as well as all of the branches in its branch table and the names of the cells to which it may branch. Each cell is enclosed in brackets. Cells in the top level cell's subspace (cells A and B) are also set forth in sets of brackets. Cells that are not in the subspace are defined on subsequent lines.

Table 1 lists lineal code that specifies the network of cells in FIG. 12. The open brace on the first line of Table 1 indicates the beginning of a cell. This is followed by the cell name "S". The remainder of the name section including activation conditions and other "peculiarities," and then the output behavioral section may further be specified as described in Appendix A. This corresponds to the first half of the cell (such as portion 1202A) which is executed before branching. Brackets indicate a subspace cell including the branch to it which is a superbranch, while those with a colon indicate a regular branch, or a double colon indicates a regular branch that is wild. The "^" symbol indicates a stray subspace. After all subspaces and pseudo-spaces (indicative of branches that are not subspaces) have been specified (but before the closing brace for cell "S"), the rules of the convergence section and results forwarding may be specified. This corresponds to the second half of the cell which is executed upon recession thereto (such as portion 1202B). The last brace on line 1 of Table 1 indicates the end of the specification for cell "S". The exit zone is implicit and is part of each cell. The "S" after the closing brace is an optional repetition of the cell name to clarify which braces match up; it does not represent any contents of the cell.

TABLE 1

| | |
|---|---|
| {S {A {::Z} } {B} {:Y} {::X} } S | This specifies cell S, its subspace cells A & B, and other branches to X, Y, Z. |
| {Y {::B} } Y | This specifies cell Y and its branch to B. |
| {X} | This specifies cell X (no subspace or branches) |
| {Z} | This specifies cell Z (no subspace or branches) |

Thus, lineal code can be used to represent a network of cells. In addition, a structured format may be used to indicate the contents of each cell. For instance, the specification of the name section, output behavioral section, and branch table of cell S would be listed at the first "S" in the first line of Table 1. The specification of the convergence section of cell S would be listed prior to the final brace in the first line of Table 1. The actual format for listing a cell's specification is discussed further in Appendix A, which is incorporated herein by reference. However, it will be readily apparent to one of ordinary skill in the art, that subnetworks of cells may be specified in detail in the output section of a cell and passed as a current value in lineal code and then expanded and added to a network of cells at a desired location. Thus, the system is dynamically modifiable in flexible, convenient and powerful ways. A global cell builder module may be shared by multiple cells and used to expand the lineal code into an executable cell. The cell builder will be described further below. In addition, lineal code commands (described further below) may be used to store values in a cell or replace sections of a cell with new variations. Thus, cell components, such as the activation conditions, or branch table may be modified by the output behavioral section of the same or another cell. Since, a cell has a well-defined structure and operation, this allows further dynamic self-modification of the system. (Note that in the current embodiment instructions in the output section of a cell may not be used to modify that output section of that same cell.)

As is apparent, the range of output and behavioral items is quite wide, and encompasses executable code that may include invocations of other cells, expansion of lineal code, explicit lineal code commands, or references to executable programs of any scope stored in memory. Any of these items may modify the current value and may generate explicit outputs. The last or only explicit output will be suppressed from actual outputting if the cell was invoked. This allows a cell's behavior or output material to be used via invocation without necessarily causing the cell's output. Rather, the last value is returned as an answer to the invocation.

After the output behavioral section has completed modifying the current value, the processionist then proceeds to the path selection section 910 where the processionist may branch to the cell's subspace cells and/or other cells. If there are multiple branches, multiple processionists (threads of execution) may be created to follow the branches in parallel. The current value can be copied into memory or tagged with a reference header and thereby read-only shared by multiple processionists as a current value for each new processionist so that it may be carried by the processionist to the appropriate cell. To clarify context, the current value may be referred to as a forwarded value when a processionist carries the value from one cell to another for purposes of convergence and recession. Alternatively, if the current value is larger in storage requirements than a selected threshold size, a pointer to the current value may be used as the forwarded value for the processionist.

In a sophisticated implementation, the current/forwarded value may comprise complex data units. In addition, it may comprise vectors of such data units. This may be desirable where multiple values are returned from the subspace. The convergence section may assemble the values into an ordered set of values which may be used as the forwarded value for a processionist that exits the cell. The representation of a value includes a descriptor that provides the information sufficient for proper handling and expression of the value, whatever its type or structure. Of course an implementation may be specialized for a particular role and optimized for speed or economy or a specific embodiment utilizing technology less general than a computer, in which case values may be restricted to relatively few and simple types.

A current value may also be real or virtual. A current value that is virtual contains a definitive description of the data, whereas a real current value contains the data in literal or iconic form. For operation in real time or relative to other concurrent threads (processionists) implementation decisions include the extent to which the current value, as maintained from moment to moment, will be "real" or "virtual"—that is to say, at which moments must the current value implementation be present as finalized data suitable for output or storage into a cell, versus present in the form of a representation of the required assembly of its several constituents which may include protracted references to cells and other data sources that may change in the interim between the generation of the reference and the final acquisition of the data. Options include: requiring the current value to be real at every step of current value formation and modification; requiring this only at the finalization of the output section (where the CVIP becomes the current value); or reducing the current value to real form only at the point of operations requiring disposition of the data through final outputting or storage. Note that data under consideration may include sequences of like or dissimilar data types, which may include units with inherent internal parallelism, such as, for example, synchronized audio-visual tracks. These decisions may be influenced by implementation-specific considerations of the economy of copying data elements (of various size) to preserve them against change, versus locking of the original (in a cell, etc.) against change while the reference is pending in a virtual current value representation. Thus the decision to carry such a protracted reference to a cell's contents in the current value may be automated under a size criterion, with locking of the original against change during pendency.

More generally, a decision may be made, in each application or instance, whether a protracted reference is intended to refer to the state of the data at the moment the reference is generated versus at the later moment it is utilized, at which time it may be different. Maintaining a current value (or particular elements of it) as virtual for as long as possible has two advantages: (1) to postpone possible conflicts over access until access is available, or else to the last possible moment; (2) to allow bulky items to remain packaged or compressed until and unless actually needed to be internally processed or output or stored in their real form.

When a processionist enters a cell carrying a value, the value is carried through the cell and may be modified in the output behavioral section, replicated for new processionists in the path selection section, and replaced, forwarded or discarded in the convergence section. The value will be passed along branches taken by the processionist from the cell, or will recess with the processionist if none was taken. And if branches were taken from the cell to cells that eventually recess and converge back to the cell, the values(s) returned from those cells will recess back to the convergence section of the cell where they may be assembled into a new current value at that point.

Answering from an invoked cell and recession from an evoked cell may be contrasted. If the cell is evoked, and recession from it eventually occurs, the processionist will recess carrying the value it had when it reached the exit zone. On the other hand, if the cell was invoked, and it eventually answers, it will answer with the processionist carrying the value it had when it reached the exit zone. In either case, this value will be—if the cell had branches that were taken and converged (or one that simply recessed) to the cell's convergence zone—the value returned from the most recently recessed processionist, or otherwise that selected by the convergence and result forwarding rule if any.

Consequently, an invoked cell answers with its current value determined by its final or only output item, or by the result from convergence from its subspace cells, if any. In any event the cell's final or only output item is suppressed from outputting if the cell was invoked rather than evoked, so that the final current value can serve only as an answer to the invocation. This is indicated by the separate output control 932 sections for invocation and evocation. For invocation, the output contents 938 is executed and the processionist proceeds to the path selection section 910 without outputting any final result. For evocation, the output section 938 is executed and then the evocation control outputs the result on output channel 936*a*. Then the processionist proceeds to the path selection section 910.

Items in the output section are classified as those that yield an output and replace the current value or contribute to the current value in progress (CVIP), and those that do not. For outputting items, the result of the item is output via the prevailing standard output channel, unless it is directed elsewhere (i.e, stored) or suppressed explicitly or by virtue of being the final current value used for answering an invocation. The form of the output depends on the type of the value, and standard channels may be explicitly redirected to nonstandard channels. Common outputs which may be handled in this way include: a number or a body of text directed to a text window, terminal or printer; a graphic image directed to an appropriate display; a digitized acoustical signal directed to an appropriate speaker or telephone line; an audio-video animation or performance directed to an appropriate receiver. As an item executes, it contributes to the CVIP and may also cause the current value to be replaced. If the item is beyond a certain size or complexity (or if, when and as explicitly elected) the CVIP (and later the current value) will actually carry a definitive description of the item rather than its contents, leaving the assembly of the completely "expanded" output to be performed at "the last possible moment"—that is at such time as it is actually required for outputting, display or storage in its literal or iconic form.

Items yielding output may be, incorporating the above: a numerical calculation, line of literal text, or concatenation of such things; a reference to a cell by invocation, or a formula including such references along with any literal or numerical values combined by arithmetic operations or conjunctions; other kinds of references such as to an input source, data file, signal stream or buffer or telecommunications switch, external computer or reference to a different cellular network; any concatenation of these or formula of these combined by arithmetic operators or conjunctions or storage operations or redirection. However if the sequence terminates in a storage operation followed by a cell reference invoked as a destination, the output effect of the entire item is suppressed, although the overall result in any event replaces the current value.

Items not generally yielding output or replacing the current value include: direct commands, allowing that these may in certain instances explicitly command replacement of the current value; metaprogrammic commands, being symbols to be replaced by series of instructions or operations implementing their stated effect; comments; coherent sequences of machine language instructions (operable on the host computer processor implementing the virtual processionists), references to display files not handled by standard output channels available to cells, or references to external programmatic units which direct their outputs elsewhere. It is also electable to dedicate the output section in its entirety to a single item, such as a number, string of text, array or other conventional data structure, "performance unit" (such as a synchronized audio-visual program, stereophonic sound, parallel multilingual presentation, or concatenation of different modalities). Units which would monopolize the output section of a single cell, and probably direct their outputs or other behavioral consequences elsewhere than to the standard-cellular output channels, might include computer programs, operating systems and programming environments.

In addition to the current value, "riders" on the current value may be implemented that follow the same course as the current value as it is carried by the processionist. The rider serves to preserve certain special values against change as the current value gets changed by items in the output behavioral section. The rider receives the new value of current value whenever the current value gets a new value as a result of a reference to an entity outside the cellular network, such as a data file or stream, message packet, external computer, message system or telecommunications switch.

Generally for a rider, a reference is carried rather than the contents (which need not be accessed, copied or unpacked until actually need to be used.) Consequently the most recent such reference is carried by the processionist and propagated among various cells evoked regardless of other changes in the current value within the output sections of any of those cells, or in convergence. By this facility a reference to a file, message packet or data stream entity may be routed from cell to cell until arriving at a particular cell where a disposition of its contents is to be accomplished, thus effectively conducting the package or stream to a destination determined by the movement of the processionist in the cellular network. The entity itself and its contents is not altered by this operation, and the ultimate destination may be outside the network of cells.

3. Path Selection Section and Branch Evaluator

After completion of the output behavioral section, the current value (as perhaps modified) is maintained as the processionist enters the path selection section 910. The path selection section determines which cells will be evoked by the current cell. A branch table 944 (which is part of the forward link table 970a) contains all of the possible evocation paths from the current cell. Each entry in the branch table 944 contains a contingency specification referencing a conditional statement (if applicable) which is evaluated to determine whether the path should be followed, branch parameters (including type), an address of the next cell on the path, and a registration section for recording the identification of the processionist sent down the path. A branch evaluator 946 traverses through each entry in the branch table 944 to determine which paths should be followed and to initiate new processionists (threads of execution) to follow the paths if necessary. The additional components 918 may also contain variable length information for each entry in the branch table 944 as appropriate (indicated at 948a, 948b, and 948c). This variable length information may include a condition calculation module 948a containing information to be used by the branch evaluator to evaluate the conditional statement for a particular branch, the name of the pseudo space name 948b (if any) that may be associated with a branch that is not to a subspace cell, and a symbolic reference or transduction code 948c for branching to a cell that is not to a virtual address in the same cell clump. The symbolic reference/transduction 948c is important for branches requiring more than a memory jump command (i.e. a branch across a computer network or other heterogeneous technology). For instance, to branch across a communications network, the address of the cell (the symbolic reference) would include the network node address as well as the identification of the particular cell at that node. The transduction code would cause the processionist to send an appropriate network packet to the appropriate node and then terminate (thus transducing the processionist from a thread to a packet). The receiving node would receive the packet and initiate a new thread and send it to the specified cell.

3.1 Overview of Branch Evaluator

In the first embodiment, the branch evaluator 946 is implemented as code that may be shared among multiple cells in the system to avoid redundancy. The branch evaluator 946 is preferably reentrant code external to the cell (although for illustrative purposes it is shown within 910 in cell 900 in FIG. 9). Each time a processionist traversing a particular cell reaches its path selection section 910 the cellFrame is used to keep track of information specific to the operation of the branch evaluator for the current cell. Among other things, the cellFrame stores the current cell's address as well as a pointer to the current value, and indices into the branch table 944 used for branch evaluator operation.

Because the branch evaluator is informed of which cell it is subserving (or located in, in the case of individual copies in each cell), as well as the identify of the other cells to which it is dispatching procession(s) from the cell, a minor enhancement of the branch evaluator (such as a JSR to a special routine) would enable the position of a processionist to be posted each time it traversed a cell, and then a concurrent process could easily create a copy as soon as a processionist has passed through each such cell, thus creating a personalized copy of a subdivision of a network frequented by a particular processionist, which might represent the interest of a particular user.

The path selection section 910 allows the system of the first embodiment to achieve unification of parallel and serial constructs and methods through a generalization of contingency branching, followed in appropriate instances by controlled convergence. Essentially, the operation of the path selection section 910 is specified such that a processionist may diverge from the cell on a subset of its branches in the branch table. By this principle, concurrent activity may be engendered and maintained for as long as desired; or alternatively, activity may be restricted to a choice of a single path among several, or none of them.

If one or more branches project from a cell (i.e, in the branch table), then depending on the existential situation when the processionist reaches the path selection section 910 of that cell, the processionist may follow one or more of these branches, according to the selection rule implemented in the branch evaluator 946. The existential situation dictates whether the conditions for each branch will be evaluated true at the moment of branch selection. If none of the conditions in the branch table 944 evaluate to true, then no branches are taken and the processionist goes to the cell's exit zone 914.

Each branch in the branch table 944 has an explicit or implicit condition that must be evaluated to determine whether the corresponding path should be taken. A branch may have a condition that depends upon an explicit comparison of values or on an implied comparison with input or truth. If there is no express condition, then the branch is implied to be unconditional. A path may also be designated as blocked, in which case it will not be followed under any circumstance. Express conditions may be specified as mutually exclusive or as nonexclusive. Those that are unconditional are inherently nonexclusive.

The selection rule implemented by the branch evaluator 946 selects every path with a satisfied condition or no condition; provided, however, that if the branch table 944 contains a condition that is exclusive and satisfied (i.e. it evaluates to true) then only the first of these exclusive conditions satisfied is selected (so that no other paths are followed).

If there are no exclusive conditions that are satisfied in the branch table 944, then the branch evaluator 946 will send a processionist down each path in the branch table 944 that is unconditional or has a nonexclusive condition that is satisfied.

If no paths are selected, the processionist goes to the exit zone 914, which is the same point to which processionist(s) would have been expected to arrive had one or more processionists been dispatched along paths and then converged through the convergence section 912.

In summary, conditions for paths in the branch table 944 can be of the following types: a) exclusive (explicit comparison, logical value, or implied match with input); b) nonexclusive (explicit comparison, logical value, or implied match with input); c) unconditional (like a nonexclusive conditional that is always met); or d) blocked (like a conditional contingency that is never met).

The selection rule implemented by the branch evaluator 946 can be summarized as: select all unconditionals and all nonexclusives whose conditions are satisfied, unless any exclusive satisfies its condition, in which case select only that one and no others. If several exclusives are present, take the first one satisfied, excluding the others. As a practical matter, in the first embodiment, the "first" exclusive condition satisfied will be based upon the chronological order that the entries were placed in the branch table 944, unless a later entry is explicitly re-positioned in the branch table by an express command. (In other embodiments, priority could be left to be determined by real-time exigencies, such as the order of arrival of inputs satisfying implicit matching conditions—that is to say, the first decision that can be reached based on available data.)

Of course, whether a condition is satisfied may depend upon the moment in time that the condition is evaluated. Due to implementation of the path selection section using serial computation, the "moment of evaluation" may actually be a time window of a certain length; however it is preferred that all values used in the calculation of conditions be sampled as early and as close together in time as possible, and that no value be sampled more than once. Since the conditions may reference existential events (real-time inputs, or the immediate state of stored values), the sample taken at the onset—the first time a decision is required—is used for all subsequent decisions based on the same item. If derived from an input stream, it is preserved for explicit reference (in the lineal code language, this reference is labeled "$$input"). References to stored values (that may not be constant over time) are sampled at the earliest feasible time following the first appearance of the item in the conditional calculation. Specialized implementations geared to exacting real time scales may provide for precisely simultaneous samplings by methods well known in electrical engineering.

3.2 Branch Evaluator Algorithm

The algorithm implemented by the branch evaluator 946 in the first embodiment will now be described. The processionist executing the branch evaluator is called the lead processionist (this is the current thread of execution that is traversing and executing the active elements of the current cell). The lead processionist, having reached the path selection section 910 of the cell, evaluates the conditions in the branch table 944 in the order created or explicitly arranged according to the executable instructions of the branch evaluator 946. The lead processionist will look ahead to subsequent entries in the branch table 944 as necessary to consider any subsequent exclusive conditions. If only one path is to be followed, the lead processionist will follow that path and no new processionists (threads of execution) are initiated. When the lead processionist leaves the cell, the cell goes dormant until a processionist returns from subspace cells to the convergence section 912 or other processionists enter through the entry zone if the cell is unlocked. If the conditions for multiple nonexclusive paths are satisfied, the lead processionist will initiate new processionists (threads of execution) to follow the paths, and the lead processionist will follow the last path whose condition is satisfied. If the supply of new processionists is limited, the lead processionist will attempt to serialize execution of the paths in the branch table. This serialization operation will be discussed further below.

When a processionist leaves the cell to follow a path, the processionist may register itself in a preallocated convergence state block. This occurs only in certain cases where the processionist is stated (has not yet returned from one or more invocations) and the evoking cell (the current cell running the BE) has a complex, parallel convergence form. The purpose of the registration is to let that convergence form know that a specific, stated processionist must be the processionist that carries the forwarding value to the next superspace being recessed to.

When a processionist is dispatched from the cell 900, a copy of the current/forwarded value is sent along with the processionist as the processionist's new current value to be used in subsequent cells. The forwarded value is also preserved in the frame (context) of the lead processionist for possible future reference upon convergence (or in a different embodiment it might be preserved in additional components 918). If the forwarded value is larger than a selected threshold size, a pointer to the forwarded value may be carried as each processionist's new current value rather than each carrying a copy of the forwarded value.

Figure 13A:
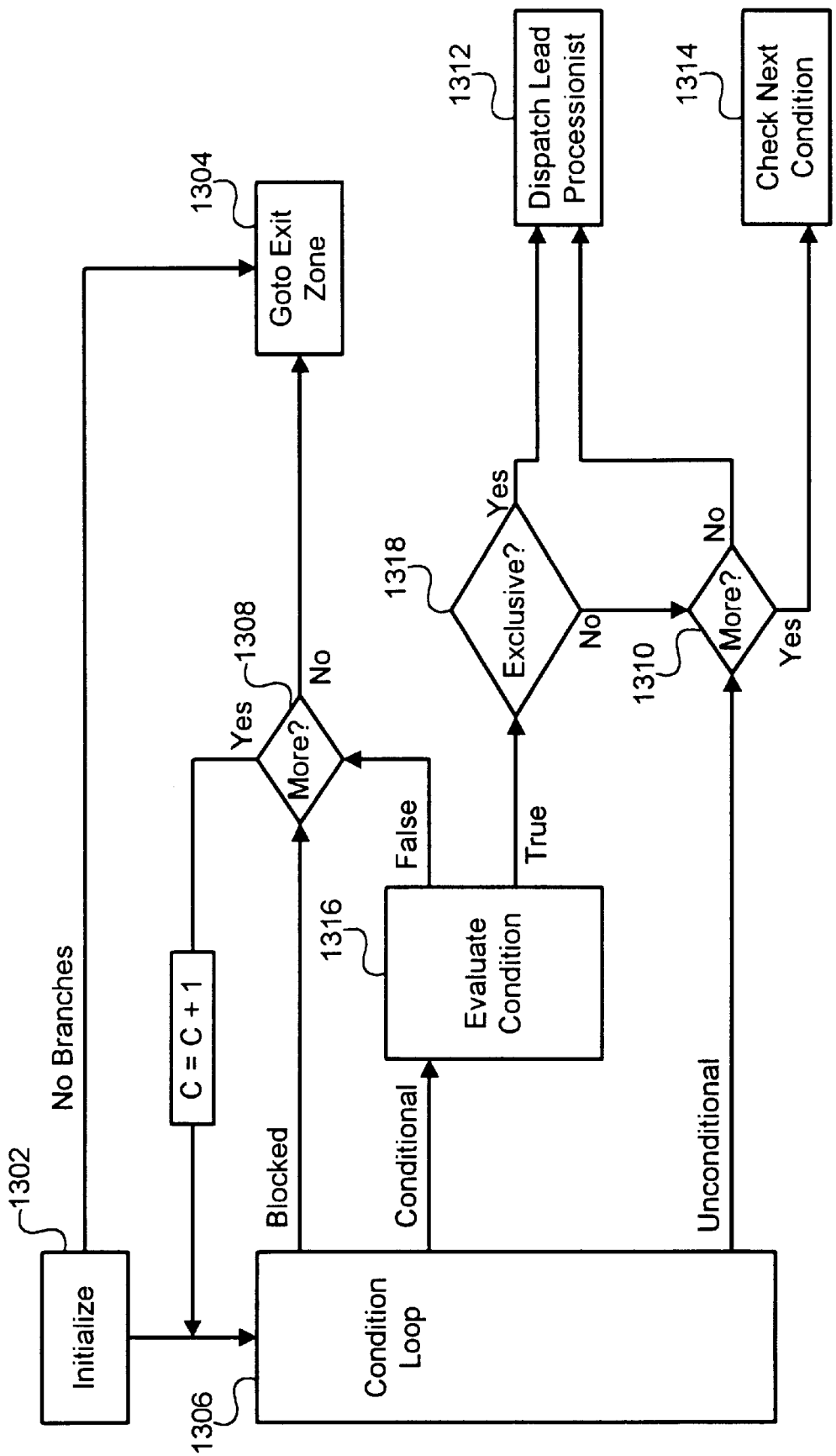
FIGS. 13A–13E are flow charts illustrating the operation of a branch evaluator according to the first embodiment.

The operation of the branch evaluator 946 is illustrated in FIGS. 13A–13E. Additional implementation notes and a lineal code representation of the branch evaluator are set forth in Appendix C hereto, which is incorporated herein by reference. FIG. 13A is a flow chart illustrating a process used by the branch evaluator in the first embodiment to determine which paths in the branch table 944 should be followed. As shown at step 1302, the branch evaluator 946 starts out by initializing internal variables which are used to loop through the entries in the branch table. These indices are the current condition being considered, "C", the next condition(s), "N", and a forward index, "F", which is used to loop through the branch table to check if there are any exclusive conditions. These indices may be stored in the cellFrame (described above) for the processionist traversing the current cell when the branch evaluator is implemented as reentrant code shared by multiple cells. After these indices are initialized, the initialization step 1302 checks if there are any entries in the branch table. If there are no entries, the lead processionist goes to the exit zone of the cell as shown at step 1304. If there are paths in the branch table, the branch evaluator enters a condition loop and begins considering the entries in the branch table.

The condition loop 1306 evaluates the entry indexed by C and determines whether it is blocked, unconditional or conditional. If entry C is blocked, the path will not be taken and the branch evaluator checks if there are more entries to consider as shown at step 1308 in FIG. 13A. If there is another entry, the index "C" is incremented and the condition loop 1306 is repeated for the next entry. If there are no more entries, the lead processionist is sent to the exit zone as shown at step 1304 (which means no entries in the table had true conditions).

If the entry is unconditional, the branch evaluator checks if there are more entries in the table as shown at step 1310. The branch evaluator must consider subsequent entries, since an unconditional entry is nonexclusive. If other nonexclusive paths evaluate to true, new processionists must be initiated so multiple paths may be followed. If an exclusive path evaluates to true, the unconditional path will not be taken. Only in the case where there are no more entries is the lead processionist immediately dispatched to the address of the unconditional path as shown at step 1312. The lead processionist is dispatched by retrieving the address from the branch table 944 for the entry addressed by the index C (which is the current entry being evaluated). This address will be the address of the next cell along the path. The lead processionist then jumps to the evocation reception address for this cell using a conventional JMP or similar command (after locking the cell).

If there are more entries in the branch table, they must be checked as indicated at step 1314. If a subsequent entry has a true condition that is nonexclusive, a new processionist must be initiated and dispatched on the path for the current entry (indexed by C). The lead processionist should not be dispatched on the current path, since it will be needed for the subsequent paths that have true conditions. The lead processionist will not leave the cell until it reaches the last entry that has a true condition. In addition, subsequent entries must be checked to determine whether there are any true exclusive conditions. If there is a subsequent true exclusive condition, only that path will be followed (and not the current path). The process used to check subsequent entries is described below with reference to FIGS. 13B–13E.

If the condition loop 1306 determines that an entry is conditional, it is evaluated as shown at step 1316. If the condition evaluates to false, the path is not followed and the branch evaluator checks to see if there are more entries as indicated at step 1308. If there are more entries, the condition loop 1306 is repeated for the next condition (the index C is incremented). If there are no more entries, the lead processionist goes to the exit zone as indicated at step 1304. This means that there were no entries in the branch table that evaluated to true.

If the condition evaluated at step 1316 evaluates to true, the branch evaluator then determines whether the condition is exclusive as indicated at step 1318 in FIG. 13A. If the condition is exclusive, the lead processionist is dispatched on the corresponding path as indicated at step 1312 and no other paths will be followed. If the condition is nonexclusive, the branch evaluator checks if there are more entries in the branch table as shown at step 1310. If there are no more entries, the lead processionist is dispatched on the path as shown at step 1312, since there are no other paths that need to be followed. If there are more entries, they must be checked as indicated at step 1314 as described above.

The process used to check the next condition will now be described with reference to FIG. 13B. As shown at step 1314 in FIG. 13B, the next condition (retrieved using the index N) is then evaluated to determine whether it is blocked, unconditional or conditional. If entry N is blocked, the branch evaluator determines whether there are more entries to consider as shown at step 1322 in FIG. 13B. If there is another entry, the index "N" is incremented and the branch evaluator loops through subsequent conditions in the branch table 944 to determine if there are any other true conditions as indicated at 1312 (the loop used to check subsequent conditions is described separately below). If there are no more entries, the lead processionist is dispatched on the path in the branch table corresponding to the index C as shown at step 1312. This means that the condition C was the only true condition in the branch table (condition N was blocked), and the corresponding path is the only path that needs to be followed. Since only one path is followed, the lead processionist can be dispatched on this path. No other processionist needs to be initiated.

If the entry is unconditional, the branch evaluator checks to see if there are any true exclusive branches in the branch table as indicated at 1328. At this point the branch evaluator has determined that there are at least two nonexclusive conditions that evaluate to true. In the absence of a true exclusive condition, a new processionist must be initiated for the path indexed by C. The lead processionist must be reserved to evaluate subsequent conditions and to be dispatched on a subsequent path that has a true condition. However, if the branch table contains a true exclusive condition that will be the only path followed and a new processionist does not have to be initiated. Thus, if step 1328 is reached, a third index F will be used to loop through subsequent entries in the branch table to identify any true exclusive conditions. This F loop will be described further below.

If the branch evaluator determines that an entry is conditional at step 1314, the condition is evaluated as shown at step 1330. If the condition evaluates to false, the path is not followed and the branch evaluator checks to see if there are more entries as indicated at step 1322. If there is another entry, the index "N" is incremented and the branch evaluator loops through subsequent conditions in the branch table 944 to determine if there are any other true conditions as indicated at 1324 (the loop used to check subsequent conditions is described separately below). If there are no more entries, the lead processionist is dispatched on the path in the branch table corresponding to the index C as shown at step 1312. This means that the condition C was the only true condition in the branch table (condition N evaluated to false), and the corresponding path is the only path that needs to be followed. Since only one path is followed, the lead processionist can be dispatched on this path. No other processionist needs to be initiated.

Figure 13B:
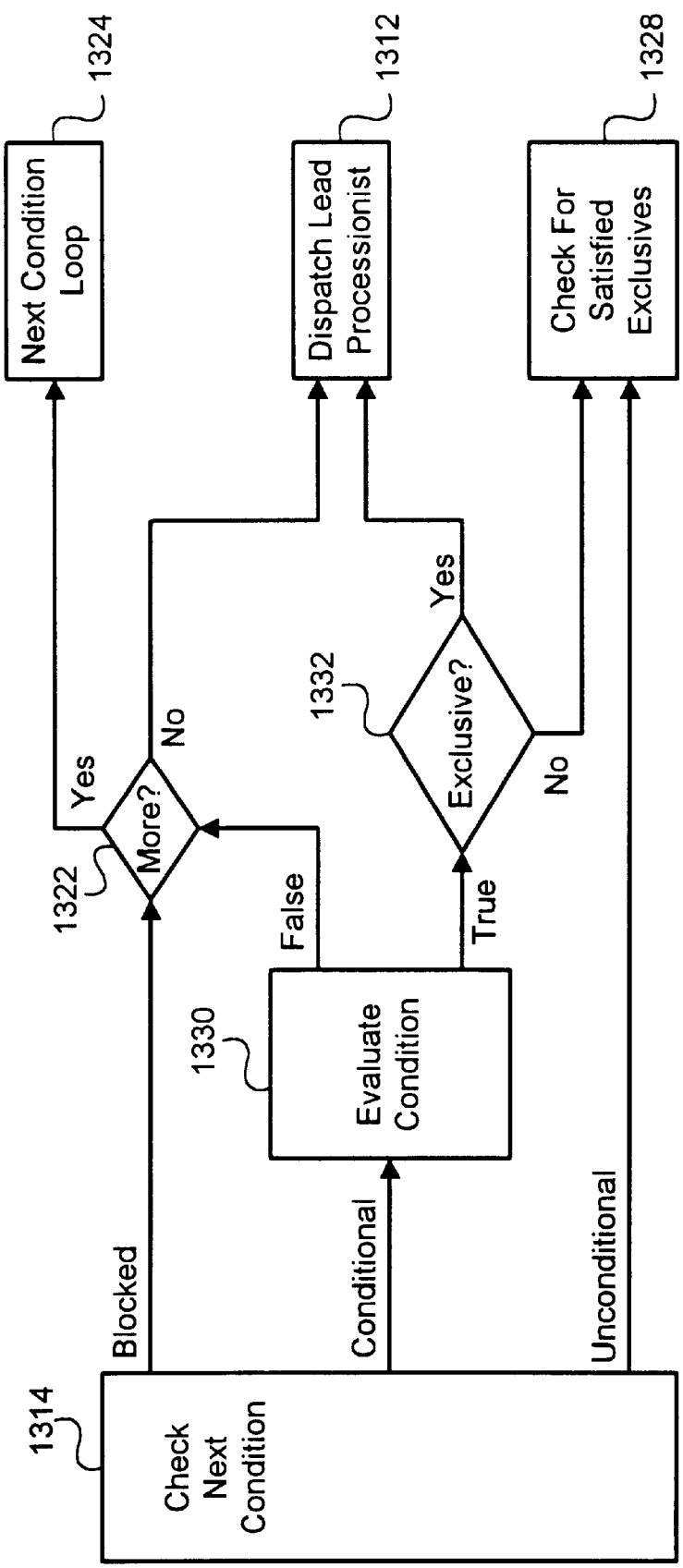

If the condition evaluated at step 1330 evaluates to true, the branch evaluator then determines whether the condition is exclusive as indicated at step 1332 in FIG. 13B. If the condition is exclusive, the lead processionist is dispatched on the path corresponding to the index N (which indexes the exclusive entry which evaluated to true) as indicated at step 1312 and no other paths will be followed. If the condition is nonexclusive, the branch evaluator checks to see if there are any true exclusive branches in the branch table as indicated at 1328. At this point the branch evaluator has determined that there are at least two nonexclusive conditions that evaluate to true. In the absence of a true exclusive condition, a new processionist must be initiated for the path indexed by C. The lead processionist must be reserved to evaluate subsequent conditions and to be dispatched on a subsequent path that has a true condition. However, if the branch table contains a true exclusive condition that will be the only path followed and a new processionist does not have to be initiated. Thus, if step 1328 is reached, a third index F will be used to loop through subsequent entries in the branch table to identify any true exclusive conditions. This F loop will be described further below.

The process used at step 1324 to loop through subsequent conditions in the branch table to determine if there are any other true conditions will now be described with reference to FIG. 13C. As shown at step 1324 in FIG. 13C, the next condition (retrieved using the incremented index N) is then evaluated to determine whether it is blocked, unconditional or conditional. If entry N is blocked, the branch evaluator determines whether there are more entries to consider as shown at step 1334 in FIG. 13C. If there is another entry, the index "N" is incremented and the next condition loop 1324 checks the next condition in the branch table. If there are no more entries, the lead processionist is dispatched on the path in the branch table corresponding to the index C as shown at step 1312. This means that the condition C was the only true condition in the branch table, and the corresponding path is the only path that needs to be followed. Since only one path is followed, the lead processionist can be dispatched on this path. No other processionist needs to be initiated.

If the entry is unconditional, the branch evaluator checks to see if there are any true exclusive branches in the branch table as indicated at 1328. At this point the branch evaluator has determined that there are at least two nonexclusive conditions that evaluate to true. In the absence of a true exclusive condition, a new processionist must be initiated for the path indexed by C. The lead processionist must be reserved to evaluate subsequent conditions and to be dispatched on a subsequent path that has a true condition. However, if the branch table contains a true exclusive condition that will be the only path followed and a new processionist does not have to be initiated. Thus, if step 1328 is reached, a third index F will be used to loop through subsequent entries in the branch table to identify any true exclusive conditions. This F loop will be described further below.

If the branch evaluator determines that an entry is conditional at step 1324, the condition is evaluated as shown at step 1336. If the condition evaluates to false, the path is not followed and the branch evaluator checks to see if there are more entries as indicated at step 1334. If there is another entry, the index "N" is incremented and the next condition loop 1324 checks the next condition in the branch table. If there are no more entries, the lead processionist is dispatched on the path in the branch table corresponding to the index C as shown at step 1312. This means that the condition C was the only true condition in the branch table (condition N evaluated to false), and the corresponding path is the only path that needs to be followed. Since only one path is followed, the lead processionist can be dispatched on this path. No other processionist needs to be initiated.

Figure 13C:
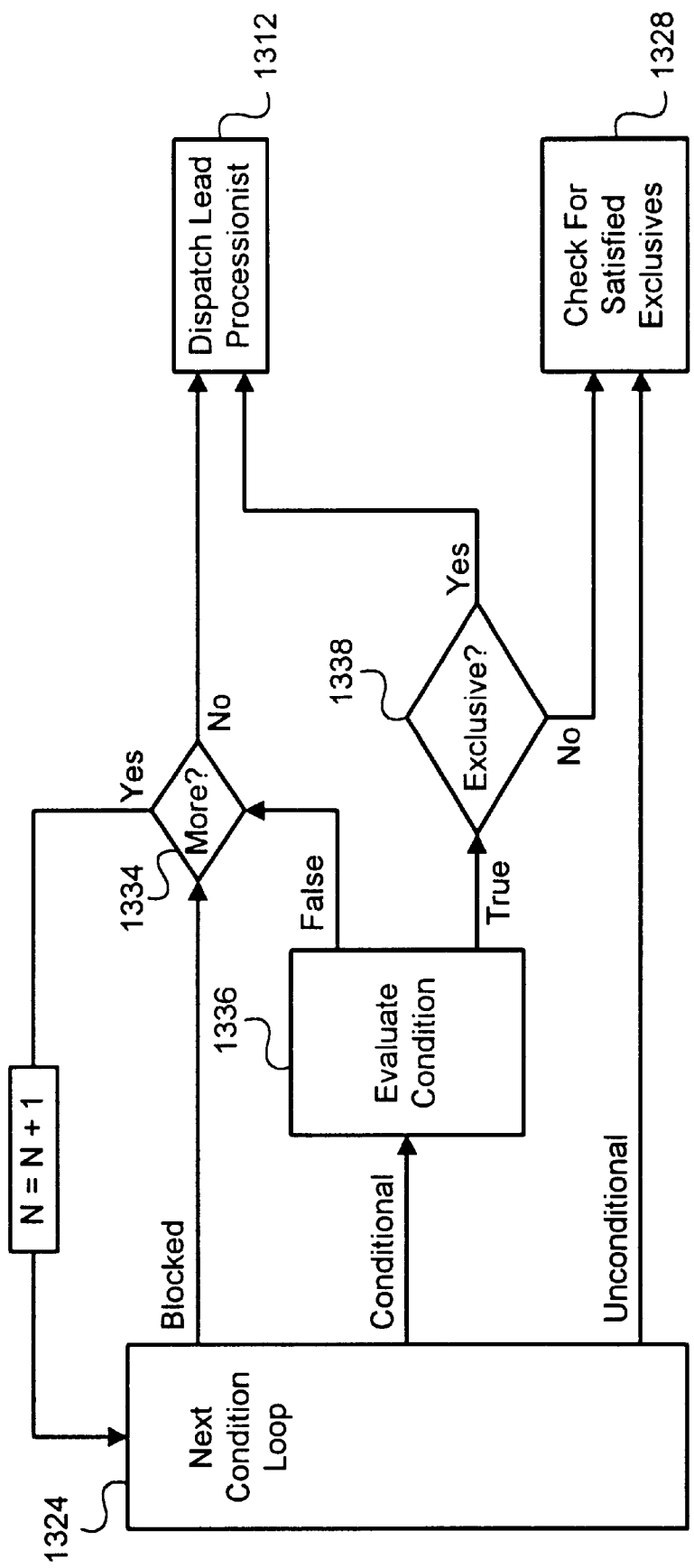

If the condition evaluated at step 1336 evaluates to true, the branch evaluator then determines whether the condition is exclusive as indicated at step 1338 in FIG. 13C. If the condition is exclusive, the lead processionist is dispatched on the path corresponding to the index N (which indexes the exclusive entry which evaluated to true) as indicated at step 1312 and no other paths will be followed. If the condition is nonexclusive, the branch evaluator checks to see if there are any true exclusive branches in the branch table as indicated at 1328. At this point the branch evaluator has determined that there are at least two nonexclusive conditions that evaluate to true. In the absence of a true exclusive condition, a new processionist must be initiated for the path indexed by C. The lead processionist must be reserved to evaluate subsequent conditions and to be dispatched on a subsequent path that has a true condition. However, if the branch table contains a true exclusive condition that will be the only path followed and a new processionist does not have to be initiated. Thus, if step 1328 is reached, a third index F will be used to loop through subsequent entries in the branch table to identify any true exclusive conditions.

The loop used to determine whether the branch table contains any true exclusive conditions will now be described with reference to FIG. 13D. At step 1328, the index F will initially be examined to determine whether the branch table has been previously scanned for true exclusive conditions. If the branch table has been previously scanned, it does not have to be checked again. There will be no true exclusive conditions, since any such condition would immediately be followed and the branch evaluator would terminate. Thus, if the branch table has been previously scanned, the branch evaluator can immediately request a new processionist to follow the path corresponding to the condition C (which was unconditional or true and nonexclusive) as shown at step 1340. Reaching step 1340 means that both the entry indexed by C and the entry indexed by N are unconditional or are true and nonexclusive and that there are no true exclusive conditions in the table. In this case, a new processionist is requested at step 1340 to follow path C, since the lead processionist must be preserved to follow path N (or a further subsequent path that evaluates to true). The process for requesting a processionist is described further below.

If the branch table has not been scanned for true conditions, the index F is set to N+1. As indicated at step 1342 in FIG. 13D, the branch evaluator then determines whether the condition for entry F is exclusive. If the condition is not exclusive, the branch evaluator determines whether there are more entries in the branch table as shown at step 1344. If there are more entries, index F is incremented and step 1342 is repeated for the next entry. If there are no more entries, a true exclusive condition was not found and a new processionist can be requested at step 1340 to be dispatched on the path corresponding to the index C.

Figure 13D:
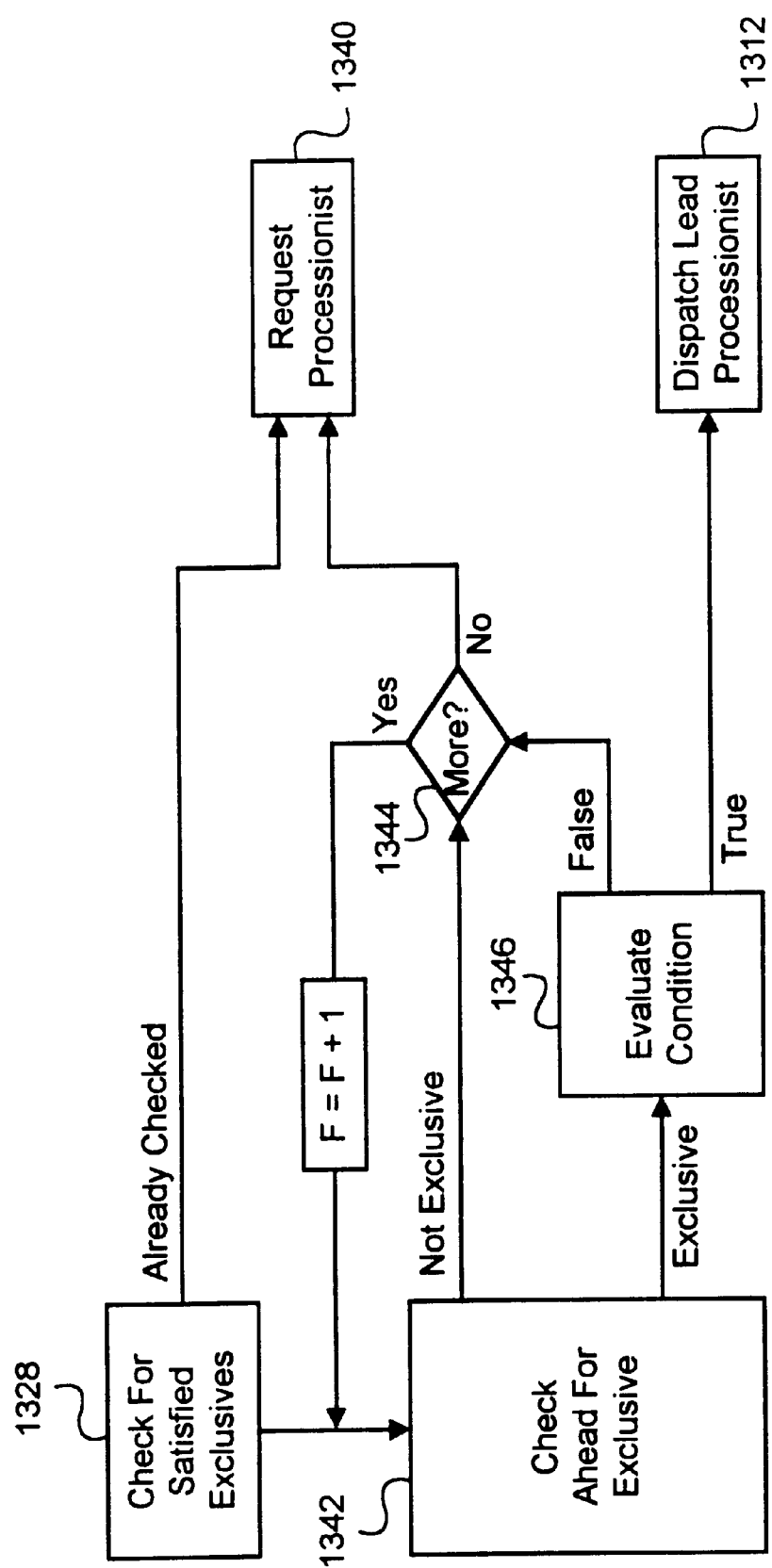

At step 1342, if the branch evaluator determines that a condition is exclusive, the condition must be evaluated as shown at step 1346 in FIG. 13D. If the condition is false, the branch evaluator determines whether there are more entries in the branch table as shown at step 1344. If there are more entries, index F is incremented and step 1342 is repeated for the next entry. If there are no more entries, a true exclusive condition was not found and a new processionist can be requested at step 1340 to be dispatched on the path corresponding to the index C. If the condition is true, a true exclusive condition has been found, and the lead processionist will be dispatch on the path corresponding to the index F as indicated at step 1312. Since this path is exclusive, no other paths will be followed.

Figure 13E:
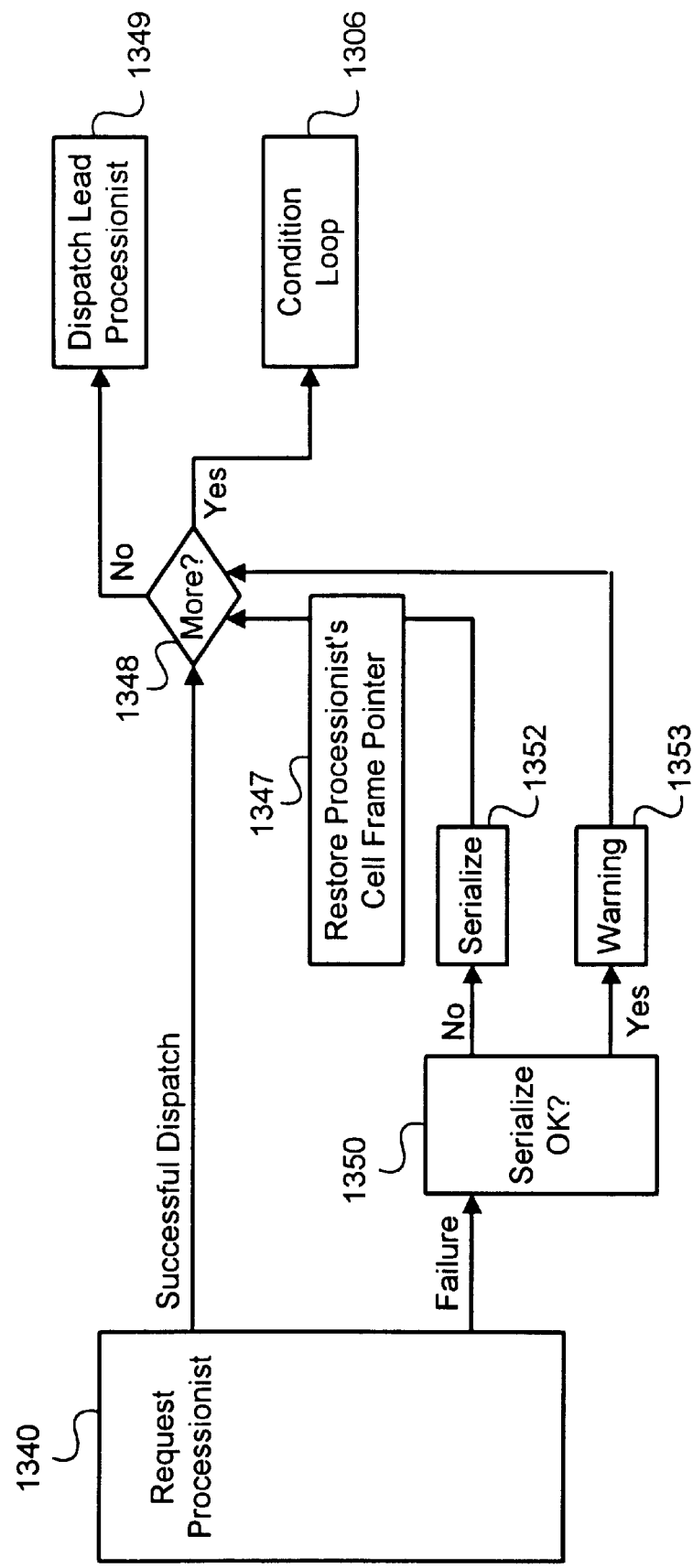

In cases where multiple unconditional or true nonexclusive conditions are identified, a new processionist must be initiated to follow the first path (indexed by C), since the lead processionist will be dispatched on a subsequent path. The process for requesting and initiating a new processionist is illustrated in FIG. 13E. As shown at step 1340, the branch evaluator requests a new processionist. In the first embodiment, this is accomplished by making a request to the operating system governing the CPU to initiate a new thread of execution. In other embodiments with multiple processors, the branch evaluator may request that a different CPU make itself available to follow the path (that is, to execute instructions in the next cell along the path whose address is stored in the branch table). If a new processionist is successfully initiated and dispatched along the path corresponding to the index C, the branch evaluator will check to see if there are more conditions in the branch table beyond the index N as shown at step 1347. Prior to execution continuing for the cell at 1348, the processionist's current cell frame pointer is restored (as it points to the cell frame for the cell that just recessed). As shown at step 1349, if there are no more entries, the lead processionist may be dispatch on the path corresponding to index N (which has already been determined to be true or unconditional). If there are more entries, the index C is set to the value of the index N (since all entries between C and N have already been evaluated). The branch evaluator then returns to the condition loop 1306 to evaluate subsequent conditions using the process described above.

3.3 Serialization/One Shot Jump (OSJ) Operations

If the request for a new processionist fails (e.g. the system cannot initiate a new thread of execution and/or additional CPUs are not available), then the branch evaluator determines whether the paths may be pursued serially by the lead processionist as indicated at step 1350. A path may be pursued serially in the first embodiment only if it is a branch to the subspace of the current cell and not a stray or wild branch. If a path may be pursued serially, a serialize operation is performed and the lead processionist is dispatched on the path at step 1352. When the lead processionist returns from the subspace (pursuant to the direction set up by the serialize operation), it will continue executing the branch evaluator as indicated at step 1348. If the path cannot be pursued serially, a warning is issued at step 1353 and the path is not followed. The lead processionist continues executing the branch evaluator at step 1348.

It will be understood that serialization causes the lead processionist to leave the branch evaluator at step 1352 and subsequently return to the same position, unlike a normal branch wherein the dispatched processionist will return to the convergence section. Rather the lead processionist must return to the branch evaluator at steps 1347 then step 1348 so subsequent conditions and paths may be considered.

Two methods for serialization, referred to as modelA and modelB serialization, are described below. ModelA serialization involves temporarily modifying the evoked cell, while modelB involves temporarily modifying the evoking cell.

ModelA serialization is carried out by temporarily modifying the cell to which the lead processionist branches ("the evoked cell"). The recession path in the exit zone of the evoked cell may be temporarily modified, so the lead processionist will return to the branch evaluator of the evoking cell and not the convergence section. This may be carried out by placing code in the evoked cell causing a one-shot jump ("OSJ") back to the branch evaluator. This is a special case illustrating how the well-defined structure of cells in the first embodiment allow dynamic self-modification. Table 2 illustrates an algorithm in pseudo machine language code that may be used to implement the one-shot jump.

TABLE 2

| Before Serialization | After Serialization |
| --- | --- |
| XX01 NOP | XX01 JMP (XX03) |
| XX02 JMP (exit) | XX02 JMP (exit) |
| XX03 WRITE NOP at XX01 | XX03 WRITE NOP at XX01 |
| XX04 undefined | XX04 JMP (Branch Evaluator) |

The pseudo code in Table 2 may be placed at a well-defined location in the exit zone of each cell just before the code that causes a processionist to exit along the recession path. During normal operation before any serialization occurs, the code shown in the left column of Table 2 is executed. At the first address XX01, a command that causes no operation to occur (NOP) is executed. Then the next command in sequence (at XX02) is executed (JMP (exit)) which causes the processionist to jump to code that causes a normal exit out of the cell to the convergence section of the superspace cell. This skips any commands at addresses XX03 and XX04. The code at XX03 includes a command to write a NOP command at address XX01 and the code at XX04 is undefined.

A serialization operation overwrites the code at addresses XX01 and XX04 as shown in the right column of Table 2. At the first address (XX01) a command (JMP (XX03)) is written to cause the processionist to skip to the third address (XX03). This causes the JMP (exit) command at the second address to be skipped. Then the code at address XX03 overwrites address XX01 to return it to the state it was in prior to serialization (with a NOP command). This means that the jump to address XX03 will only occur once for each serialization operation. The code at XX04 is then executed. The serialization operation places a command at XX04 that causes the processionist to return to the branch evaluator in the evoking cell (JMP (branch evaluator)). This causes the lead processionist to return to the branch evaluator to serially consider subsequent conditions and paths in the branch table of the superspace cell. It will be noted that this will occur only once for each serialization operation. After the code in the right column of Table 2 executes, the write operation at address XX03 will cause the code to return to the code shown in the left column of Table 2 (with a NOP at XX01). Thus a serialization will cause a processionist to return to the branch evaluator of the superspace cell one time only without affecting the recession path for subsequent processionists.

An alternative method for serialization (modelB) temporarily modifies the convergence section 912 of the current evoking cell rather than modifying the evoked cell. The convergence section 912 handles any value returned by the evoked cell as if the serialization operation is not being used. This method allows for results to be collected and for precise accounting of the arrival order of processionists (which is used by some convergence rules as described further below). After the initial code in the convergence section 912 is executed, a temporary branch/one shot jump (implemented as described above) may be used to send the processionist back to the branch evaluator. Subsequent branches can then be evaluated and followed. When the last branch is taken, no serialization occurs and when the processionist recesses, the convergence section operates in its normal manner. In contrast to the modelA serialization technique described above, the results from each evocation and the order of arrival are available for use by the convergence section 912.

It should be noted that neither serialization technique is adapted for use with wild branches that do not recess back to the current cell's convergence section. Thus, these techniques should be used only for non-wild branches that will eventually recess back to the current (evoking) cell by recessing through the same cells that were initially evoked. Similarly, stray subspaces (which lead to wild branches) must be eschewed.

The branch evaluator completes execution when one of two events occur: either there are no true conditions and the lead processionist goes to the exit zone or the lead processionist is dispatched to another cell. To say that the branch evaluator has ceased execution in the first embodiment simply means that the thread of execution or CPU that is the lead processionist has moved on to other code (either in another cell or in the exit zone). In either event, the program counter no longer points to the path selection section of cell 900. When all processionists are dispatched along paths, the current cell becomes dormant until a processionist returns to the convergence section 912 of the current cell 900 (if expected) or until a new processionist enters the cell at its entry zone.

4. Convergence and Result Forwarding Rules

When processionists recess to the convergence section 912 (after passing through convergence locking), they are sent to a convergence/recession reception address 950. The processionist then executes code at this address which references convergence/recession rules that are located in a convergence frame 952 in the additional components 918. The convergence frame 952 contains state information and rules used to control convergence corresponding to each instantiation of the branch evaluator. The convergence/recession rules are used to determine whether processionists may continue to execute the convergence section and exit zone of the cell or whether such execution should be deferred until other processionists return as well.

4.1 Convergence/Recession Rules

The convergence/recession rules in the first embodiment allow the following conditions to be imposed, although it will be readily apparent that other convergence/recession rules may be implemented as well:

1. "Wait for all" which means that every processionist arriving at the convergence/recession reception address 950 waits until all processionists expected to converge have arrived; then only one processionist proceeds, and the others are terminated. In the first embodiment, the surviving processionist is either the (1) last processionist to converge if the invocation level is zero; or (2) the lead processionist if the invocation level was not zero when that initial, stated processionist traversed the BE for the cell be recessed and converged to. The first embodiment can determine when the last processionist expected to arrive has arrived by looking at the processionists registered in the branch table. A processionist is expected to arrive for each registered processionist that was sent to a subspace cell using a super branch that is not designated as stray (that is, it will not lead to any wild branching outside of the subspace).

2. "Wait for Nth" which means that every processionist arriving at the convergence receptors of the cell waits until N processionists have arrived; then only one processionist proceeds. (N may be 1 or greater.) In the first embodiment, the Nth processionist is the processionist that proceeds, unless there is a stated lead processionist (invocation level !=0), in which case the stated lead processionist proceeds.

3. "Free-for-all" which means that every processionist arriving at the convergence receptors of the cell proceeds. (This may result in the proliferation of processionists proceeding from this cell.)

4. "None" which means that no processionists are expected or only one, so no method for handling convergence is required. (This would be the case if there were only one branch from the cell, or none, or only one branch that could be taken at a time by selection among exclusive contingencies, or if the cell is never to be evoked or invoked as a cell dedicated to storage of data or representation of relational structures.)

4.2 Result Forwarding Rules

Regardless of the convergence/recession rules that are implemented, the current values returned along with the processionists are processed and may be stored in the storage section 918 before a processionist is terminated. When a processionist recesses to the convergence/recession reception 950, a forwarded value handler 954 is used to determine how the processionist's current value should be handled. The forwarded value handler 954 references a result forwarding rule in the convergence frame 952 to determine whether the value should be stored, processed or discarded. The following result forwarding rules may be implemented in the first embodiment, although it will be readily apparent that other result forwarding rules may be used as well:

1. "Forward all" which means that the results carried by all converging processionists are to be assembled into a vector of values, which is forwarded as the result of convergence with the surviving processionist(s). (Under a "Free-for-all" convergence/recession rule, this means that each processionist would proceed carrying its own value.)

2. "Forward Nth" which means that the surviving processionist(s) will carry the result that arrived on the Nth processionist. (N means whatever is there when convergence has completed under the convergence rule, hence generally the value carried by the last processionist to arrive.)

3. "Ignore all" means discard the values carried by any converging processionists and let the surviving processionist carry the current value carried by the processionist at the conclusion of the output section of this cell (i.e, before any branches were taken). This value was previously stored in the context frame for the lead processionist or in the storage section 918.

4. "Simple" means let Current Value being carried by the processionist that recessed back to the cell (most recently) be the convergence value (unless or until another processionist recesses).

5. If no rules are specified, by default in the current embodiment the convergence is set to "None" (meaning anything converging will pass through without waiting for other processionists) and the forwarding is set to "Simple" (meaning the processionists forwarding value is unchanged by convergence). From the cells point of view, Simple Forwarding consists of letting the current value carried by each processionist as it recesses back to the cell be the convergence value unless or until another processionist recesses. Note, however, that any meaningful combination of convergence and forwarding defaults may be established as desired, and the above while useful are not in any way prescribed limitations of the system.

4.3 Combining Convergence and Forwarding Rules

Table 1 below summarizes which combinations of convergence and forwarding are allowed in the first embodiment.

TABLE 3

Table of Convergence and Forwarding Combinations Allowed in First Embodiment

| Convergence Model | Forward All | Forward Nth | Simple | Ignore All |
|---|---|---|---|---|
| Wait-for-all | Y | Y | Y | Y |
| Wait-for-Nth | Y | Y | Y | Y |
| Free-for-all | N | N | Y | Y |
| None | N | N | Y | Y |

This structured method of handling convergence and recessed values allows the behavior of a network of cells to be dynamically modified merely by changing the convergence/recession rules, and result forwarding rule stored in the storage section 918 of a cell. After a processionist is allowed to proceed through the convergence section 914 it is sent to the exit zone 914 along with the value selected by the forwarded value handler 954.

5. Exit Zone and Repetition

5.1 Return from Invocation

A processionist begins executing the exit zone 914 at an invocation answering module 958. The invocation answering module 958 checks the flags set in the cellFrame (if one exists) to determine whether the current cell was invoked or evoked. If no cellFrame exists, the cell was not invoked. If the cell was invoked, the processionist returns from the cell with its current value (as determined by the forwarded value handler 954). In the first embodiment, this return path is accomplished by popping the return address off of the system stack for the current processionist.

5.2 Repetition Modules

If the current cell was not invoked (that is, it was evoked), then the processionist proceeds to a repetition module 960. The repetition module 960 allows the behavior of the cell to be repeated multiple times before the processionist exits to the superspace or to a coupled sibling. The repetition module 960 implements repetition as specified in repetition rules 962 in the peculiarities section 924 to determine whether to repeat the behavior of the cell. If the repetition condition within 960 returns a value of true, the processionist is sent back to the beginning of the output behavioral section 908. The output behavioral section 908, path selection section 910, consequent paths, and finally convergence section 912 will then be executed again. If the repetition rules are false on the other hand, then the processionist proceeds within the exit zone.

The first embodiment supports two basic forms of repetition, referred to as "looping" and "encore" repetition. Looping repetition causes a cell's behavior to be repeated as long as a repetition count or condition has been met. It does not matter whether any branches were followed in the path selection section. If no branches are selected by the path selection section, the processionist will proceed directly to the exit zone. Looping repetition will then cause the processionist to return to the output behavioral section.

Encore repetition, on the other hand, only causes a cell's behavior to be repeated if a branch was taken by the path selection section and recession occurs and any repetition count or condition has also been met. In other words, the occurrence of branching and recession are a prerequisite to encore repetition and are an implicit part of the repetition condition.

The first embodiment supports two different mechanisms for locking a cell for repetition. When a processionist enters a cell the first time, it may lock the cell to prevent destructive interference by other processionists. See Section III.4 below. When the processionists (and any other processionists that are initiated by the branch evaluator to follow branches) leave the cell, the cell may remain locked or it may be unlocked to allow other processionists into the cell. If the cell remains locked, state information can be stored in the cell, because the cell will not be modified by other evoking processionists. In such cases, a repetition count or state may be stored in the cell header 915 as shown at 933 in FIG. 9B. When a processionist recesses and is forwarded to the repetition module 960, it may use the repetition count or state to determine whether it should jump back to the output behavioral section and repeat the cell's behavior. When repetition is handled in this manner, it is referred to as private or unshareable repetition. In the first embodiment, only the "looping" type of repetition may be private.

Repetition may also be shareable in the first embodiment. With shareable repetition, any repetition count or state is stored in a cellFrame and is accessible to processionists from the same group. When the processionists branch and leave the cell, the cell is unlocked. Other processionists may enter the cell and may store state information in other cellFrames. When the original processionists recess, they may relock the cell. When a processionist recesses and is forwarded to the repetition module 960, it may retrieve the cellFrame and use the repetition count or state to determine whether it should jump back to the output behavioral section and repeat the cell's behavior. In the first embodiment, the "looping" type of repetition may be private or shareable, while the "encore" type of repetition is always shareable. See Sections III.4.3 and III.4.4 for additional information on private and shareable repetition.

The repetition module 960 may include any variety of executable code as specified by repetition rules 962 and may include any variety of conditions that may cause the cell to repeat indefinitely, or a specified number of times, or so long as specified conditions prevail, or in response to specified events. The following represent some common types of repetition modules used in the first embodiment. The modules are in a shorthand form used in lineal code specifying cell "peculiarities" (which include activation conditions and states 926 and repetition rules and initialization 962) in the entry zone according to the first embodiment. It is understood that this lineal code would be compiled or interpreted into machine code to carry out the desired function in the repetition module. The first two modules specify "looping" repetition, while the last three specify "encore" repetition.

The first looping module is of the form "@n" where n is an integer or numerical expression. This indicates a simple numerical repeater which causes the behavior of the cell to be repeated n times before a processionist is allowed to exit. If n is a numerical expression that must be evaluated, it is evaluated at the time the cell was entered. The cell performs its behavior n times, with the count, as it is incremented or decremented, available for reference in the output section of the cell (referenced using a lineal code symbol $$index), on each cycle of repetition. It is possible that branching from the cell on any cycle may not ultimately lead to recession or convergence back to the cell, in which case the count will never reach zero. It is also possible, even if there is no branching from the cell, that invocation of another cell from the output section of the cell may never be answered, in which case the count will never reach zero.

Another looping module in the first embodiment has the form "@@e" where "e" is a boolean expression. The cell performs its action at least once and repeats until the expression "e" evaluates to False. In the first embodiment, "e" refers to some existential condition that may change independently of the repetition module of this cell. It is possible that the truth value of "e" may not change, in which case the cell will repeat its action indefinitely, provided it is not branched from, or is repeatedly recessed or converged to.

Yet another type of repetition module (an encore repetition module) has the form @@@ referencing an implicit condition that is evaluated to true only if processionists have been dispatched from the path selection section and returned to the convergence section. If no paths are selected by the path selection section during a given pass through the cell, the repetition condition evaluates to false. The cell performs its behavior at least once and repeats its behavior after each pass during which there is convergence/recession. However, if no branches are followed in the path selection section (in which case the processionist proceeds directly from the path selection section to the exit zone) then there is no potential for repetition.

Another encore module in the first embodiment has the form @@@n where n is a numerical expression. This is the same as @@@ except that the encore repetition is limited to n times.

The last type of encore repetition module in the first embodiment is of the form@@w@ where w is a condition. This operator is like the type @@@n except that the repeat module is limited to function only while the existential condition w prevails (instead of n number of times). The condition w may refer to internal or external exigencies such as the number of branches taken from this cell, the number of processionists that have converged, or the number of processionists that are pending and expected convergence.

The last three repetition modules above (the encore repetition modules) may be particularly useful in allowing backing-up in decision trees or hierarchical choice menus constructed as tree structures of cells. The following describes an exemplary use of an encore repetition module in a Multimedia Data Tree (also illustrating the lineal code described in Appendix A).

5.3 Exemplary Cell Network: Encore Repetition Tree

Figure 14:
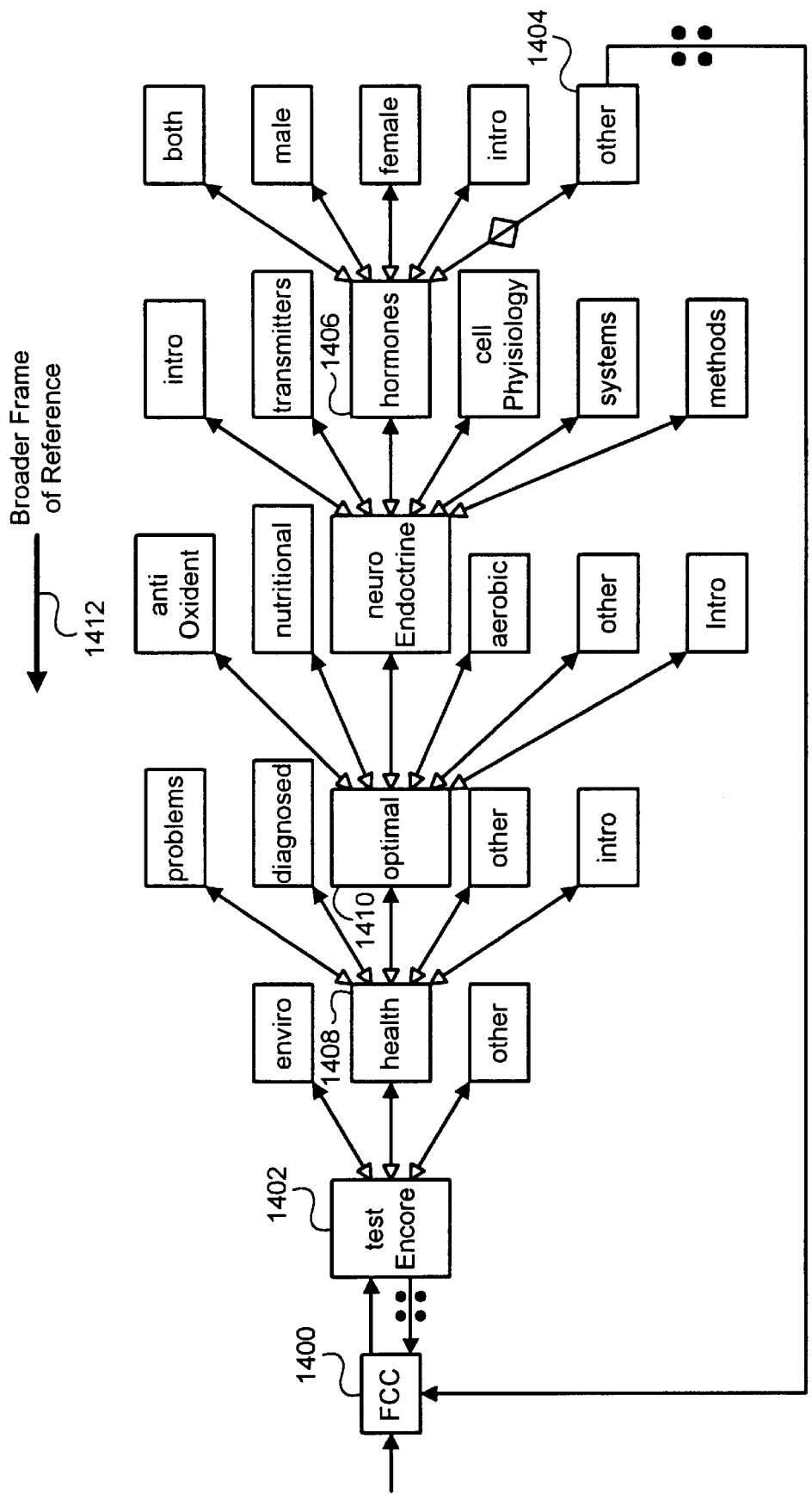
FIG. 14 is a block diagram illustrating an exemplary network of cells using encore repetition units.

A tree may readily be assembled from cells incorporating the encore type of repetition module to serve as a structured database accessible through interactive multimedia channels, such as telephone, computer terminal, Internet web server or interactive television. FIG. 14 shows a hierarchical structure of cells belonging to such a tree (preferably beginning from the left of the page and growing to the right), extending from the cell . . . testEncore 1402, with each rightward level comprising all the subspace cells of the preceding level. In addition, there is a wild branch to a cell Francis Clump Choices (FCC) 1400 from the subspace "other" 1404 of . . . hormones 1406. Shown here is the path ". . . testEncore.health.optimal.neuroEndocrine.hormones.other" with all subspaces (and other branches) of the cells along that path, for simplicity, not shown are other cells which may be subspaces of those of the shown cells that are not on this particular path. All cells shown have a repetition unit 960 of the "encore" type in their respective exit zone 914 (relative to FIG. 9A). Thus such a cell, when recessed to from a subspace cell, repeats its output behavior and then its path selection, etc. (as described above for a cell with a repetition unit).

Figure 15:
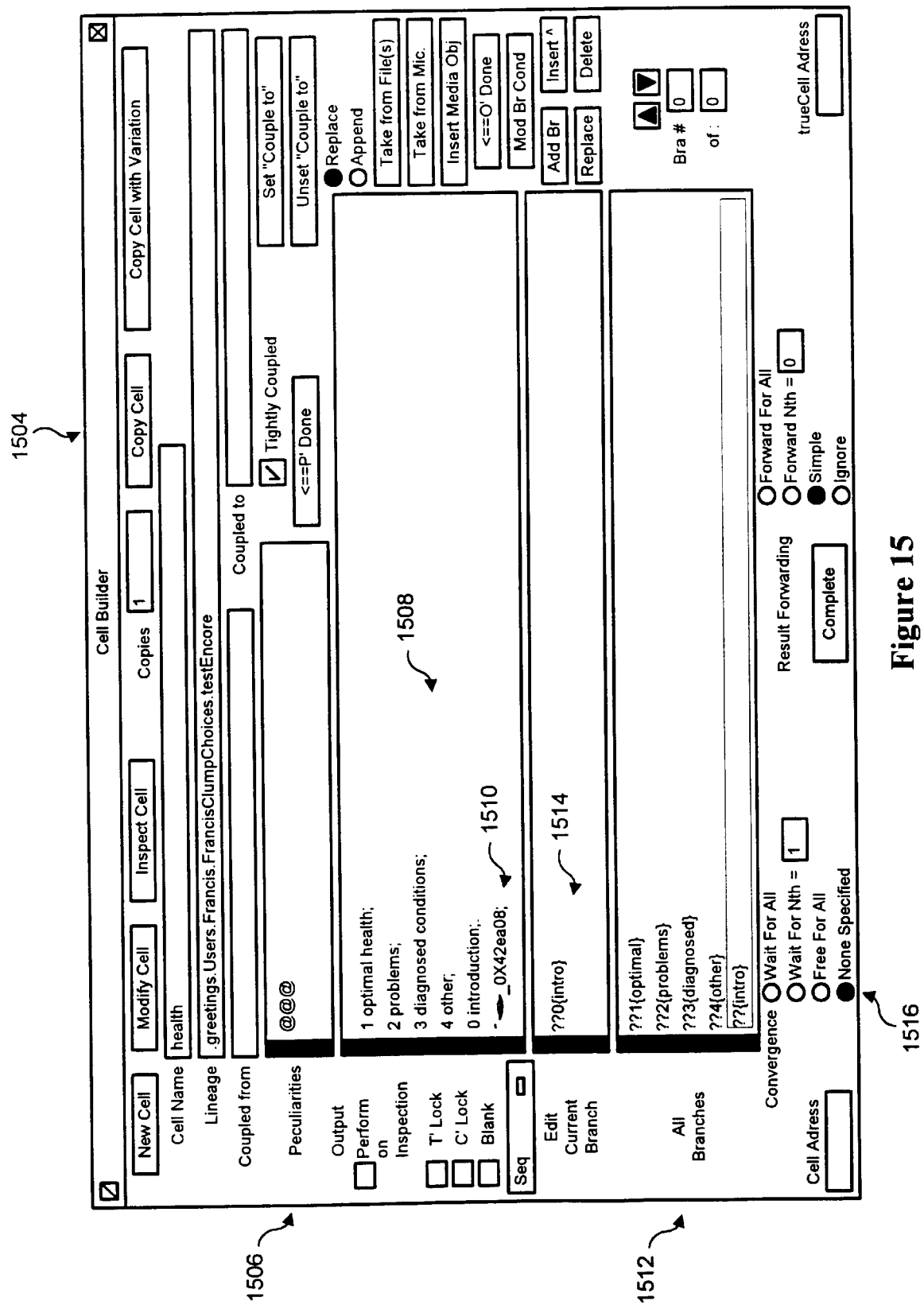
FIG. 15 is a graphical user interface of a cell builder utility showing the contents of one of the cells shown in FIG. 14.

FIG. 15 shows one such cell, . . . health 1408 as displayed in the graphical user interface of a cell builder utility 1504 with each of its sections and other characteristics specified in the form of the lineal code (see Appendix A). Thus in "Peculiarities" 1506, the code "@@@" indicates that this cell has a repetition module of the "encore" type with no limits on count or other conditions.

The output section 1508 labeled "Output" defines a multimedia presentation for the output of this cell, which presents the interactive user with a list of the options for branching. The output is present both in literal text and as an encapsulated sound object (indicated at 1510 by the lips icon followed here by a hexadecimal identifier), stored in-line with the text in the output section. The tilde mark (~) indicates the end of the literal text as shown and concatenates the text to the sound object forming a single output item (in this case, the last and only output item in the output section). The semicolon following the sound object indicates the end of this item of output. Upon execution of the output section, each part of this item will be directed to an appropriate output sub-channel, which will output concurrently (because they are of different types). Those channels currently active will deliver the output to the interactive user. For example, if the user is on an Internet web browser or an interactive television set, then both the text and the sound will arrive at this terminal; if the user is on an ordinary telephone, then only the sound will be delivered; if the user is on a text terminal or window, then only the text will be delivered to that user. (It should be noted that in this example the output behavioral section contains no reference to other cells, external variables or input streams, and no explicit commands or other operations or behaviors, all of which could be present in a cell. It should also be noted, illustrative of the flexibility of the method of output behavior specification provided by this invention, that the encapsulated sound object could be replaced by a translator program that might translate the foregoing text into digitally synthesized voice, as an alternative to recording an actual human voice in the sound object as in this example.)

The field "All Branches" 1512 presents the branch table (of the path selection section) 944 (relative to FIG. 9B) including five exclusive conditional branches to respective subspace cells. Each condition specified is an impled literal match to input. Thus for example an input of "1" will cause branching to the subspace cell "Optimal" 1410. In event the actual input from the interactive user does not match any of the conditions of the branches listed, then (since there are no unconditional branches specified in this cell) recession will occur to the superspace cell . . . testEncore 1402 which is also an encore repetition cell, and that cell will then present its choices, including the option of branching (again) to the cell "health" 1408 or any of its siblings (which are together subspace cells of . . . testEncore). (It should be noted that in this example, consistent with the desired activity, none of the siblings are coupled.)

It may be also noted that the field "EditCurrent branch" 1514 displays the most recently added branch that was specified in the process of interactively building (or modifying) the cell "health" using an interactive cell builder viewer. Further, the convergence (see 1516) and result forwarding rules (see 1518) for this cell 1408 are set to respectively "None Specified" and "Simple."

An interactive user may listen to or view the outputs including the list of options, and then respond by pressing a key on a computer terminal, pressing a button a telephone dial, point with an interactive device such as a mouse, etc. The overall behavior of this tree (FIG. 14) as experienced by an interactive user will be to move successively into the tree by selecting listed options that lead to greater specificality and narrower frame of reference. At each branch point, giving a response (input) that is not among the listed options will result in recession back (in the direction indicated by arrow 1412) to a broader frame of reference (the immediately preceding set of options). Some cells may not have subspace branches, and some cells may have wild branches out of the tree, or back to the beginning of the tree (for example, inner space "other" 1404 wild-branches back to head of tree FCC 1400). Thus a tree constructed of "encore" cells provides a convenient and comprehensible way for an interactive user to maneuver in a structured information space.

5.4 Coupling

Referring back to FIG. 9A, cells may also include a coupling module 964. After any repetition required by the repetition module 960 completes, the processionist executes the coupling module 964. When a cell is coupled to a sibling, coupling module 964 is built into the cell to perform the coupling versus taking the standard recession exit. If the cell is coupled, the processionist will branch to the address indicated in the coupling branch in the cell header. When the cell is not coupled, which is the usual case, the coupling module 964 is not built into that cell, and the processionist proceeds to the exit box 968. The exit box 968 causes the processionist to jump to the convergence section of the corresponding superspace cell. The address of the superspace cell is present in the link table 943 of the storage section 918. When the processionist leaves the cell from the exit zone, it will normally release any locks that were placed in the lock table when the processionist entered the cell. The processionist's execution of cell 900 is completed once the processionist leaves the cell via the coupling module or exit box.

6. Exemplary Cell Network: Remote Agent

Figure 16:
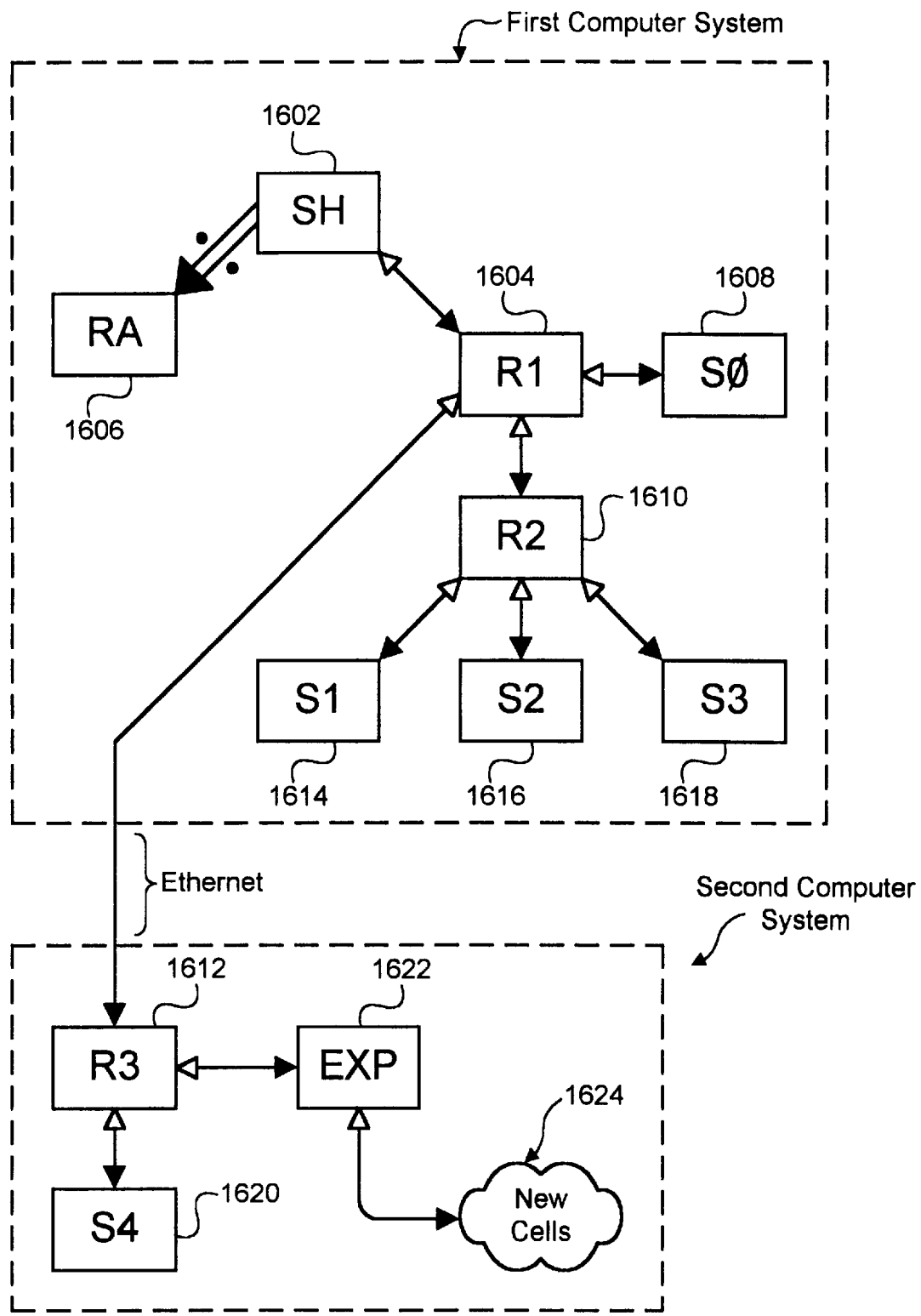
FIG. 16 is a block diagram illustrating an exemplary network of cells according to the first embodiment.

FIG. 16 is a block diagram of an exemplary network of cells according to the first embodiment of the present invention. This network of cells illustrates how a processionist may be used as a remote agent to store and retrieve information in the network of cells as well as for execution of commands at different locations in the network. The cells in the network represent mailboxes for receiving messages from a processionist, databases for providing data to a processionist, and routing cells that send the processionist to a particular location. The current value of the processionist is tested at each cell to determine whether a message should be received by the current cell, whether requested information should be copied into the current value (which information is returned by the processionist's recession), or whether the processionist should be routed to other cells. In this example, the processionist starts with a current value that is a word or line of text. If the current value is an alphanumeric string, such as "sports", "news", or "weather", the string is used as a key to retrieve corresponding information from the network of cells. The processionist will be routed to the appropriate cell (such as a cell storing text of the day's news), and the requested data (or a pointer to the requested data) is stored as the processionist's current value. The information is delivered to the requesting cell by recession.

If the processionist's current value starts with ">", then the current value is treated as a message for delivery. The name of the cell to receive the message is the first word following ">". Thus, the current value ">S1 This is a message for subscriber1" would be interpreted as a request to send this message to the cell S1. When the processionist enters that cell, the message will be output or stored depending upon the cell's output behavioral section. Any acknowledgment or reply could be copied into the processionist's current value which will recess to the requesting cell.

If the processionist's current value starts with an exclamation point ("!") then the message is interpreted as a series of commands to be executed by a specific cell. The name of the cell is the first word after the exclamation point, such as "!S1" for commands to be executed by cell S1.

If the processionist's current value starts with a left brace ("{") then the message is interpreted as lineal code representing cells to be added to the network of cells. The name of the cell to which the new cells will be added is indicated by the first word after the left brace, such as "{S1" for cells to be added to cell S1.

In the sample network of cells shown in FIG. 16, a processionist is sent to cell 1602 ("SH") to initiate access to the network. As described above, the processionist's current value determines whether information is being requested, a message is being sent, commands are being sent into the network for execution, or lineal code is being sent into the network to dynamically modify the network. The cell 1602 ("SH") has an unconditional branch to cell 1604 ("R1") for routing the processionist. Cell 1602 ("SH") is also coupled to cell 1606 ("RA") which will receive any values returned to cell 1602 ("SH") by recession. Cell 1606 ("RA") is a result accounting cell that can catalog, display or otherwise process any returned values as determined by executable code in its output behavioral section.

When a processionist reaches cell 1604 ("R1") the contents of its current value is tested to determine which cells in its subspace (S0, R2, R3) should be evoked. The branch table of cell 1604 ("R1") has three entries, one for each subspace cell. Cell 1608 ("S0") might contain a summary of the day's news. The condition in the branch table for cell S0 would be that the first word of the current value is "news", and the branch would be exclusive. Thus, if the processionist is acting as an agent to retrieve a summary of the day's news, it would be routed to cell 1608 ("S0"). A pointer to the news summary would replace the processionist's current value. The processionist would then exit the cell and recess along the path from cell 1604, to cell 1602, and then proceed to cell 1606 (due to the coupling branch between cell 1602 and cell 1606).

Cells 1610 ("R2") and 1612 ("R3") are cells for routing the processionist if the request in the current value is not for the news. Therefore, the entry in the branch table for these cells would be unconditional. If the current value did not start with "news", a processionist would be sent to both cells 1610 and 1612. A new processionist would be initiated by the branch evaluator and the current value would be referenced for use with that processionist. The new processionist would be sent to cell 1610, while the original processionist (the lead processionist) would be sent to cell 1612. This allows the network to search for the response to the original request in parallel due to the standard structure and operation of cells in the first embodiment. This parallel processing can be controlled merely by adding entries to a branch table. Thus, the standard cell structure provides a simple mechanism for taking advantage of multiprocessing capabilities. In addition, cell 1612 may be on a computer system that is remote from cell 1604 and cell 1610. The entry in the branch table for cell 1612 would contain a network address instead of an address in memory. The branch from cell 1604 to cell 1612 may be across an Ethernet cable. The processionist is the packet of data sent across the Ethernet cable. When cell 1612 receives the current value from the Ethernet cable, a thread of execution is initiated to be the processionist within the memory space of the remote computer. Thus, the network of cells may take advantage of both multiprocessing as well as remote processing using a standard cell structure.

Cell 1610 ("R2") has three cells (S1, S2, and S3) in its immediate subspace. Cell 1614 ("S1") is a mailbox for receiving a message and storing it to a message log for a user of the system. The branch table for cell 1610 contains an exclusive branch to cell 1614 if the current value is a message for the user (indicated by a current value starting with ">S1" or ">username"). In this case, the processionist is sent to cell 1614 and the output behavioral section copies the current value into the message log (which may be in another cell (a blocked subspace of the current cell)). The output behavioral section may also create a new current value for the processionist to acknowledge receipt of the message. The processionist then recesses back to cell 1602 and couples to cell 1606 which can record the acknowledgment.

Cells 1616 ("S2") and 1618 ("S3") may be databases similar to cell 1608 for storing information that may be retrieved. Cell 1616 could contain a summary of sports news and cell 1618 could contain a summary of weather news. The branch table of cell 1610 may have conditional branches to these cells that check for the key word "sports" or "weather" in the current value. These cells may also be capable of executing express commands (such as updating the sports or weather). In this case, the branch table of cell 1610 may have conditional branches to these cells that check for "!sports" or "!weather" in the current value. The subsequent commands in the current value would then be executed by the output behavioral section of the corresponding cell. An acknowledgment of the command execution could be returned by recession as described above.

Cell 1612 resides on a remote computer system. It has two cells (S4 and EXP) in its immediate subspace. Cell 1620 ("S4") is a mailbox for a remote user. The branch table in cell 1612 and the output behavioral section of cell 1620 would be similar to that described with reference to cell 1614. However, the user may be remotely located. Cell 1622 ("EXP") is a cell that can be dynamically modified. The branch table in cell 1612 would have an entry for cell 1622 that checked for "{EXP" in the current value. This indicates a lineal code expression for cells to be added to the subspace of cell 1622. The output behavioral section of cell 1622 would extract the cells from the current value and add them to its subspace as indicated at 1624. Appropriate entries would be placed in the branch table of cell 1622. This is an example of how new functionality may be added to the system dynamically and remotely.

The example of FIG. 16 illustrates how cells according to the first embodiment may be linked to easily achieve multiprocessing, remote processing, and dynamic self-modification. Of course, to achieve robust functionality the network of cells would contain many more branches and cells. The branch tables in various cells could contain multiple conditions for reaching each cell. For instance, the branch table of cell 1610 may contain entries that send a processionist to cell 1618 for retrieving weather information ("weather"), for processing commands related to the weather database ("!weather"), for sending messages to a weather database administrator (">weather") and for expanding the storage and functional capability of the weather cell by adding to its subspace ("{weather").

The implementation of various aspects of the first embodiment will now be described in further detail with reference to source code appendices.

III. Specific Operation

The following sections describe the specific operation of various aspects of a network of cells according to the first embodiment. In particular, this section discusses: 1) cell building and linking; 2) creating and maintaining network continuity (including dynamic modification and memory management); 3) concurrent cell builders and linkers; 4) cell locking; 5) evaluation space, forwarding handling and 110 model; 6) redundancy techniques; 7) techniques for underspecification and deferred resolution; 8) cloning and inheritance; and 9) exemplary network utilities.

1. Cell Building and Linking

In the following, the continuity of a network of cells is defined and methods are described for maintaining continuity in the face of change of within the network. The network is created and is kept integral and current by incremental updating of links in response to additions or deletions or movements of cells and changes of their interrelationships expressed by branches. This is accomplished using information in the backward link table in the storage section of a cell. The backward link table is used to maintain the address of each cell that references the current cell.

Cells may be interconnected by their (explicit) branches in a perfectly general way, that is to say, any cell may extend any number of branches to any other cells or to itself In addition, any cell may by its implicit branches reference so as to be able to invoke any other cell. A network of cells actually and potentially interconnected by branches implemented as address references (within a single address space) is referred to as a clump. Cells are considered interconnected in a network provided that, disregarding the direction of paths specified by the orientations of their branches, any cell is reachable from any other cell along some path. A network may encompass several clumps (including specified parts of individual clumps), with inter-clump connections implemented by symbolic references, messaging, or similar indirect means.

Figure 17:
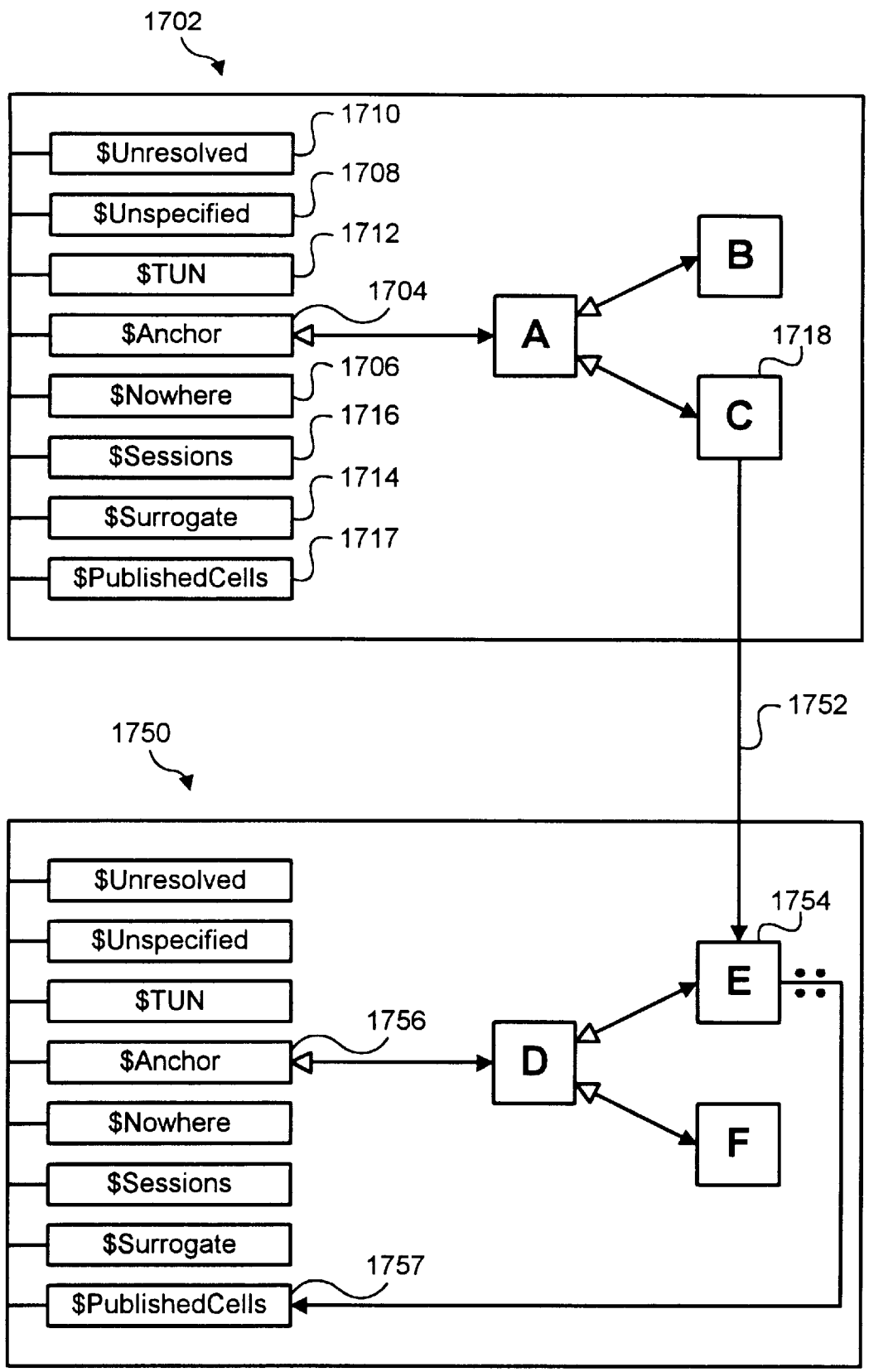
FIG. 17 is a block diagram illustrating clump frames according to the first embodiment.

FIG. 17 depicts a clump frame 1702 which provides the environment for a clump of cells in the first embodiment. Each clump has a fixed header area, which contains space for various clump-specific parameters and pointers, for example:

clump version number, endian, and machine type base and size of clump variables fixed descriptors for lockServer controlling allocation of lock resources that regulate threads accessing cells within the clump fixed pointers for locating system cells clump variables area Each clump also entails several special cells with predefined purposes, which are tied to the clump frame as depicted in FIG. 17. The anchor node 1704, $Anchor, is a cell selected so that every cell in the clump is reachable from it by a path of super branches unless reachable by a path of super branches from one of the following cells: $NoWhere 1706, $Unspecified 1708, $UnresolvedReference 1710, or $TUN ("The Unlink Node") 1712. A special cell $Surrogate 1714 receives branches whose targets are cells that have been deleted (have ceased to exist). $Sessions 1716 extends branches to sources of processionists that can be inserted into the network at selected points. $PublishedCells 1717 contains a list of cells in the clump that are made publicly available to other clumps. Additional special cells can be added to the clump frame to fulfill purposes specific to the implementation and application, for example, external references, inter-clump connections, and so forth.

To make the clump well-ordered, super branches are designated such that every cell is reachable from one of these special cells by a path exclusively traversing super branches, and every cell is pointed to by exactly one super branch within the clump. The sequence of super branches traversed in reaching a cell is referred to as the full path or global name of that cell, or as its "tree-like" location in the clump. Naturally various different orderings are possible for a network of any complexity, and the designation of any one specific set of branches (sufficient for the ordering purpose) as super branches may be motivated by particular representational or programmatic needs.

The following notation is useful for making reference to a particular cell by giving its full path, or a path from some designated reference point: ".x.y.z" specifies a fixed reference to the contents of the subspace z of the subspace y . . . etc.; while, ".x.y.(.P)" provides for the name of the final subspace to be supplied by the output contents of the space P, here serving as a variable, so that if P contained "z", the result would be the same as the previous example. Symbolic references by dotted strings of this general form serve to specify flexible and momentary references, used to guide a "Finder" in locating the indicated cell, which is useful in building and modifying cells and pointing between distinct clumps. A cell finder is described further in Appendix B hereto, which is incorporated herein by reference. On the other hand, branch tables and similar fixed references within a clump are usually maintained as numerical addresses in the address space of the host computer, in the first embodiment (which are updated only as necessitated by the growth, addition or deletion of cells).

Paths beginning with a dot begin at the $Anchor 1504, or at another reference point as explicitly pretexted (i.e, a "relative origin"). Those without the initial dot are taken as relative to the point where the reference is made, as for example, given ". . . x.y.z", a reference from "y" to "z" is assumed to refer to the "z" in ". . . x.y.z rather than to some other cell called "z" elsewhere. Those paths beginning with several dots (as in ". . . x.y.z") can begin "anywhere" and thus may refer to several instances located at different points in the network.

Tree structures, called "regions," are also specifiable, as for example: ".a.b.(l,m,n.(i,j.k))" which represent all the paths formed from selections among the parenthetical names, could be used, depending on context, to designate the entire tree beginning at ".a" and following all of the implied paths, or the several cells at the ends of paths, viz, ".a.b.l", ".a.b.m", ".a.b.n.i", ".a.b.nj.k", or the regions beginning with those several cells. The notation ".a.b.(l, m, n.(i, j.k))" translates as: from $Anchor or a reference point, follow branch "a" then branch "b" then branches "l", "m" and "n"; from "n" follow branches "i" and "j"; from "j" follow branch "k".

In paths designated this way, the following of only super branches is assumed, unless otherwise indicated. To indicate the following of an ordinary branch, instead of a dot, a dot and a colon is used. To indicate following a specifically numbered branch in the branch table, a bracketed number is interposed between the preceding dot and the name; and to indicate following any branch with the name shown, a pair of brackets is interposed. Respectively, forms like: ".:b", ".[3]b", and ".[ ]b" are used. A cell is allowed to have only one super branch to a distinct cell, plus any number of ordinary branches to that particular cell. Distinct subspaces with the same name are allowed, which may point to the same cell or several different cells (since cells may have the same name even though they are at different locations). References to same-named branches are distinguished by branch table position, as for example, [3]b above. Unnamed branches are referenced by forms like: ".[3]" and "[ ]".

FIG. 17 depicts a clump frame which provides an environment for the cells within a clump. A cellular network may span multiple clumps, resident on the same or on different equipments, in the same or different physical localities. This requires that cells be able to make references to cells in different clumps, to the same effect as branches within a clump. FIG. 17 shows two clump frames 1702 and 1750 with an inter-clump reference 1752. This reference is recorded in the branch table of cell 1718 ("C") as a text string identifying the target clump 1750, followed by the full path to the specific referent cell 1754 ("E") in that clump. Symbolic path 1752 allows cell 1718 in clump 1702 to evoke cell 1754 in clump 1750 by means of a handler of symbolic references, located externally to the clumps or in special cells, as well as by means of system cell $publishedCells 1757 which contains a list of all cells to which the clump publicly allows remote access. Any recession from this evocation, if it continues receding, will ultimately recede through the $Anchor 1756 of the clump in which the evoked cell resides. A symbolic invocation or super branch may also be used by modifying the return address to indicate the full path of the invoking or evoking cell. If a super branch is implemented symbolically, the serialization operation (type 1) must be used to circumvent the ordinary recession path of cell 1754 so that recession will be redirected to the clump of the existing cell.

Since in the preferred embodiment the processionists are virtual operating processionists, their movement over symbolic links, as opposed to virtual address links, can be transduced by well known techniques, whether the two intercommunicating clumps are resident on the virtual memory system of the same computer equipment or not. The processor or virtual processor implementing each processionist, following a symbolic link, would be exchanged at each transition among address spaces or computer equipments for one associated with the domain being entered, and the values carried transferred by inter-process communication. For instance, a processionist might travel between computer equipments as a packetized message over an Ethernet LAN.

By these and similar methods, a network of cells can extend over several clumps; or residing primarily in one clump, a network can have tree-like extensions containing regions of other clumps dedicated to this role.

2. Creating and Maintaining Network Continuity

When a new cell is added to the clump, it is connected at a specified location, or at $NoWhere 1706 by an super branch from $NoWhere. When a cell is removed from its location in the clump, it is re-connected at $TUN 1712 by a super branch from $TUN. To remove a cell from its location means to withdraw the super branch reaching it. Subsequently when the cell is connected at $TUN, $TUN becomes the superspace cell of the cell. This regimen, imposed by the cell building, linking and moving operations, assures that every cell remains reachable over a path of super branches from the clump frame in which it resides.

An operation that changes the super branch of a cell by transferring the super branch designation from one of the branches reaching the cell to another one, is called a "re-supering" operation, and also acts on the two cells pointing the two respective branches at the cell, as well as re-aligning the recession branch and any coupling relationships entailed. Re-supering applied singularly, or incrementally to a sequence of cells, assures that every cell re-supered remains reachable over a path of super branches from the anchor. Thus various tree-like orderings of the network may be imposed, while connectivity and the orientation of branches are not affected. An operation that changes the orientation of an individual branch by acting on the two cells joined by that branch is called "re-orienting", and is inapplicable to a super branch directly.

In the event a cell is explicitly deleted (i.e, actually destroyed as opposed to merely moved or removed), all branches referencing it are redirected to $Surrogate 1714, or optionally eliminated.

The work of assembling cells and connecting them to the clump is performed by the cell builder and linker which is executable code that is a global resource for the system. When a cell is being assembled, it is connected at $NoWhere 1706. Upon completion it is moved to its designated location (or as soon as the location is fully specified to the builder). In addition to the location in the tree (defined by super branches), a cell has a location in the virtual address space of the host computer memory, given by a (preferably) continuous range of addresses, referred to as its virtual location. If a cell is modified, such as for instance by the addition of a branch, it remains in its virtual location unless it grows too large, in which case it is relocated to the nearest available address range of sufficient size, which may be beyond the range of addresses currently occupied by cells of the clump. (Note that while the term virtual location is used throughout, the same considerations apply in storage systems without virtual memory capability, where addressing is restricted to existing memory in the main storage area of a computer.)

While a cell is being connected, disconnected, moved or modified, all movement of processionists and associated evoking or invoking activity by explicit or implicit branches to the affected cell is suspended by cell locking logic. By way of its backward link table, the affected cell notifies all those cells with explicit or implicit branches to it of its new position in virtual address space, and then the cell again becomes available for access. Various activities which entail movement, modification of or other access to a cell are prevented from destructive collisions by an interrelated system of locks. Notification of referencing cells is carried out by the cell utilizing the information in the backward link table in its storage section. These tables contain the virtual location of every cell in the clump that references (potentially evokes or invokes) the current cell. (Cells in different clump address spaces referencing this cell cannot be included in the backward link table as address pointers, and so would need to be referenced by symbolic strings, or notified by other indirect methods.)

3. Concurrent Cell Builders and Linkers & Network Self-Modification

Through the use of noncollision locking, multiple cell-builder activities may occur concurrently, each directed respectively by any of the following: a human or automated external operator controlling a cell builder and linker via a cell builder and linker interface, and operating on a cell; a command or series of commands residing in the output section of a cell, and activated when the cell is evoked or invoked, operating on a different cell; or, implicitly by a storage operation residing in the output section of a cell, causing storage into a different cell, which may cause it to grow and move.

Because placing the whole virtual cellular network in a quiescent state, or identification of a region to place in a quiescent state, may present practical difficulties, a method called husking and a related method called ghosting are provided in the first embodiment. Furthermore, in using virtual operating processionists which are implemented using one or more conventional processors in a system of multiprocessing, a hazard of "stale references" at the level of machine addresses may arise, depending on the interaction among concurrent processionists. For example, the thread of processionist A may have identified the virtual location of cell X, and before it has time to carry out a machine language operation effectuating the reference to cell X by this address, processionist B may have caused the movement of cell X rendering the address in the machine register of processionist A "stale." Unfortunately, multi-threaded locking schemes implemented in software are not sufficiently fine-grained in time to prevent such derangements.

In addition, protracted references (as mentioned previously) may be carried in an evaluation process of any of a number of concurrent threads under some implementations of the first embodiment, and these cases can more flexibly be dealt with by exploiting the method of husking and ghosting.

Two types of husking are evanescent husks, and persistent husks with periodic resolution. With evanescent husking, when a cell moves, it leaves behind in its original virtual location a copy of its entry zone, with pointers installed to bridge any stale references to the cell's new virtual location by indirection. The husk is required to persist only for a period of time comparable to the multiprocessing system's complete cycle among all virtual processors. This is sufficient in some system configurations to solve the problem of stale references at the machine register level, but does not support protracted references.

With persistent husking, a husk is created only the first time (in the current resolution cycle) that a cell moves from its starting virtual location; while on any subsequent move, the husk is updated to bridge to the cell's latest virtual location. Resolution of the husks is attempted periodically; when it can be assured that no protracted references may be outstanding, the husk is eliminated, and any remaining references via the husk are updated to point directly at the latest virtual location of the cell (where the entry segment had been inactive during the persistence of the husk). For this operation to be assured of success, the formation of potentially stale references concurrent with the operation must be precluded, or else a method analogous to evanescent husking may be employed on the resolved husk during the operation to handle any such new stale references as may have originated. The old virtual location of a cell can be recycled to the storage pool, including the space of the husk once it becomes irrelevant.

Ghosting is a technique to prevent conflicts between the use of protracted references to a cell's output contents, and the ability to keep the cell current with changes induced by concurrent activities (i.e, when its contents change or it is otherwise forced to grow triggering movement to a larger virtual location). With ghosting, a trueCell that has a protracted reference to it may be replaced by a new, different trueCell, with both the ghost (passive, old trueCell) and new trueCell (operational) performing as desired and without extensively locking out execution from that cell (see section 5.10 which discusses ghosting in detail). Thus, subsequently any outstanding protracted references to the output contents of the cell will reference the contents as it existed at the moment the reference originated in the evaluation process, or at latest the moment when the ghost was formed, regardless of any changes in the cell in its new virtual location.

Ghosting, and the related husking, is triggered if a cell locked for protracted reference to its output is then referenced by any activity requesting modification (including simply relocation) of its output section. After a cell has thus moved once, leaving a ghost, it can subsequently be ghosted and moved additional times without further husk creation, as under persistent husking the original husk is merely updated for the new location of the trueCell. A ghost can be freed and its virtual location space recycled to the storage pool once the activity accessing its contents has completed.

4. Cell Locking 4.1 Protecting Cell State in a Multi-Threaded Environment

In a multi-threaded, multi-tasked environment (with provision for multi-processors so one to N processors may be harnessed), there can be from zero to N threads (limited only by system resources) accessing any cell at any time. An active cell at times may have dynamic state that must be retained, or may be undergoing transition (including content modification and possibly physical relocation) that precludes the cell from behaving competently until the transitive process (during which internal pointers and content are not fully formed) is completed. Additionally there is one rare cell state (one-shot recession) that must be protected until resolved. This is why a multi-tasked, multi-threaded locking mechanism is needed, since any thread from any task may need to cooperatively, non-destructively access a cell with N other threads from M other tasks. There are two classes of threads that access a cell:

1. utility threads that:
   a. passively traverse (inspect and follow links but do not execute cellular code) for the purpose of building, finding, deleting, repairing, and mapping cells or the cellular network. Utility threads are restricted in their execution of a cell's code to within the cell's boundaries, and never trigger network behavior;
   b. execute cellular code within but not beyond a single cell's boundaries (i.e. perform cell output but do not execute the branch evaluator);
2. processing threads (processionists) that actively traverse (execute cellular code) the network and evoking and invoking cells. Processionists additionally can and do access utility thread capabilities (i.e, they find, inspect, build cells, delete, etc.), so processionist functionality is a super-set of utility thread functionality.

The term "thread" will be used as a catch-all for these two roles, while the term processionist refers to the second type of thread described above (i.e, a processionist may perform some utility functions, but a utility thread is not a processionist; it is always passive and never actively traverses the network executing cellular code).

Regardless of a thread's role, cell locking provides mechanisms whereby a cell can be shared or exclusively locked as appropriate depending on the nature of the lock being requested, which in turn reflects the nature of the function the cell will perform (or have performed on it in the case of editing or referencing/finding). The intent of locking is always to protect mutable state where necessary, but to avoid exclusive-use limitations under stateless or stable-state situations (i.e, state changes are protected and "read-only/execute without modification" uses are freely allowed).

The locking mechanism also provides the run-time interface for husked cells (see discussion on husking above). The cell husk (which has a known and fixed location) is always the portion locked/unlocked, with one exception, the protracted reference lock (PROTRACT_REF). The husk is the vector to the trueCell—the trueCell address is what is returned upon successful locking, allowing all operations to occur in/on the trueCell. The trueCell contains the operational code and contents of a cell, the husk provides the stable gateway to the moveable trueCell, and the locking mechanism provides the serial lock-stepping such that the trueCell is always accessed at the proper location, and is inaccessible during its state and location transitions. When there is no distinct trueCell (husk==trueCell), the cell is called a singular cell, and is a gateway to itself in this original state, and the singular cell contains all active elements with no division of function like the husk/trueCell state.

The basic requirement of locking is to allow cell sharing where possible by different threads that are using the cell in a "read-only" fashion, but to lock a cell for exclusive use when required for protection of cell state that a specific thread depends upon.

In one embodiment, there are seven different whole-cell locks that result from five basic activities that can access a cell (see Table 4 below, "Types of Whole-Cell Locks"). Some of the whole-cell locks are exclusive, while others allow sharing access of the cell with other compatible shareable types of accesses.

2. for PROTRACT_REF: These are locks that are placed on cells that have contributed a portion of their output section contents by reference to the Evaluation Space (ES). A PROTRACT_REF lock's purpose is to protect a cell's output section contents when there are one or more (ES) references to it. See section 5.9 "Protracted References to Cells and Their Role in ES's."

4.2 Locking and Unlocking Cells, Wait-queuing and Dequeuing Lock Requests

When a cell lock request occurs by a thread, an encoded truth-table is consulted to see if the specific requested lock-type can be immediately granted given existing locks already on the cell, or if the lock request must be placed in a linked-list queue for future consideration once one or more existing locks has been removed.

When unlocking requests occurs, for shareable locks the appropriate lock count is decremented, and if it goes to zero, the lock is cleared. For unshareable locks, the specific lock state is cleared. In either case, if a lock has been cleared, the cell's lock queue is searched for its first member, and if it has one, the member is considered reapplying the truth-table of existing locks versus the queued (requested) lock. All other elements (lock requests) in the queue will be considered in order until all have been processed (either retained in the

TABLE 4

Types of Whole-Cell Locks

| Activity | associated lock(s) * | persistence |
|---|---|---|
| evoking | BEV (being evoked shared) | depends on convergence model (see note a) |
| | BEV_ONE (private form) | depends on convergence model (see note a) |
| | PROTRACT_REF * | until all Evaluation Space (ES) references are consumed (see note b) |
| invoking | BIN (being invoked shared) | until return from invoke occurs (no private form necessary) |
| | PROTRACT_REF * | until all ES references are consumed (see note b) |
| editing (creating, modifying, deleting a cell) | BMOD (being modified) | until modification complete |
| | STORE_TO storing into (== defining the output section of a cell) | until modification complete |
| referencing (finding a subspace) | FINDER | until traversing of Branch Table is complete |
| converging | CONV | once completes convergence |

* NOTE: The same PROTRACT_REF lock is used for evoking and invoking.

Persistence notes for Table 4

1. for BEV: BEV always persists minimally through the branch evaluator's complete processing of the evoked cell. Beyond that, BEV's persistence depends upon the convergence, forwarding, and looping model. See Table 6 "Disposition of BEV Lock Upon Branch Evaluator's Last Branch."

queue or granted and removed), or one queue member requests an exclusive, non-shareable lock. The queue elements in the lock request queue for a cell may come from multiple threads and multiple tasks—any thread may unblock another thread's (from same or other task) wait and in essence grant it the lock if it meets the locking truth table criteria. Table 5 is a truth table showing whether a requested lock will be allowed given an existing lock already in place.

TABLE 5

Locking Truth Table - Exclusive and Shareable Locks

| | (requested lock →) | | | | | | |
|---|---|---|---|---|---|---|---|
| (existing lock) | BEV(1) | BIN | BMOD | STORE_TO | PROTRACT_REF | FINDER | CONV |
| none | Y | Y | Y | Y | Y | Y | Y |
| BEV | Y/N(1) | Y | N | N | Y | Y | Y/N(2) |

TABLE 5-continued

Locking Truth Table - Exclusive and Shareable Locks

| (existing lock) | (requested lock →) | | | | | | |
|---|---|---|---|---|---|---|---|
| | BEV(1) | BIN | BMOD | STORE_TO | PROTRACT_REF | FINDER | CONV |
| BEV_ONE(1) | N | Y | N | N | Y | Y | Y/N(2) |
| BIN | Y | Y | N | N | Y | Y | Y |
| BMOD | N | N | N | N | N | Y/N(3) | N |
| STORE_TO | N | N | N | N | N | N | N |
| PROTRACT_REF | Y | Y | Y(4) | Y(5) | Y | Y | Y |
| FINDER | Y | Y | N | N | Y | Y | Y |
| CONV | Y | Y | N | N | Y | Y | Y(6) |

Legend to Table 5

1. BEV "Being Evoked": This is the standard shareable evoke lock form. Typically persists until exit occurs (or wild-branch taken for non-parallel case), but see Table 6 "Disposition of BEV Lock Upon Branch Evaluator's Last Branch."

2. BEV_ONE "Being Evoked One-shot": A rare run-time form where a cell must be locked exclusively (unshareable) for this specific evoke. Typically persists until exit occurs (or wild-branch taken for non-parallel case), but see Table 6 "Disposition of BEV Lock Upon Branch Evaluator's Last Branch."

3. BIN "Being Invoked": shareable with other invokes and evokes (including BEV_PRIV)—persists until return occurs.

4. BMOD "Being Modified": is a state the exists only as long as is it takes to build/rebuild a cell section and resultantly to move a cell and/or an in-cell component if necessary to fit in a larger section (the cell may/may not have sufficient room for expansion if expansion is required).

5. PROTRACT_REF "Protracted Reference": This is a reference into cell from one or more thread's ES. The purpose of a protracted reference lock is to preserve the output section contents of a cell so that the contents remain the same until the references to it are no longer needed (consumed). This means a descriptor in some ES refers to a cell's contents. That cell may be accessed in ways that do not move the cell or change it's internal structure. Thus the cell may be evoked or invoked. The cell may also be locked (BMOD/STORE_TO) and then modified, using husking and ghosting as described above to retain the contents of the protracted reference as long as necessary This lock allows multiple PROTRACT_REF locks concurrently via a count "protractedRefLockCnt."

6. FINDER: a finder is searching through the cell for subspaces in the branchTable which is locked for its duration. This lock allows multiple FINDER locks concurrently via a count "finderLockCnt."

7. CONV: a thread is recessing and converging back to a superspace from a subspace.

Notes to Table 5

1. BEV is the standard shareable lock request form. If the lock can be granted in the shareable form it is, which is the normal operational result. There are three circumstances where the lock is not be granted shareable to the requesting processionist:

a. (build-time attribute) the cell has a non-shareable loop count form of repeating, which is a stated condition of a cell that must be protected and cannot be shared by more than one processionist. Only one processionist may lock the cell for BEV.

b. (run-time attribute) if a cell's (the superspace) branch evaluator determines the need to evoke multiple subspaces (including the one in question), but there are not enough system resources (threads, processors, etc.) to create another processionist, the superspace's branch evaluator performs the evoke in a serial fashion. Resultantly, the subspace is modified via the serialize operation, which gives it unshareable state relative to other evokes. Thus, in this situation, the subspace lock is granted (when possible) as BEV_ONE, an unshareable form with other evoke requests (as they would otherwise lead to improper recessions—see discussion of branch evaluator). Note that BEV_ONE is not exclusive of BIN, nor is BIN exclusive of BEV_ONE, since they use different exiting techniques. A cell can be traversed by N processionists invoking the subspace while another processionist evokes it in the BEV_ONE lock state, but any additional BEV requests locks would be blocked until the BEV_ONE state clears. Also note that a BEV_ONE lock request will not be granted if any BEV locks are outstanding.

c. the cell has a complex, parallel convergence and forwarding form (WaitForNth or WaitForAll, and ForwardNth or ForwardAll) with attuned (finite) capacity to support N concurrent processionists. Processionist N+1 will be locked out until convergence for another processionist completes, freeing up that resource for it. Thus for this case, the BEV lock is granted shared until N processionists are active, and then denied until the resource free.

Note there is a second case whereby BEV will not be granted even though there is no BEV_ONE outstanding. For cells that engender parallel branching and have WaitForAll/ForwardAll or WaitForNth/ForwardAll convergence and forwarding models, there is a cell-build or cell-edit time limit placed on: 1) the number of concurrent processionists per user allowed to share the cell; and 2) the number of concurrent users allowed to share the cell. The first limitation may be placed on such cells for constructs that make no sense to have parallel evoking on a per user basis. The second limitation is to allow such cells to still be shared by multiple users, and to anticipate maximum realistic load given system utilization information. When either of these limits is exceeded, the requesting processionist is blocked, and the BEV not granted until either/both limits are no longer exceeded.

2. the CONV lock is applied to two basic classes of cells, cells that retain their BEV lock upon last branch, versus cells that do not (all cells fall in one of these two classes):

a1. cells with complex convergence models ("Wait for All" or "Wait for Nth") normally retain the BEV lock after the last branch has been taken: for these cells the CONV lock is granted while BEV is still outstanding, since the evoke and the conversion are related (or assumed to be in the case of a wild-branch leading to conversion back through the cell in question). See Table 6 "Disposition of BEV Lock Upon Branch Evaluator's Last Branch."

a2. cells that having unshareable looping forms also retain their BEV lock (and thereby protect the loop count state) regardless of the conversion model; again for these cells the CONV lock is granted while BEV is still outstanding, since the evoke and the conversion are related (or assumed to be in the case of a wild-branch leading to conversion back through the cell in question).

b. cells with simple convergence models ("Free for All" or "None Specified") as well as encore cells (which may only have one of these two convergence models) do not retain the BEV lock after the last branch has been taken—in these cases, CONV is never blocked even while BEV is true (even though that BEV lock must be for a newer evoke than the one that resulted in the convergence occurring, as there is no convergence state to protect within the cell).

3. if the thread holding the BMOD lock==finder thread, then the finder lock is allowed, since this thread is doing the modification and can guarantee that the branchTable will not be corrupted/moved during the find operation (no other thread can guarantee this).

4. note that BMOD is optimized so that ghosting for a cell with PROTRACT_REF occurs only if the modification:

a. makes the cell move to grow (which would move the cell's output section); (or)

b. would cause the output section to move within the cell even though the cell itself does not move; (or)

c. operates on the output section directly, thus changing its contents.

5. storeTo lock request causes a new trueCell to be created with resultant ghost if a trueCell previously existed and PROTRACT_REF is to the old trueCell, or if there is no PROTRACT_REF but the new contents will not fit in the old trueCell without moving it, a new trueCell is created and the old trueCell is deleted.

6. There are in essence three levels of convergence locking: one that is coarse grain, and two that are fine grain. The CONV lock is the coarse grain lock, and has the basic function of making sure no activity is allowed that makes the cell move. CONV locks are shareable even if there is state being accumulated, i.e. for stated forms WaitForAll or WaitForNth forms. The fine grain locking forms occur within the coarse grain CONV lock. The two finer grains are implemented with mutex sub-locking within the convergence lock for WaitForAll or WaitForNth forms:

a. a mutex that guards all convergence blocks and serializes i. assigning preallocated convergence blocks to a lead processionist (and decrementing free count); and ii. the freeing of preallocated convergence blocks to a lead processionist (and increments free count); (note locating the convergence block for a recessing processionist by process identification number (PID) need not go thru the mutex).

b. a per convergence block (per PID of the lead processionist at branch evaluator time) mutex within each convergence block. This mutex is used by:

i. the branch evaluator to update the expected convergence count for that lead processionist that engenders any related evoking processionists; and ii. same PID processionists (recessing processionists engendered by the same lead processionist) to access the converged count.

For convergence cases involving "None Specified," "FreeForAll" and "Ignore", there is no mutex sub-locking as there is no state to guard. The point of having convergence generally shared (coarse grain), and using very quick mutex locking/unlocking (fine grain) for tiny portions of convergence is to avoid the following inefficient conditions:

1. When a recessing processionist is preparing to converge to superspaceB, it locks a superspaceB for CONV, and converges back, it may in turn recess back from that superspaceB to a superspaceA. That transition requires the temporary holding of two CONV locks:

a. of superspaceB, since it is now in the final stages of exiting; and b. of superspaceA, which will be recessed back to.

If superspaceA cannot be locked at that moment, the processionist will be blocked while it holds a CONV lock on superspaceA. If this CONV is not shareable, it would cause other recessing processionists to be locked out, even though these processionist may not in turn attempt to recess back to superspaceA.

2. when a recessing processionist is preparing to couple to siblingB, and is blocked on the BEV lock request to siblingB, a similar situation as 1) occurs if siblingB is not lockable. A shared lock allows other processionists to traverse through superspaceB that might not continue on to couple to siblingB (if they do, they'll simply stack up on the same BEV lock request until it is granted).

4.3 Shareable and Unshareable Evoke and Invoke Locks

Typically, all invoking and evoking can occur in a shared environment. This is because the stated information is generally carried by the processionist. For both evoking and invoking, the processionists' state information is:

1. the branch evaluator's variables, which have a linked-list frame in the processionist for each cell the processionist is currently evoking.

2. the ES (with the CV and CVIP); and 3. the stack, which may contain invocation level information.

All forms of invoking result in the BIN lock, which is totally shareable by other invokes and evokes of the same cell by other processionists. All forms of evoking result in the BEV lock which is totally shareable by other invokes and evokes of the same cell by other processionists, except as is limited as follows. There are three conditions where evoking is not allow shareable. These conditions occur when the cell:

1. is an unshared repeat N type where the count N is part of the state that must be protected;

2. is undergoing the one-shot-jump condition (see Table 5 "Locking Truth Table—Exclusive and Shareable Locks" and accompanying note 1); or 3. has stated, parallel convergence forms where the cell has a pre-allocated number of processionists it may accommodate. Evoking occurs in a shared fashion until the number of convergence blocks is exhausted, then it occurs in a serial, unshared fashion for each additional lock request.

4.4 Additional Discussion of Convergence Locks

All convergence back to a superspace involves locking the superspace for CONV (convergence lock). This is necessary regardless of the convergence model of the superspace, and thereby makes the superspace's convergence model or optional Encore or Looping sections irrelevant to the subspace that is recessing back to the superspace. However, the granting of the CONV lock varies depending on the structure of the superspace (see Table 5 "Locking Truth Table—Exclusive and Shareable Locks", and accompanying note 6). This mechanism is hidden from the subspace and implemented in the generic locking routine. An integral part of this mechanism is the disposition of the BEV lock upon the branch evaluator's last branch from the superspace which is being recessed back to when the CONV lock is considered as shown in Table 6 below.

TABLE 6

Disposition of BEV Lock Upon Branch Evaluator's Last Branch

|  | Looping Type | | | |
| --- | --- | --- | --- | --- |
| Convergence Model | none | Encore | Private Looping | Shared Looping |
| Wait for All: | retained | released | retained | released |
| Wait for Nth: | retained | released | retained | released |
| Free for All: | released | released | retained | released |
| None Specified: | released | released | retained | released |
| future rules(1): | retained | released | retained | released |
| future rules(1): | released | n/a | retained | released |

Notes to Table 6

1. the above table is one implementation but is not meant to limit other permutations in combination with the looping type.

The intent of retaining the BEV lock is to protect state where necessary. Such cell state is by design absent from cells with the simplest convergence models with either no looping or encore present (the count of "Encore N" is considered disposable, unprotected state, and is reset every time an "Encore N" cell is evoked) and with no private looping. Encore is by intent shareable, as is shareable looping. In both these forms, the cell's would-be stated information (any branches taken, or loop counts) is carried by a processionist group's cellFrame which is locatable by any processionist within a processionist group (typically a user's private set of threads), but not shared outside the processionist. The cellFrame persists until recession from that cell occurs in the appropriate cases. In this way, encore or shareable looping is not processionist dependent for each processionist group, and concurrency within a shareable looping or encore cell between users is allowed, while processionists for each user (processionist group) interact with the cell appropriately. Note the intent of encore is to allow repeated behavior of a cell that is continually evoking subspace(s) and being recessed back to, and additionally it is a construct to be shared by multiple processionists. Thus it does not retain its BEV lock upon its last branch, so it can be shared by multiple processionists. Looping, on the other hand, is a construct that causes repeated behavior of the cell regardless of whether there is any branching or not relying on a loopCount or other test. Private looping is not a shareable construct among multiple processionists and must be linearly accessed only upon cessation of looping by the first processionist. ("Shared looping," however, has been distinctly provided for above.)

A processionist converging, after being granted the CONV lock, will lead to the CONV unlock (or CONV transformation to BEV) in different paths depending on the convergence model:

1. None Specified or FreeForAll: processionist continues onto the forwarded value handler, and the lock is cleared:
   a. (when invoked) just prior to the return to the invoking cell;
   b. (when evoked):
      i. (no repeater section) after locking the superspace cell for CONV and just prior to jumping to the superspace's convergence section, trueCell is unlocked for CONV.
      ii. (encore section):
         a. (encoring) just prior to jumping to repeat the cell, the lock is transformed from CONV to BEV;
         b. (not encoring) the lock is cleared just prior to performing coupling or recession.
      iii. (loop section) the cell is unlock for CONV just prior to doing the looping behavior or is complete (always, for the "None Specified" case).

2. all other forms: the unlocking logic for these are complex, and there are many different paths depending on whether full parallel operation, partially parallel operation, or fully serial operation is occurring. In general, however, the following principles hold:
   a. non-forwarding threads unlock CONV prior to be extinguished;
   b. forwarding thread is same as for None Specified or FreeForAll above (see section 5.5 "Convergence Rules Outlines and Their Role in CV Handling").

4.5 Lockable Cell Sections

In the exemplary embodiment, there are no cell sections that are lockable independently of other cell sections. All locks are whole cell locks. This is necessary since going through the cell locking mechanism is the only way to find the trueCell's current address and thereby guarantee execution in the proper address range for the cell, since other threads may modify/storeTo the cell, causing the cell to move. Rather than being section oriented, locks are functionally oriented with the emphasis of allowing shared concurrent access when ever possible (i.e, whenever destructive interference is impossible).

A simple example of why cell section locks are not adequate is the case where a cell is being converged to by one thread, while another thread is attempting to store to it. The convergence lock must be a whole cell lock, otherwise, the storeTo operation could cause the cell to grow and move, in turn moving the cell's currently-being-executed convergence section, which would be destructive to the convergence process. Hence, the convergence lock is a whole cell lock, and in this example blocks the storeTo lock request, protecting the convergence section from on-the-fly relocation while it is being executed. Note, however, that for convergence there are sub-locks that occur inside the shareable convergence locks. See section 4.4 on "Additional Discussion of Convergence Locks".

5. Evaluation Space, Forwarding Handling, and I/O Model 5.1 Terminology: Forwarded Value Is Identical to Current Value (CV)

The term "forwarded value" refers to a value (a series of zero or more linked descriptors) that is identical to the value referred to by the term CV. The difference between terms is simply emphasis of context. The term Current Value arose from the process whereby a cell's output section creates a "current value in progress" (CVIP) which upon completion, transitions to the "current value" (CV). The existing CV may be referenced within a CVIP (via $$it) and become part of the CVIP, hence one need for separate spaces. The term CV is more descriptive from the point of view of the cell in the context of in-cell execution by the processionist. In contrast, the term forwarded value is more descriptive from the point of view of the processionist as it executes cell-to-cell transitions (either evoking, recessing, invoking, or returning from invoking). However, either term is equally valid in either setting and the two are synonymous.

5.2 Terminology: Evaluation Space (ES)==CV and CVIP

Note that the term Evaluation Space is synonymous with the combined CV and CVIP at all invocation levels for the processionist (see below regarding invocation levels). Every processionist has its own unique ES, although processionists can reference shared elements that are outside a single ES.

5.3 Current Value (CV), Current Value In Progress (CVIP) and Evaluation Space (ES)

As each processionist traverses a cellular network (evoking and invoking cells), it consumes and releases space for the CV's and CVIP as they are created and discarded. This space is called the Evaluation Space (ES). The ES accumulates the contributions of each output section's elements, and is implemented by using:

1. an in-line (allocated on a per processionist basis) linked-list Evaluation FIFO (E≧FIFO); and
2. out-of-line elements for large data components (allocated/freed on demand from the huge pool shared by all processionists).

An ES may actually consist of a pair of E'FIFOs for each invocation level (see below), each separately embodies: 1) the CV; and 2) the CVIP.

As each processionist processes through the network, it starts with an "null" ES, and uses this as the first evoked cell's inherited CV. The CVIP is reset to null for each cell as it is evoked or invoked (note that the CVIP is saved for the current invocation level prior to each invoke, so that returning from the lower invocation level can append a returned CV for that invocation on to the higher level's restored CVIP). As the output section of a cell is executed, that output section may contribute to the CVIP by appending to it. The output section is built up with executable elements that encapsulate descriptors and data or commands. Either a descriptor and its immediate data, or the results of a command (as encapsulated by a run-time-created descriptor and data) are placed onto the CVIP as the output section is executed on a per element basis. The CVIP is made up of one or more cells' output sections contribution collated together. At any time a cell has both a CV and a CVIP (carried by the processionist), with the CVIP being under construction as a cell does it's output section operations. Output sections are made up of zero or more statements, each statement being either a simple data type, or even multiple, disparate data types compounded together. The end of an output section statement causes the CV to be replaced by the CVIP, which may consume the former CV and cause resource run-down of all former CV elements. There can be one or more elements per statement, and zero or more statements per output section.

The contents of the ES consists of a series of one or more linked descriptors and associated data where appropriate that make up the CV or CVIP, as well as pointers to out-of-line data (indirect references) There are five basic descriptor forms:

1. immediate data element descriptors (examples follow):
  a. indefinitely extensible integers (16 to 16*N bits long, dynamically growing as computations dictate);
  b. double floats (IEEE 64 bit format);
  c. text;
  d. sound (including music) of various numbers of voices and rates sampling (8-bit single channel mulaw, 16-bit linear, 22 KHz stereo 44 KHz stereo, etc.);
  e. images;
  f animations (various data types, including PostScript, sequential digitized images from standard and future video sources such as NTSC, PAL, S-VHS, SECAM, HDTV, etc.);
  g. arrays of homogenous data types (including, but not limited to, any of the above);
  h. commands (to build cells, do file operations, etc.);
  i. meta-commands (a meta-command is a command given in terms of the desired results rather than program steps and must be interpreted by a suitable agent (whether human or automated) into the necessary computer instructions).

2. deferred resolution element descriptors (a data element reference that is not dereferenced until output time: file references, data base references, etc.). For instance, a file path is used as a reference to its contents. This is resolved at output time (i.e, a file must be read in and processed, or a data base queried for its current data). This form has two states: deferred, or resolved with indirection. When resolved, a pointer points to another descriptor with the actual data;

3. in-cell (protracted reference) element descriptor (currently one type only). This is to a portion of the output section contents of a cell (typically the last statement), and can be any data type, 4. shared element descriptor (one type only). This is a descriptor that is used as the header descriptor of a sequence of ES elements that are shared by two or more processionists (thus, while each processionist has its own CV and CVIP pointers, what they point to may be private or shared across many processionists—this ability to share a sequence of ES descriptors is the basic mechanism by which the BE may efficiently hand off the same inherited CV to multiple parallelly dispatched processionists during BE-driven parallel cellular network traversal); and 5. array element descriptor (one type). In general, this descriptor contains N pointers to other descriptors that can in turn be homogenous single descriptors or heterogeneous including pointers to the head of a series of descriptors. The simplest use is as a output section build-time wrapper of homogenous data, like C-language arrays of ints, floats, strings, etc. However, the array descriptor is also used for collecting parallel recessionists' convergence contributions in a convergence array, that can then become the new CV, which can be a homogenous or highly heterogeneous in nature.

The above descriptors exist in slightly different forms in different contexts:

1. they have a code wrapper when part of the output section (forms 1, 2, and 5);
2. they are a pure descriptor and have possibly deferred content when part of the CV or CVIP prior to output time in the ES (form 3); or
3. they are fully resolved at output time (expanded in the ES) (forms 1–5).

Every processionist's context block has a set of descriptors that are used to manage the ES, showing the start and end of the CV, the start and end of the CVIP. As a processionist processes through a cell network, it constantly builds, outputs, and consumes (via replacement of CV by CVIP) portions of its ES.

As a cell's output section is traversed, the output section's code copies descriptors and associated data contained in the output section into the CVIP where they are linked to previous members. Should the data contained in a cell for one element be larger than a tuneable threshold, a protracted (in-cell) reference descriptor is placed into the CVIP that only contains the address to the full data in the cell, but the data is not copied. Should the descriptor be a deferred reference, the deferred state is maintained until output is requested as indicated by the cell programmer.

As in-line or out-of-line components of the CV are consumed, they are freed back to the task general pool that may be shared by a large number of processionists (the number of processionists and memory are only limited by system resources) (that is, references to components within the current cell). In-cell references are necessarily run-down differently—here the cell containing the referenced descriptor merely has its resource-count decremented, and the protracted reference lock is released when appropriate (count==0), so for in-cell cases no memory is to be released to the general task pool. However, if the protracted reference is to a ghost, that ghost is eventually released back to the bounding clump (which is shared by all tasks mapping it).

In-line components may be scaled for small descriptors and data items, versus in-cell referenced data which is typically scaled for large data where the overhead of allocating/freeing is not efficient (with the trade-off of locking the referenced cell to a specific location until the in-cell references (known as protracted references from the cell's point of view) are cleared).

The virtual memory for both in-line and out-of-line (non-in-cell-reference forms) data is separate from the clump and comes from the virtual memory used by the task in which the processionist runs versus clump virtual memory space. Each processionist has its own context, including its ES and controlling descriptors. A CV (part of the ES), however, can be extended or cleaved off and shared with other processionists as parallel branching dictates.

An important situation that requires special CV handling occurs when a processionist engenders additional processionists via parallel branching from the branch evaluator. When the branch evaluator evokes only a single cell with the lead processionist (serial versus parallel evoking), it carries the current CV to the evoked cell. In the parallel case, since each processionist may independently append onto, replace and consume the CV, the same CV may not be referenced. Instead the same CV must be "duplicated" to N processionists so each modify or consume its CV independently.

This duplication is accomplished by tearing off the entire CV E'FIFO from the lead processionist, prefixing a shared output section descriptor to the entire sequence, and then creating a new CV E'FIFO for each new processionist, as well as a new one for the lead (existing) processionist. The only element in these new E'FIFOs then becomes a single shared element reference descriptor. The CVIP has no definition at this stage (since CVIP is an output section and convergence time construct, but not a branch evaluator-time construct), so it is carried as zero (really a meaningless value) to the new processionists.

5.4 ES (CV and CVIP) Handling Rules

As a processionist traverses the cellular network, it invokes and returns, evokes, recesses and converges, as well as potentially engenders other processionists while running the branch evaluator for a cell. All of these activities impact its ES (CV and CVIP handling) and ultimately forwarding. It is crucial that the system properly harmonize these activities so that they are in concert with one another.

The basic rules for ES manipulation are applied from the point of view of single processionist as it traverses a cellular network (clump). When multiple processionists from multiple applications are traversing the same clump, they all independently conform to the same rules, with no interplay, except as dictated by cell locking, shared ES resource run-down, and convergence rules. The basic rules (excluding locking and convergence) are:

1. Nearly all the ES related resources are carried (owned) by the processionist as it traverses a net, including its:
   a. thread number (used when there is a meaningful lead processionist) and process identification number, or PID numbers (in this case process=application); and
   b. CV (forwarding value), which always exists (and can be null) regardless of the activity being performed; and
   c. CVIP, which only has meaning during output section operation, and replaces the CV at each output section statement juncture (except certain commands that do not replace the CV); and
   d. invocation level, which indicates the number of invocations the processionist has performed that have not yet returned. The starting invocation level is zero. An invocation level of −3 denotes that there are three unreturned invokes for the processionist (values greater than zero are impossible); and
   e. stack contents (if any, which capture the state of each invocation level) caused by one or more unreturned invocations (which can cascade to a depth only limited by stack resources—this is similar to nested subroutine calls in standard programming models). The most important components of the stack are:
      i. the return address for the return from invoke to the invoke routine,
      ii. the CV at invocation time (it can change within the invocation, but the pre-invocation CV must be preserved as it is valid at the pre-invocation procession level);
      iii. the CVIP at invocation time (it will be appended onto by the returned CV result of the invocation);
      iv. the return address from the invoke routine into the part of the cell that did the invoke (in this discussion, part of the output section, although invokes may also occur from peculiarities section (calculating loop conditions or counts) and branch section (conditional calculations).

2. At processionist creation time it inherits:
   a. its process (application) number from the owning application;
   b. its thread number is initialized by the Operating System (O/S);
   c. its stack is initialized by the O/S.
   d. its CV is set to null;
   e. its invocation level is set to 0 (i.e, no invocations outstanding).

3. The only time CV values are ever retained (owned) by a cell occurs during "WaitForAll" and "WaitForN" convergences, when the cell buffers all converging processionists' CV's until a processionist can proceed with the collection of forwarded values as the new aggregate CV.

4. In addition to cooperative parallel convergence, a cell may persist in contributing to a fully formed CV is when there are IN_CELL references from the CV to the cell. Otherwise, the CV exists as a linked list of descriptors with in-line (directly following the and contiguous with the descriptor) or out-of-line (separate from the descriptor) data.

5. Although a CV is nearly always owned by the processionist, only a cell can create a CV (as the processionist executes the cell's output section or completes cooperative parallel convergence). When the processionist is in transition between one cell and another (recessing or returning) the exited cell's CV ownership is clearly carried by the processionist and is known as the forwarded value. However, less obviously, the "ownership" of the CV even at output section execution time is also with the processionist, as the processionist is the active agent traversing the cell (and other processionists with their own separate CV's may be concurrently traversing the cell as well).

6. When a processionist evokes a cell the processionist:
   a. carries its CV along into the cell; and
   b. resets its CVIP to null.
7. A CVIP is a stacked processionist resource that persists only for the duration that a cell's output section is active (whether evoked or invoked). It is stacked in that a processionist will have as many CVIP's as it does invocation levels (unreturned invokes).

The CVIP has three states it cycles through during output section execution:
   a. reset and null
   b. under construction (possibly null construction and null content)
   c. fully formed and complete—it thereby transitions to the new CV and the CVIP itself transitions back to (1).
8. The CV may be referenced at any time in the output section (syntactically as $$IT), and the CV can in this way be appended to the CVIP at the current invocation level. There is no explicit way to address the CVIP. It is implicitly what is being built.
9. A cell's output section is built up of zero or more statements. Each output section statement is built up of one or more elements. Each output section element consists of code and possibly encapsulated data, that, when executed, may cause an action and may or may not append data onto the CVIP. Once an output section statement reaches the end of its execution (all elements have executed) it executes "end of statement" code that replaces the old CV with the now fully formed CVIP, which becomes the new CV.
10. Invoking a cell:
   a. pushes onto the processionist's stack the return address of the code within the invoking cell and calls an invoking routine;
   b. the invoking routine pushes onto the processionist's stack the current invocation level:
      i. CV (a pointer to the start element, and a pointer to the end element);
      ii. CVIP (a pointer to the start element, and a pointer to the end element); and
      iii. invoking routines return address;
   c. carries the processionist's CV in from the evoker (which may be replaced but not consumed at lower invocation levels);
   d. decrements the processionist's invocation level; and
   e. resets the evoked cell's CVIP to null. When returning from invocation, the processionist:
   f. pops off the return address of the invocation routine and returns to it;
   g. increments its invocation level;
   h. promotes (increments) the invocation level of the forwarded value (returned CV) to the processionist's invocation level, since this is now the level at which the processionist is traversing cells;
   i. pops the CVIP;
   j. appends its returned CV onto the CVIP of the cell being returned to; and
   k. pops the invoking cell's return address and returns it.

Invoking a cell causes the invoked cell's returned CV to be appended onto the invoking cell's CVIP. Thus, an invoke element within an output section statement simply causes the CVIP to grow.

Note that invoking and returning from a cell and accompanying CV handling can be as simple as a single cell invoke and return (without other cells invoked or evoked). In contrast, invoking and returning from a cell can be unlimitedly complex via a massive sub-net response of multi-level invokes and evokes including parallel activity at many different invocation levels and across many processionists and even across different clumps on the same or distributed machines.

Note that invocations outside of the output section may occur regarding:
1. peculiarities (e.g. get a loopCnt by invoking a cellular equation); and
2. contingencies (e.g. invoke a cellular equation to determine whether or not a branch should be taken: ?(cellA & ~cellB)==TRUE{cellB} where the contingency is represented here as a standard C-language like expression). These invocations outside of the output section do not change the CV and CVIP for the invoking invocation level. The CV returned by these operations are used and consumed (with resource run-down) as their context dictates.
11. The following set of activities may directly change a processionist's CV at the same invocation level:
   a. evoking a cell: the mechanism by which the CV is changed is by the cell executing an output section end-of-statement in any cell at the same invocation level. By definition, this causes the CV to be replaced by the fully formed (by definition) CVIP.
   b. recessing from a subspace back to a superspace: the mechanism by which the CV is changed applies only to cooperative parallel forms of combined convergence and forwarding models. See section 5.5: "Convergence Rules and Their Role in CV Handling."
12. The following set of activities may lead to the CVIP being added to:
   a. executing an output section element within the current output section statement, whether the statement be:
      i. non-cell-invoking forms (e.g. text, sound, file, commands, etc.) contributed directly to the CVIP by appending to it (note that some non-invoking forms may not contribute anything to the CVIP, rather than only trigger behavior or NOOP); or
      ii. cell invoking—the returned CV from the lower invocation level (produced by the sub-net underneath the invoked cell including simply the invoked cell) is appended to the current (upper) invocation level CVIP.

5.5 Discussion on Processionist's Frame for a Cell (cellFrame)

A processionist's cell frame (cellFrame) is used at cell entry time to create a processionist's frame for executing the cell. This allows for the cell to be shared by multiple processionists. The basic purpose of the cellFrame is to provide a BE scratch-pad for all the BE dynamic variables used in its operation (current branch pointer, next branch pointer, etc.). However, the cellFrame may contain additional information.

A cellFrame always persists for invoked cells as the frame contains information indicating that the processionist invoked the cell. This information is used after subsequent evocations when the processionist converges from any subspace cells. For this reason, a processionist-specific (private) LIFO list of cellFrames is kept and always queried first at convergence time to find the cellFrames for the cell, if any. The frame is discarded at exit time when the return to the invoking cell occurs.

The persistence of the cellFrame for evoked cells is governed by whether or not the frame carries information that must be retained beyond the cell's last branch until convergence or exit time, such as shareable loop and encore data. If information must be retained until convergence, the frame accordingly persists beyond the last BE branch, and is freed up at exit time for that cell. If information need not be retained beyond the last BE branch, then the cellFrame is freed just prior to taking the last BE branch. For cases that have cellFrames persisting beyond the last branch, it becomes the job of the convergence section to restore the appropriate cellFrame for the processionist upon convergence. Note that convergence starts out as recession from a subspace. The subspace's exit box code establishes the superspace's trueCell address to jump to by locking it for CONVERGE and then performing the jump. The first task of the convergence section is then to reestablish any processionist frame for the cell as appropriate. The cellFrame only exists for cells that have stated information imparted to a processionist's cellFrame or a processionist's group's cellFrame (a cell's convergence section is different in that the stated information is always built directly into the cell and not carried by a processionist's cellFrame).

A processionist's cellFrame persists beyond the last branch (and therefore need be reestablished by convergence only if the cell has stated information imparted to a processionist: a. encore info (was any branch take for that cell for that processionist group); or b. shareable loop info (what is the loop count for that processionist group).

If neither of the above conditions are true, then the cell is not stated in this fashion and there is no cellFrame to consider at convergence time (again, note that the cell itself may have stated convergence directly built into it).

A cellFrame that persists automatically gets placed in a linked-list LIFO that is a task resource available to all processionists in that task (known as the procession group). Any processionist (and possibly all) from within the procession group may utilize this cellFrame, primarily for looping and encore purposes.

Note therefore that two separate cellFrame lists are kept: one processionist-private list for a processionist invoking a cell; and one task (procession group) shared list for certain evoked cells when multiple processionists are expected to converge back to the cell from the subspace.

5.6 Converge Rules and Their Role in CV Handling

When a processionist recesses out of a cell, and converges to the superspace, it may or may not hand off its CV to the superspace cell's convergence array and logic, depending upon the convergence model. This is the only time a processionist potentially releases ownership of its CV (outside of output section replacement), and only occurs for cooperative parallel convergence and forwarding models.

The convergence model supports multiple convergence receptors, meaning that a superspace can structurally distinguish which subspace is converging back to it. A major tenant of convergence is that when the lead processionist has an invocation level less than zero, it must converge and eventually carry results with (since there is stacked state that must be unwound). When a processionists invocation level is 0, it may/may not be necessary for that processionist or another in its place to recess completely—it depends on the convergence models of the cells the processionist has traversed but not yet recessed back to. If they are stateless, convergence is not necessary. If convergence is stated, convergence must occur.

There are three pieces of dynamic information that are important to convergence:

1. the thread number of the stated lead processionist, if there is one (there will be a stated lead processionist if the invocation !=0;

2. for multiple user support, the PID (process ID number) of the application owning the thread; and 3. the forwarded value (CV) of the processionist.

Additionally, at build time for the superspace and subspace, the following parameters are established:

1. superspace branch number for recessing subspace, which is structurally represented in both the superspace and subspace;

2. the convergence base in the superspace;

3. the number of users supported for stated convergence types in the superspace; and 4. zeroed number of users active for stated convergence types in the superspace.

At evoke time, the branch evaluator 1. grabs a preallocated "convStr" for this application (thread set);

2. sets the process ID number for the convStr; and 3. clears the lead processionist number in convStr prior to first evoke, or sets it if the invocation level<0, or the processionist is stated with information such as a loop count or encore count.

At recession time, the subspace recession code:

1. locks the superspace for convergence;

2. passes the superbranch number for this recessing cell; and 3. jumps back to the superspace convergence with its CV in tow in a register.

At convergence time, depending on the convergence and forwarding rules being applied, the CV is:

1. passively accepted as the new one and passed to the forwarded value handler;

2. discarded as unwanted; or 3. combined with other CV's from other processionists as an array of CV's, passed on to the forwarded value handler.

Additionally, depending on the convergence model, one or more processionists may be extinguished, and if there is a stated lead processionist, in some convergence models, only this processionist is allowed to continue beyond convergence. In the exemplary embodiment, there are four convergence rules and four forwarding rules. Here are all the combinations and their impact in CV handling with additional discussion of how multiple recessing processionists are coordinated:

1. convergence rules a. WaitForAll: a cooperative parallel convergence form: wait for all expected processionists to recess before allowing a processionist to continue on to the forwarded value handler—extinguish all threads except the forwarding processionist upon convergence;

b. WaitForNth: a cooperative parallel convergence form: wait for N of M (where N<=M) expected processionists to recess before allowing a processionist to continue on to the forwarded value handler—extinguish all threads except the forwarding processionist upon convergence;

c. FreeForAll: a potentially parallel but non-cooperative convergence form; allow all processionists to freely pass through convergence to the forwarded value handler—each processionist retains its CV.

d. NoneSpecified: a potentially parallel but non-cooperative convergence form; conceptually a "don't care" form, implemented identically to FreeForAll.

2. forwarding rules (only executed after converge is complete, or skipped if there is no evoking and subsequent convergence)

a. ForwardAll: all the contributions in the convergence frame are forwarded as an combined CV by a forwarding processionist (a CV that points to an array of series of output elements, each contribution was formerly the CV of the lead processionist or the CV of a child processionist of the stated lead processionist);

b. ForwardNth: the Nth value to converge is the one forwarded by the processionist;

c. Simple: every processionist forwards its CV as it exists (really a passive form, as the processionist already has a CV and just keeps it);

d. Ignore: the forwarded value is ignored (thrown-away), and the CV that existed at BE entry is retained for forwarding.

3. Current combined convergence and forwarding rules:

a. WaitForAll & ForwardAll: After convergence is complete (all recess), the last processionist or the stated lead processionist forwards all N collated CV's from all recessed processionists as a single aggregate CV. All other processionists are extinguished (but their CV's are not run down as they've been contributed to convergence). The following outlines this process in detail:

Initialization Information

The cell builder or some build thread has already established:

1. the maximum convergeFrame array size, given the maximum number of cells that might be parallelly evoked; and 2. the maximum number of concurrent users.

The branch evaluator has established at run-time if the cell (superspace to evoked subspaces) supports cooperative parallel convergence (true in this case) and multiple users. If so, it reserves a convergence block and points to it. Otherwise it points to the only convergence block.

The following items are in the convergence block:

1. a "convStr": i. with PID set for this processionist's PID, ii. all array elements zeroed out, and iii. all flags zeroed out.

2. an "expectedCnt"=M (the expected convergence count, given how any processionist where dispatched by the branch evaluator to evoked cells.)

3. a "convergedCnt"=0 (the initialized converged processionists count); and 4. a "stated Lead Processionist" value that is set to the processionist thread number or to zero if there is no stated lead processionist.

---

Process Outline (Pseudo Code)

```
(cell locked for convergence by exit (recession) section of subspace)
reestablish processionist's cell frame for this cell (may be found for processionist or processionist
    group, or may not exist)
if convergence expected (if this PID has a convStr and its expectedCnt !=0 )
{
    if stated lead processionist (statedLeadProcessionist != 0) (meaning that the lead
        processionist's invocation level != 0 at branch evaluator time)
    {
        if converging processionist == stated lead processionist
        {
            Stated lead processionist increments convergedCnt
            Stated lead Processionist hands off CV to the convergence arrays into
                the reserved slot (the superspace's branch table index referring
                to the current cell) for that recessing subspace
            if oneShotJump for stated lead processionist
            {
                Stated lead processionist executes one shot jump (OSJ) back to
                    branch evaluator and clears OSJ state in process
            }
            else
            {
                if convergence is not complete (expectedCnt != convergedCnt)
                {
                    Stated lead processionist does a semaphore wait on
                        convergence done.
                }
                Stated lead processionist jumps to forwarding section
            }
        }
        else (processionist is not stated lead processionist)
        {
            if already have converged for this subspace
            {(have/had recession from wild-branch recession)
                if oneShotJump for processionist
                {   can't be last if OSJ
                    Processionist runs down its CV
                    Stated lead processionist executes OSJ back to branch
                        evaluator and clears OSJ state in process
                }
                else
                {
                    Unlock cell for convergence
                    Wild processionist extinguishes itself (including
                        running down its CV)
                }
            }
            Processionist increments convergedCnt
            Processionist hands off CV to the convergence array into the reserved
```

-continued

Process Outline (Pseudo Code)

```
                            slot for that processionist.
                    if processionist is last to converge (expectedCnt == convergedCnt)
                    {
                            Processionist wakes up stated lead processionist
                    }
                    Unlock cell for convergence
                    Processionist extinguishes itself (including running down its CV)
            }
    }
    else    don't care about stated lead processionist
    {
            if already have converged for this subspace
            { (have/had recession from wild-branch recession)
                    if oneShotJump for processionist
                    {       can't be last if OSJ
                            Unlock cell for convergence
                            Processionist runs down its CV
                            Lead processionist executes OSJ back to branch evaluator and
                                    clears OSJ state in process
                    }
                    else
                    {
                            Unlock cell for convergence
                            Wild processionist extinguishes itself (including running down
                                    its CV)
                    }
            }
            Processionist increments convergedCnt
            Processionist hands off CV to the convergence array's reserved slot (the
                    superspace's branch table index referring to the current cell) for that
                    recessing subspace
            if oneShotJump for processionist
                    {
                            Unlock cell for convergence
                            Processionist exeeutes OSJ back to branch evaluator and clears
                                    OSJ state in proeess
                    }
                    else
                    {
                            if processionist is last to converge (expeetedCnt =
                                    convergedCnt)
                            {
                                    Processionist jumps to forwarding section
                            }
                            else
                            {
                                    Unlock cell for convergence
                                    Processionist extinguishes itself
                            }
                    }
            }
    }
    else    convergence not expected (for PID's processionists)
    {
            Wild processionist continues with its CV into the exit box of cell (cell behaves
                    as if convergence = NoneSpecified, Forwarding = Simple)
    }
}
```

At forwarding time, WaitForAll, ForwardAll
i) constructs a CVIP element descriptor that contains all forwarded values (the array of pointers from convergence)
ii) replaces the processionist's CV with this CVIP b. WaitForAll & ForwardNth: After all processionists recess, the CV of the Nth to recess is forwarded by the last processionist, or the stated lead processionist.

If converging recessionist is the Nth to arrive, the Processionist hands off CV to the convergence structure. The last or stated lead processionist will pick up this CV forward it as the CV upon all processionists converging back. If the converging processionist is not Nth to arrive, the Processionist runs down and discards its CV. All processionists except the stated lead processionist are extinguished, only the last or stated lead processionist carries the Nth CV forward. The following outlines this process in detail:

Initialization Information

The Cell builder or some build thread has already established:

1) the maximum convergeFrame array size, given the maximum number of cells that might be parallelly evoked;
2) the maximum number of concurrent users; and
3) Nf: the nth argument to recess will be forwarded.

The branch evaluator has established at run-time:

1) an "expectedCnt" (the expected convergence count, given how many processionist where dispatched by the branch evaluator to evoked cells; and
2) a "convergedCnt"=0 (the initialized converged processionists count).

| Process Outline (Pseudo Code) |
|---|

```
(cell locked for convergence by exit (recession) section of subspace)
    reestablish processionist's cell frame for this cell (may be found for processionist or processionist
            group, or may not exist)
    if convergence expected (if this PID has a convStr and its expectedCnt != 0)
    {
            if stated lead processionist (statedLeadProcessionist != 0) (meaning that the lead
                    processionist's invocation level != 0 at branch evaluator time)
            {
                    if converging processionist == stated lead processionist
                    {
                            Processionist increments convergedCnt
                            if this is Nth processionist to converge (convergedCnt == N)
                            {
                                    Processionist hands off CV to the convergence struct
                            }
                            if oneShotJump for stated lead processionist
                            {
                                    Unlock cell for convergence
                                    Stated lead processionist executes OSJ back to branch evaluator
                                            and clears OSJ state in process
                            }
                            else
                            {
                                    if convergence is not complete (expectedCnt > convergedCnt)
                                    {
                                            Stated lead processionist does a semaphore wait on
                                                    convergence done.
                                    }
                                    Stated lead processionist jumps to forwarding section
                            }
                    }
                    else    not stated lead processionist converging
                    {
                            if already have converged for this subspace
                            {(have/had recession from wild-branch recession)
                                    if oneShotJump for processionist
                                    {   can't be last if OSJ
                                        Unlock cell for convergence
                                        Processionist runs down its CV
                                        Stated lead processionist executes OSJ back to branch
                                                evaluator and clears OSJ state in process
                                    }
                                    else
                                    {
                                            Unlock cell for convergence
                                            Wild processionist extinguishes itself (including
                                                    running down its CV)
                                    }
                            }
                            Processionist increments convergedCnt
                            if this is Nth processionist to converge
                            {
                                    Processionist places CV in convergence struct
                                    if convergence complete (convergedCnt == expectedCnt)
                                    {
                                            wakes up stated lead processionist
                                    }
                            }
                            else
                            {
                                    Processionist runs down and consumes own CV
                            }
                            Unlock cell for convergence
                            Processionist extinguishes itself
                    }
            }
            else    no stated lead processionist
            {
                    if already have converged for this subspace
                    {(have/had recession from wild-branch recession)
                            if oneShotJump for processionist
                            {   can't be last if OSJ
                                Unlock cell for convergence
                                Processionist runs down its CV
                                Stated lead processionist executes OSJ back to branch evaluator
                                        and clears OSJ state in process
                            }
```

| Process Outline (Pseudo Code) |
|---|

```
                else
                {
                    Unlock cell for convergence
                    Wild processionist extinguishes itself (including running down
                        its CV)
                }
            }
            Processionist increments convergedCnt
            if this is Nth processionist to converge
            {
                Processionist places CV in convergence struct
                if oneShotJump for stated lead processionist
                {
                    Unlock cell for convergence
                    Stated lead processionist executes OSJ back to branch evaluator
                        and clears OSJ state in process
                }
                else
                {
                    if convergence complete (convergedCnt == expectedCnt)
                    {
                        Processionist jumps to forwarding section
                    }
                }
            }
            else
            {
                Processionist runs down and consumes own CV
                if oneShotJump for lead processionist
                {
                    Lead processionist executes OSJ back to branch evaluator and
                        clears OSJ state in process
                }
                else
                {
                    if convergence complete (convergedCnt == expectedCnt)
                    {
                        Processionist jumps to forwarded value handler
                    }
                }
            }
            Unlock cell for convergence
            Processionist extinguishes itself
        }
    }
    else    processionist not expected, from wild-branch recessing
    {
        Wild processionist continues with its CV into the exit box of cell (cell behaves as if
            convergence = NoneSpecified, Forwarding = Simple)
    }
}
```

At forwarding time, WaitForAll, ForwardNth
i) equates the CVIP to the pointer from convergence
ii) replaces the processionists CV with this CVIP c. WaitForAll & SimpleForwarding: This is really a synonym for WaitForAll/ForwardNth=Last; The last processionist's CV is carried by the forwarding processionist as the new CV. All other processionists are extinguished and their CV's are run down and discarded.

d. WaitForAll & Ignore (forwarding): The convergence occurs as per WaitForAll & SimpleForwarding, then the forwarding model works as follows: The BE, noting the "Ignore" forwarding model, causes the CV to be placed in a shared form and places two reference counts to it, the first since it is the CV, the second for retaining it beyond CV run-down should it occur. The BE additionally places the pointer to the shared CV on the task-group shared cellFrame for this case. Once convergence occurs, regardless of its form, the forwarding section discards any current forwarding value, looks up the task-group cellFrame for that cell, and restores the forwarding value to the one retained by the BE.

e. WaitForNth & ForwardAll: Each of the first N processionists to converge hands off its CV to the convergence array into the reserved slot for that processionist. For case where there is no stated lead processionist, the Nth processionist to converge continues on to forwarded value handler, all others are extinguished. For case where there is a stated lead processionist, after N arrive, the stated lead processionist forwards all N collated CV's from the N recessed processionists as a single aggregate CV. All other processionists converging after the Nth have their CV's run down and discarded. All processionists other than the stated lead processionists are extinguished. Note that while forwarding is allowed to occur as soon as the stated lead processionist can pick up the Nth recessionist, the stated lead processionist itself may recess later than the Nth recessionist. Also, note that convergence is not complete until all expectedCnt processionists converge back, even if N<expectedCnt, even though forwarding may have already occurred.

This process is outlined in detail below:

Initialization Information

The Cell builder or some build thread has already established:

1) the maximum convergeFrame array size, given the maximum number of cells that might be parallelly evoked.
2) the maximum number of concurrent users; and
3) a "waitForN" value.

The branch evaluator has established at run-time:

1) a "convStr" with: i) PID set for this processionists PID, ii) all array elements zeroed out, and iii) all flags zeroed out;
2) an "expectedCnt" (the expected convergence count, given how many processionist where dispatched by the branch evaluator to evoked cells); and
3) a "convergedCnt"=0 (the initialized converged processionists count).

| Process Outline (Pseudo Code) |
| --- |
| (cell locked for convergence by exit (recession) section of subspace)<br>reestablish processionist's cell frame for this cell (may be found for processionist or processionist group, or may not exist)<br>if convergence expected (if this PID has a convStr and its expectedCnt != 0)<br>{<br>    if stated lead processionist (statedLeadProcessionist != 0) (meaning that the lead processionist's invocation level != 0 at branch evaluator time)<br>    {<br>        if converging processionist == stated lead processionist<br>        {   (note if here, all cells have been evoked, as stated lead processionist will only take last branch)<br>        Processionist increments convergedCnt<br>        if oneShotJump for stated lead processionist<br>        {(note last evoke will never have a one-shot jump)<br>            if waitForN or less converged (waitForN >= convergedCnt)<br>            {<br>                Stated lead Processionist hands off CV to convergence slot reserved for cell<br>            }<br>            Unlock cell for convergence<br>            Stated lead processionist executes OSJ back to branch evaluator and clears OSJ state in process<br>        }<br>        else<br>        {<br>            if waitForN not yet or just now converging (waitForN >= convergedCnt)<br>            {<br>                Processionist hands off CV to covergence array into the reserved slot for cell<br>            }<br>            if convergence is not complete (waitForN > convergedCnt)<br>            {<br>                Stated lead processionist does a semaphore wait on convergence done.<br>            }<br>            Stated lead processionist jumps to forwarding section<br>        }<br>    }<br>    else   not stated lead processionist converging<br>    {   (can't have OSJ in this context)<br>        if already have converged for this subspace<br>        {(have/had recession from wild-branch recession)<br>            if oneShotJump for processionist<br>            {   can't be last if OSJ<br>                Unlock cell for convergence<br>                Processionist runs down its CV<br>                Stated lead processionist executes OSJ back to branch evaluator and clears OSJ state in process<br>            }<br>            else<br>            {<br>                Unlock cell for convergence<br>                Wild processionist extinguishes itself (including running down its CV)<br>            }<br>        }<br>        Processionist increments convergedCnt<br>        if convergence is not complete or completing (waitForN >= convergedCnt)<br>        {<br>            Processionist hands off CV to convergence slot reserved for cell<br>                if processionist is Nth to converge (waitForN == convergedCnt) |

-continued

Process Outline (Pseudo Code)

```
                    {
                            if stated lead processionist already converged, waiting
                            {
                                    wakes up stated lead processionist
                            }
                    }
            }
            else
            {
                    Processionist runs down its CV
            }
            Unlock cell for convergence
            Processionist extinguishes itself
      }
}
else    no stated lead processionist
{
      if already have converged for this subspace
      { (have/had recession from wild-branch recession)
              if oneShotJump for processionist
              {       can't be last if OSJ
                      Unlock cell for convergence
                      Processionist runs down its CV
                      Stated lead processionist executes OSJ back to branch evaluator
                              and clears OSJ state in process
              }
              else
              {
                      Unlock cell for convergence
                      Wild processionist extinguishes itself (including running down
                              its CV)
              }
      }
      Processionist increments convergedCnt
      if convergence not yet captured Nth element (convergedCnt <= waitForN)
      {
              Processionist hands off CV to convergence slot reserved for cell
              if processionist is Nth to converge (waitForN == convergedCnt)
              {
                      if oneShotJump for processionist
                      {   can't be last if OSJ
                          Unlock cell for convergence
                          Stated lead processionist executes OSJ back to branch
                              evaluator and clears OSJ state in process
                      }
                      else
                      {
                          if Nth == last (convergedCnt == expectedCnt)
                          {
                              Tag convStr as AllConverged (which tells
                                  exiting to cell for BEV when exits)
                              Processionist jumps to forwarding
                          }
                          else
                          {
                              Processionist jumps to forwarding
                          }
                      }
              }
              else    it is before Nth
              {
                      if oneShotJump for processionist
                      {   can't be last if OSJ
                          Unlock cell for convergence
                          Stated lead processionist executes OSJ back to branch
                              evaluator and clears OSJ state in process
                      }
                      else
                      {
                          Unlock cell for convergence
                          Processionist extinguishes itself
                      }
              }
      }
      else    beyond Nth recessionist
      {
              Processionist runs down its CV
```

| Process Outline (Pseudo Code) |
| --- |
| ```
            if oneShotJump for processionist
            {       can't be last if OSJ
                    Unlock cell for convergence
                    Stated lead processionist executes OSJ back to branch evaluator
                            and clears OSJ state in process
            }
            else
            {
                    if last to converge
                    {
                            if (convStr tagged NthConvergedOneShot)
                            {
                                    Tag convStr as AllConverged (which tells
                                            exiting to unlock cell for BEV when
                                            exits)
                                    Processionist jumps to forwarding
                            }
                            else
                            {
                                    Unlock cell for convergence
                                    Unlock cell for BEV
                                    Processionist extinguishes itself
                            }
                    }
                    else
                    {
                            Unlock cell for convergence
                            Processionist extinguishes itself
                    }
            }
      }
      else    convergence not expected
      {
            Wild processionist continues with its CV into the exit box of cell (cell behaves as if
                    convergence = NoneSpecified, Forwarding = Simple)
      }
``` |

At forwarding time, WaitForNth, ForwardAll:
i) constructs a CVIP element descriptor that contains all forwarded values (the array of pointers from convergence)
ii) replaces the processionists CV with this CVIP f. WaitForNth & ForwardNth Although these rules both use a parameter N to specify the Nth processionist and the Nth CV, the values may be set independently. That is, the convergence section could be programmed to wait for the third processionist to recess (WaitForNth==3) and the second CV (ForwardNth==2). The convergence section will not send a processionist to the exit zone until both the desired processionist and the desired CV have recessed. In addition, the convergence section must wait for any stated lead processionist to recess.

After such recession has occurred, the convergence section selects a processionist and a CV to forward to the exit zone. The convergence section will forward the stated lead processionist if there is one. Otherwise, the convergence section will forward the Nth processionist as selected by the WaitForNth rule. The forwarded processionist will pick up the Nth CV as selected by the ForwardNth rule and carry it to the exit zone.

Any CV's that recess other than the selected Nth CV are discarded as they recess and the associated memory is deallocated. The Nth CV is temporarily stored in a convergence structure in the cell if the processionist to be forwarded (either the stated lead processionist or selected Nth processionist) has not yet recessed. Any processionists that recess other than the processionist to be forwarded are extinguished as they recess after any associated CV has been processed (either discarded or temporarily stored if it is the Nth CV).

This process is outlined in detail below:

Initialization Information

The cell builder or some build thread has already established the:

1) maximum number of concurrent users;

2) number of processionists to wait to converge: Nw; and 3) processionist's CV value to forward: Nf The branch evaluator has established at run-time:

a) a convStr with i) PID set for this processionist's PID, ii) all array elements zeroed out, and iii) all flags zeroed out;

b) expectedCnt (the expected convergence count, given how many processionist where dispatched by the branch evaluator to evoked cells); and c) convergedCnt=0 (the initialized converged processionists count).

Process Outline (Pseudo Code)

```
(cell locked for convergence by exit (recession) section of subspace)
if convergence expected (if this PID has a convStr and its expectedCnt != 0)
{
        if stated lead processionist (statedLeadProcessionist != 0) (meaning that the lead
        processionists invocation level != 0 at branch evaluator time)
        {
                        if converging processionist == stated lead processionist
                        {
                        Stated lead Processionist increments convergedCnt
                        if oneShotJump for stated lead processionist
                        {    Can't be last if OSJ
                            if this is Nfth processionist to converge
                            {
                                Stated lead Processionist places CV in the convergence
                                    struct
                            }
                            else
                            {
                                Stated lead processionist runs down and consumes own
                                    CV
                            }
                            Unlock cell for convergence
                            Stated lead processionist executes OSJ back to branch evaluator
                                and clears OSJ state in process
                        }
                        else
                        {
                            if this is Nfth processionist to converge
                            {
                                Stated lead Processionist places CV in the convergence
                                    struct
                                if this not last convergence to wait for (Nfth != Nwth)
                                {
                                    Stated lead processionist does a semaphore on
                                        convergence done.
                                }
                                Stated lead Processionist jumps to forwarded value
                                    handler
                            }
                            else
                            {
                                Stated lead processionist runs down and consumes own
                                    CV
                                if this is < Nwth to converge
                                {
                                    Stated lead processionist does a semaphore
                                        wait on convergence done.
                                }
                                Stated lead Processionist jumps to forwarding section
                            }
                        }
        }
        else    not stated lead processionist (never has OSJ)
        {
                        if already have converged for this subspace
                        {(have/had recession from wild-branch recession)
                            if oneShotJump for processionist
                            {    can't be last if OSJ
                                Unlock cell for convergence
                                Processionist runs down its CV
                                Stated lead processionist executes OSJ back to branch
                                    evaluator and clears OSJ state in process
                            }
                            else
                            {
                                Wild processionist extinguishes itself (including
                                    running down its CV)
                            }
                        }
                        Processionist increments convergedCnt
                        if this is Nfth processionist to converge
                        {
                            Processionist places CV in the convergence struct
                        }
                        else
                        {
                            Processionist runs down and consumes own CV
```

```
                    }
                    if this is last convergence to wait for (convergedCnt == Nwth)
                    {
                        if stated lead processionist already converged
                        {
                            wake up stated lead processionist
                        }
                    }
                    Unlock cell for convergence
                    Processionist extinguishes itself
                    }
        }
        else    no stated lead processionist
        {
                if already have converged for this subspace
                {(have/had recession from wild-branch recession)
                        if oneShotJump for processionist
                        {       can't be last if OSJ
                                Unlock cell for convergence
                                Processionist runs down its CV
                                Stated lead processionist executes OSJ back to branch evaluator
                                        and clears OSJ state in process
                        }
                        else
                        {
                                Wild processionist extinguishes itself (including running down
                                        its CV)
                        }
                }
                Processionist increments convergedCnt
                if this is Nfth processionist to converge
                {
                        Processionist places CV in the convergence struct
                        if oneShotJump for processionist
                        {
                                Tag convStr as NthConvergedOneShot
                                Unlock cell for convergence
                                Stated lead processionist executes OSJ back to branch evaluator
                                        and clears OSJ state in process
                        }
                        else
                        {
                                if Nth == last (convergedCnt == expectedCnt)
                                {
                                        Tag convStr as AllConverged (which tells exiting to
                                                unlock cell for BEV when exits)
                                        Processionist jumps to forwarded value handler
                                }
                                else
                                {
                                        Processionist jumps to forwarding
                                }
                        }
                }
                else    not Nth processionist
                {
                        Processionist runs down its CV
                        if oneShotJump for processionist
                        {       can't be last if OSJ
                                Unlock cell for convergence
                                Stated lead processionist executes OSJ back to branch evaluator
                                        and clears OSJ state in process
                        }
                        else
                        {
                                if last to converge (expectedCnt == convergedCnt)
                                {
                                        if(convStr tagged NthConvergedOneShot)
                                        {
                                                Tag convStr as AllConverged (which tells
                                                        exiting to unlock cell for BEV when
                                                        exits)
                                                Processionist jumps to forwarding
                                        }
                                        else
                                        {
                                                Unlock cell for convergence
                                                Unlock cell for BEV
                                                Processionist extinguishes itself
```

```
                    }
                }
            else
                {
                    Unlock cell for convergence
                    Processionist extinguishes itself
                }
            }
        }
    }
}
else    convergence not expected
{
        Wild processionist continues with its CV into the exit box of cell (cell behaves as if
                    convergence = NoneSpecified, Forwarding = Simple)
}
```

At forwarding time, WaitForNth, ForwardNth:
 i) equates the CVIP to the pointer from convergence
 ii) replaces the processionists CV with this CVIP
g. WaitForNth & SimpleForward: This is really a synonym for WaitForNth=N/ForwardNth=N. See WaitForNth & ForwardNth.
h. WaitForNth & Ignore (forwarding): The convergence occurs as per WaitForNth & SimpleForwarding. Then the forwarding model works as described in "d. WaitForAll & Ignore (forwarding):" above.
i. FreeForAll & ForwardAll: This case is not allowed.
j. FreeForAll & ForwardNth: This case is not allowed.
k. FreeForAll & SimpleForward: Every processionist simply proceeds onto the exit zone carrying its CV (note in implementation it is identical to NoneSpecifed/Simple). There is no change in the CV for each processionist (passive forwarding).
l. FreeForAll & Ignore: In this form, all processionist group members share the same processionist group cellFrame which refers to the preserved forwarding value. Any processionist recessing back will pickup this cellFrame, discard its current forwarding value, and continue with the forwarding value as last defined by the last running of the BE for that cell.
m. NoneSpecified & ForwardAll: This case is not allowed.
n. NoneSpecified & ForwardNth: This case is not allowed.
o. NoneSpecified & SimpleForward: Every processionist simply proceeds on to the exit zone carrying its CV. There is no change in the CV for each processionist (passive forwarding).
p. NoneSpecified & ignore. This is identical to "FreeForAll & Ignore".

5.7 Some Notes on Branch Evaluator Interaction with CV and One Shot Jump (OSJ)
 1. At branch evaluator entry, the branch evaluator accesses the cellFrame that is linked into the list of all cellFrames for that processionist, unless the cell has stated information, in which case the frame is linked into a different list shared by all processionists for that processionist group (for that task). Important entries in this frame, besides those already well-documented for the branch evaluator, are
    a. the cell the branch evaluator is operating on, and
    b. the pointer (initially null) to a shared fwdValue should multiple evokes be dispatched by this branch evaluator session (either parallel processionists or serialized processionist or partially parallel and serial).
 2. when the branch evaluator determines multiple evokes will occur, it tears off the superspaces fwdValue (CV), make it a shared sequence of elements, and then create a single element fwdValue with a reference to the shared sequence for each processionist it dispatches (including the lead processionist). This is simply an efficiency detail of "!!attempt to dispatch a processor on branch C" in {Request Processor . . . } (makes references and reference counts to a shared fwdValue instead of multiple copies of the whole (potentially huge) entity).
 3. regarding handling the return from a OSJ, the branch evaluator must:
    a. reestablish the cellFrame for the processionist: this is done by backward searching the linked-list of cellFrames for that processionist or processionist group (looking at most recent first) until the one for that cell is found;
    b. consume the fwdValue if fwdValue !=0
    This can occur for modelA OSJ (which does not pass thru convergence; see Section II.3.3 above): the forwarded value is non-null and needs to be consumed, as it will be replaced by the shared fwdValue the superspace is forwarding to all evoked subspaces.
    For modelB OSJ (which is for WaitForAll or WaitForNth cooperative parallel forms and passes thru convergence; see Section II.3.3 above), the fwd value from OSJ is null (stored or consumed by the convergence out of necessity regardless if parallel or serial evoke) and the branch evaluator need not consider it (and is handed a null forwarding value, as the shared fwdValue is the one important to the branch evaluator).
    c. restore shared fwd value for serial/parallel evokes.
    (b) and (c) are an amplification of what occurs within the {Serialize; . . . } space after the OSJ returns and before the jump to {: LeadProcessor Continues).

5.8 Consumption of a CV and Resulting Resource Releasing
 There are two situations where a CV is consumed by its processionist, when:
 1. an output section statement completes in the output section, which causes the CVIP to replace the CV;
 2. a processionist is extinguished;
    a. in convergence under specific circumstances (see section 5.5 "Converge Rules and Their Role in CV Handling"); and
    b. at $anchor recession time, where there is no further recession possible.

As previously discussed, the output section may be built via a parsed syntax (among other ways) which includes a vocabulary of output section elements, operators, and punctuators. Output section statements are made up of zero or more items, also known as elements. An output section is made up of zero or more statements. Each statement (after being parsed, and built) when executed normally causes new elements to be built into the CVIP which may include references to resources (in-cell/protracted references, shared E'FIFO references, shared out-of-line references). When a statement completes executing, the newly constructed CVIP replaces the previous CV and the previous CV is consumed. CV consumption has two stages: (1) resource run down; and (2) space reclamation.

When an old CV is replaced by the fully formed CVIP, it:

1. is consumed (resources run-down and released as appropriate) when the invocation level of the CV is the same as the processionist's invocation level. This consumption is done because the old CV is being totally discarded as it is owned by the processionist at that same invocation level (meaning it cannot be a component of a higher level to be retained).

2. is not consumed when the invocation level of the CV is the not the same as the processionist's invocation level (meaning that the old CV, while no longer meaningful at this lower invocation level, is owned by a higher level and may still be meaningfully referenced at that higher level later).

CV resources that are consumed and released in resource run-down are in-line:

1. elements with in-line data;
2. elements with references to out-of-line shared elements consisting of
   a. deferred file references that have been resolved (file read and contents placed in out-of-line element);
   b. CV's torn off from the lead procession and shared by reference among all parallel processionists from the same cell's branch evaluator execution;
   c. in-cell references (from the CV's point of view) that resulted in protracted locks (from cell's point of view).

Except for in-cell references, all the above are simply freed back to the application's multi-thread-shared pool when released (when reference count decrements to zero for out-of-line elements and data). For in-cell references, the protracted reference lock count is decremented for each run-down, and the protracted reference lock is cleared when reference count decrements to zero.

Resource run-down is accomplished by traversing thru the entire linked-list CV, ignoring elements that do not tie up other resources, while running down ones that do. Elements that tie up (refer to) other resources include:

(1) IN_CELL (protracted) references (which have a partner PROTRACT_REF lock) that must be run down;
(2) OUT_OF_LINE data references (which have memory to be freed up if the reference count drops to zero) which result when deferred resolution elements are resolved; and
(3) SHARED_ELEMENTS descriptors and data which results from bifurcation of parallel processionists inheriting the CV—the shared element count is incremented per each new reference and decremented per each consumption.

Space reclamation upon CV consumption consists of:

1. freeing descriptors and data for each element that made up the old CV back to the task's pool;
2. releasing any protracted reference cell locks when the reference count dropping to zero (the cell component, while not part of the CV E'FIFO, is conceptually part of the CV). Note that there exist four cases to be considered:
   a. singular cell: no space reclamation of any part of the singular cell occurs as even though all protracted references have been removed, the cell is still valid and available for subsequent accessing;
   b. husk: the output section and free-space sections of the husk are released back to the owning clump (so long as their combined length is equal to or greater than the size of the default (nascent) cell, as these husk sections can no longer provide any active role (their roles are played by the same components in the trueCell)
   c. trueCell: (same as for singular cell) no space reclamation of any part of the singular cell occurs as even though all protracted references have been removed, the cell is still valid and available for subsequent accessing;
   d. ghost: the entire cell is freed back to the clump, as it is no longer a useful entity.

3. freeing out-of-line descriptors and data (which may have references from one or more processionists CV/CVIP) back to the task's memory pool once the reference count drops to zero; and 4. freeing SHARED_ELEMENTS descriptors and subsequent descriptors and data (a sheared-off old E'FIFO) back to the task's memory pool once the reference count drops to zero.

5.9 Additional Protracted Reference Discussion Regarding PROTRACT_REF Locks, Storage Operations, and Resultant Husking, and Possible Ghosting Protracted References only occur for output section elements that are too large to place directly into a processionist's CVIP as established by run-time criteria (output element size matched against a tuneable threshold). Instead, the processionist places an "in-cell" element descriptor in its CVIP, and also places a corresponding PROTRACT_REF lock on the cell being referenced. The interplay of protracted references, accompanying PROTRACT_REF locks, storage operations, filing trees, and resultant husking, and possible ghosting, procession and recession can be subtle and complex, yet the basic mechanisms governing these follow precise rules. There are four possibilities regarding what the protracted reference in a CV or CVIP points to, a singular cell (meaning husk==trueCell), a husk, a trueCell, and a ghost.

Protracted References play an especially important role in preserving data in a cell that may be replaced by a storage operation (an output section update operation). In this situation, a cell (the head of a filing tree, but not necessarily the target of the storage) is invoked by the storage operation, which, besides producing the behavior of that cell and its subnet, also returns a CVIP, which is a pointer to a series of descriptors (one or more elements). The first descriptor includes the target cell's address for the storage (which can be the top cell or any cell within the subnet, see discussion on filing trees in the patent document). This cell then has its output section replaced by the contents of the CV, the CVIP returned by the storage operation being used only to determine the actual target cell to store to.

Should the target cell contain a protracted reference to it (meaning that some CV or CVIP for this or another processionist has an in-cell reference to the target cell), it would be destructive to store into the target cell without somehow preserving the previous contents, which are what the in-cell references refer to and the PROTRACT_REF lock protects. Hence, storage must be mindful of this and preserve previous state while at the same time update the cell as prescribed.

When a target cell contains a large data element as all or part of its contribution to the CVIP, the protractedRefCount will be minimally one for the target cell when this reference is done via an in-cell reference. This means that the filing tree invoke (done to identify the target cell) can itself produced a PROTRACT_REF lock and an in-cell reference to the target cell for the processionist doing the storage. However, the CVIP produced by a filing tree return is unique in that it is immediately discarded (after run-down of all it's elements resources), and only the target cell (a husk or singular cell) address is retained—thus at storage time it is guaranteed that any PROTRACT_REF locks (IN_CELL references) are meaningful and not just an artifact of searching for the storage target.

Note that the protracted reference is unique in that it is the only cell reference to a cell that is not necessarily either to a singular cell or to a husk (which is the only published addressed), but might also be to a trueCell or a ghost.

5.10 Considering ES In-Cell References Relative to Potential Husking, True Cell Creation, and Ghosting The purpose of this section is to illustrate interplay of storage, husking, and ghosting relative to the CV being stored when an in-cell reference to the target cell is/is not present, and to describe a state table of actions given starting states. Note that the factors necessitating husking are that:

1. cells must have their state protected as dictated by their locking state so current activities are not disrupted, and outstanding references are honored;

2. the "published address" of a cell (singular cell or husk) may not move when cell growth dictates that the cell must move to expand;

3. cells are to remain contiguous with the exception of the husk/trueCell division;

4. new contents must be allowed for, but any references to old contents must be also honored.

In the context of a storage operation, now focus on whether or not the target cell has a protracted reference to it (or from the point of view of the ES, an IN_CELL reference), and if so, whether the source of this protracted reference is from the storing processionist, or from another processionist.

The stated variables to be considered are:

1. contents of CV states: no reference to cellA (no PROTRACT_REF to cellA (husk or singular cell); or reference to cellA;

2. contents of CVIP states: no reference to cellA (not possible); or reference to cellA. This reference initially always occurs but the CVIP is thrown away after the storage target is identified since the CVIP resulting from storage target ID has only the purpose of identifying the target cell. Note that the CVIP is reset to null upon starting a storage file tree search, since the CVIP becomes the CV prior to the search.

Thus, the storing processionist's CVIP is in fact not a variable to be considered, and only the CV for the storing processionist need be considered (however, all other processionists V's and CVIP's do need to be considered, and are below in the "target cell states" entry—these are all the cases with PROTRACT_REF).

3. target cell states:
   a. singular with no PROTRACT_REF
   b. singular with PROTRACT_REF
   c. husk with no PROTRACT_REF/trueCell with no PROTRACT_REF
   d. husk with no PROTRACT_REF/trueCell with PROTRACT_REF
   e. husk with PROTRACT_REF/trueCell with no PROTRACT_REF
   f. husk with PROTRACT_REF/trueCell with PROTRACT_REF
   g. ghost (not possible as a storage target, since a ghost is a former trueCell that has been replaced, and it will disappear once all processionists' ES references to it are consumed)

4. Possible CV, CVIP and target cell state permutations (Part A) (for Part A any protracted reference is from another processionist and not from the storing processionist):

a. contents of CV: no reference to cellA (no PROTRACT_REF to cellA (singular, husk or trueCell) from this processionist, but perhaps from other processionists)
   b. i. target cell state: singular with no PROTRACT_REF
      ii. action: rewrite singular output section if room, else husk singular cell, create and store to new trueCell
   c. i. target cell state: singular with PROTRACT_REF
      ii. action: husk singular cell, create and store to new trueCell
   d. i. target cell state: husk with no PROTRACT_REF/trueCell with no PROTRACT_REF
      ii. action: rewrite trueCell output section if room, else free trueCell, create and store to new trueCell
   e. i. target cell state: husk with no PROTRACT_REF/trueCell with PROTRACT_REF
      ii. action: ghost trueCell, create and store to new trueCell
   f. i. target cell state: husk with PROTRACT REF/trueCell with no PROTRACT_REF
      ii. action: rewrite trueCell output section if room, else free trueCell, create and store to new trueCell
   g. i. target cell state: husk with PROTRACT_REF/trueCell with PROTRACT_REF
      ii. action: ghost trueCell, create and store to new trueCell 5. Possible CV, CVIP and target cell state permutations (Part B) (for Part B, the source of the protracted reference is minimally the storing processionist's CV—it is irrelevant here that other processionists' ES may/may not have additional protracted references):

a. contents of CV: reference to cellA (i.e, there is some form of PROTRACT to either singular cell, husk, trueCell, or ghost)
   b. target cell state: singular with no PROTRACT_REF (not possible)
   c. i. target cell state: singular with PROTRACT_REF
      ii. action: husk singular cell, create and store to new trueCell
   d. target cell state: husk with no PROTRACT_REF/trueCell no PROTRACT_REF (not possible)
   e. i. target cell state: husk with no PROTRACT_REF/trueCell with PROTRACT_REF
      ii. action: ghost trueCell, create and store to new trueCell
   f. i. target cell state: husk with PROTRACT_REF/trueCell with no PROTRACT_REF
      ii. action: rewrite trueCell output section if room, else free trueCell, create and store to new trueCell
   g. i. target cell state: husk with PROTRACT_REF/trueCell with PROTRACT_REF
      ii. action: ghost trueCell, create and store to new trueCell By inspection of the above, it is clear that the source of the PROTRACT_REF is irrelevant (whether in storing processionists CV or another processionists CV or CVIP) and the two Possible permutations sub-tables (Part A and Part B) may be fully represented by just Part A.

Resultantly, the accompanying PROTRACT_REF lock is unique in that it is the only lock not necessarily to the husk or singular cell; rather, it refers directly to the specific cell encapsulating the (output section) contents of the singular cell, husk, trueCell, or ghost, as the case may be In all other locking situations (i.e. not PROTRACT_REF lock cases), the lock reference is always to: (a) a husk as a gateway into the truecell; or (b) a singular cell as a gateway to itself (i.e. its locking section is a gateway to the rest of itself).

The protracted reference (also called an in-cell reference) imbedded in a CV actually consists of a descriptor with two separate pointers: 1) a pointed to the cell (singular, husk, trueCell, or ghost) containing the output section statement; and 2) a pointer to the output section statement that is the target of the protracted reference. Which of the four kinds of cell that the protracted reference points to the protracted reference is indicated by:

1. singular: protractedRefCell==husk address=trueCell address; (singular cell's) protractRefCnt !=0 (after PROTRACT_REF lock is made)
2. husk: protractedRefCell==husk address !=trueCell address; (husk's) protractRefCnt !=0 (after PROTRACT_REF lock is made)
3. trueCell: protractedRefCell==trueCell address !=husk address; (trueCell's) protractRefCnt!=0 (after PROTRACT_REF lock is made)
4. ghost: protractedRefCell !=huskCell address trueCell==0; (ghost's) protractRefCnt !=0 (after PROTRACT_REF lock is made)

The following illustrates the situation that causes transition from
1. singular cell to
2. husk +trueCell, to
3. husk +newTrueCell+ghost (old trueCell):

A cellA is in process of being evoked, and is executing it's output section code. CellA's output section contains a storage operation statement, which first does an invoke of another cell to determine which cell in its sub-net should be the target of a storeTo operation (receive the storage—this is a filing tree operation).

Assume that the filing tree has a member cellB, which is a singular cell that already has a protracted reference to it from some other processionist, and will be selected in the filing tree search operation. Thus, in the filing tree execution, the singular cellB is eventually evoked, and its output section contributes another protracted reference to itself (assume, in this example, a cellB output section element is enormous) as a CVIP that transitions to a CV. Further assume that this CV (from cellB's point of view) becomes the filing tree's returned component (i.e. it is the surviving return value of the filing tree operation). From cellA's storage operations point of view this CVIP (or CV from the point of view of both the top cell in the filing tree as well as cellB) first element is used as the identifier of the cell to store to, in this case cellB, whose output section element was the 'solution" of the filing tree operation. CellB also momentarily gains another protracted reference from this invoking, but this protracted reference is discarded along with the entire CVIP by cellA after the target cell (cellB) has been determined.

The storage operation now actually takes place, first locking cellB for STORE_TO. Since cellB already has a PROTRACT_REF lock on it, singular cellB is husked, and a newly created trueCell gets the storage of the CV. Any future references to cellB will use the new contents of the new trueCell, however, and usage of the previous (protracted) reference from another processionist's ES will access the contents of cellB in the husk, appropriately accessing the old contents.

Now perform the same operation as the previous paragraph, but start with cellB as a husked cell, and assume another processionist has a protracted reference to cellB's trueCell. Here the filing tree returned element (an in-cell reference from CVIP's point of view, or a protracted reference from cellB's trueCell's point of view) will again be to cellB, but its trueCell may not be stored to without interfering with an outstanding reference, hence this old trueCell becomes "ghosted," and a new trueCell created that receives the contents storage operation. The output section contents of the husk are left undisturbed and also the output section contents of the old trueCell are left undisturbed, as long as any protracted references remaining to them are still valid.

The linkage of husk to trueCell is changed to reflect the new trueCell, and this creates a ghost out of the old trueCell. The ghost still knows about the husk, but the husk no longer knows or cares about it, since the husk will no longer serve as its lock gateway. The ghost has no need of any gateway— its contents are now fixed and will be retained until resource run-down (due to all protracted references to it being consumed) extinguishes the ghost and frees up its memory for future new use in the clump). Further storage operations to cellB continue to create another ghost and new trueCell for each storage operation as long as the trueCell has an outstanding PROTRACT_REF lock.

Ghosts and husk may not have more protracted references accrue to them by direct evoking/invoking, since they are no longer the operational cell (the trueCell is); rather, additional protracted references to them may only accrue via the bifurcation of a processionist into additional processionists due to branch evaluator-driven parallel procession into other cells. Also note that parallel procession that fosters more protracted references to cellB can occur upstream or downstream of cellB. The upstream case occurs where some degree of recession occurs—the CV protracted reference to cellB (all or any of the four forms) is retained, and more parallel evoking may then occurs. Down-stream cases occur where cellB is a component of the CV accompanying additional processionists as engendered by the BE threads.

Thus, the context and reach of protracted references can be simply a single reference on one ES (CVIP or CV) or complex as a set of processionists with a set of protracted references, engendered (along with their ES's) by the original invoke/evoke that has triggered a net response.

Here are more mechanism notes regarding storage into a cell (which must have the protracted reference, since that is the indicator of which cell to store to in the storage operation context):

storing into a cell:
husk has PROTRACT_REF lock bit
if singular (husk==trueCell, must preserve singular cell
  contents)
  protractRefCnt incremented for trueCell (==husk)
  create new trueCell
  husk retains lock bit and count for self
  trueCell gets protractRefCnt==0
if husk and trueCell (must preserve trueCell contents)
  protractRefCnt incremented for trueCell (ghost to-be)
  create newTrueCell, and link it to/from husk
    (husk.trueCell=newTrueCell newTrueCell.husk=
    husk)
  trueCell gets protractRefCnt=1 old trueCell==>ghost (marked ghost: trueCell=0, instead of self), and its protractRefCnt count goes with it
  if husk.protractRefCnt==0, its PROTRACT_REF lock bit cleared
  husk retains lock bit and count for self Because of the unique nature of protracted references, the lockForProtractRef mechanism exhibits the following behavior:

1. keeps track of locking cell address (husk, trueCell, ghost)
2. locks for PROTRACT_LOCK the husk as the gateway to that cell (a ghost is locked directly: it receives the lock without going through the husk which it is by definition dissociated from)
3. updates protractRefCnt of referenced cell
4. retains PROTRACT_REF_LOCK only if referenced cell==trueCell !=husk (the husk need not be locked as its output section cannot be changed anymore and same for ghost: thus this lock protects trueCell only, although its lock bit is reflected in husk per locking conventions. At net-frozen-threads-active-operator-requested dehusking time, all husked cells must be checked for a protractRefCnt !=0, and cannot be dehusked if true. At net-frozen-threads-not-active-automatic-sleep-time dehusking this count is guaranteed 0 and need not be checked).

5.11 Protracted References to Cells and Their Role in ES's

Each cell has state information, including its CV and also its CVIP (current value in progress) that persists for as long as a thread holds a BEV or BIN lock on a cell. In-cell (protracted) references, and their corresponding PROTRACT_REF locks occurs when for performance optimization reasons, directly copying an element of a cell's output section into the CVIP would be prohibitive due to the size of the element. In this case, an in-cell reference descriptor is placed in the CVIP (which is a protracted reference from the point of view of the cell), and the cell in concert receives a PROTRACT_REF lock (if it didn—t already have one) and its protractRefCnt is incremented.

There are two separate mechanisms the number of PROTRACT_REF locks being shared can grow:

1. the current CV for a lead processionist receiving the PROTRACT_REF lock is conceptually replicated N times due to additional processionists engendered by parallel branch evaluator-driven branching. In this case, the E'FIFO embodying the lead processionist's CV is sheared out of the formerly owning lead processionist's context, and this E'FIFO is marked as shared by all the new processionists referring to it. They in turn receive a new unique CV, a unique E'FIFO with each containing a reference to the original CV) now-shared ES, which is now a sheared off, shared out-of-line element. This requires any cell having a protracted reference contribution in the now shared CV to have its protracted reference count incremented to show the number of parallel threads now referencing it. Each parallel thread may in turn engender more parallel threads, creating further cascading of shared CV's and incremented protracted reference counts.
2. multiple processionists may invoke/evoke the same cell and cause multiple protracted references to the cell's output section to be placed in each processionist's corresponding CV. This is different than 1. in that here the processionists have not been engendered by the same lead processionist with an original CV that was subsequently shared.

In all cases the PROTRACT_REF lock is retained until all CV's that contain the protracted reference have been consumed.

5.12 Input/Output Model As Related to CV and Output Section Elements

The input/output model (I/O Model) is extremely flexible in both the types of data handled as well as the channels for input and output. It is multi-media, and capable of performing local or remote (via TCP/IP networking or voice telephony) I/O and allows concurrent output of any type of data to dynamically changeable output virtual devices, including a local or remote GUI for image, text, and graphics (host native or portable HTML Web Browser for dynamic page description), and sound, including voice and music of multiple sampling speeds and formats (to local speaker or remote speaker or phone lines).

A consistent scheme of descriptors is desired accompanying every input, current value, and output, with as many of the specific descriptors accompanying each as applicable to it. The output section of a cell is tagged with descriptors indicating such things as:

1. what the output section is allowed to contain
   a. literal material only (a special case is with cell type super-quote)
   b. programmatic material only
   c. either or both
2. whether it can be changed or expanded
   a. expandable
   b. fixed size
   c. content locked
   d. typelocked
3. what is actually in it
   a. a sequence of items
   b. a datum, and what kind
   c. a data structure, and what kind
   d. a performance unit, and what kind
   e. a special unit, such as a program, operating system, programing environment, graphical user interface window, etc.
4. total size of output section, including pre-allocation.
5. exact location and size of the current contents.

Note that the last statement of an output section (a single element for single element statements) is output if a cell is evoked, but only added to the CVIP if invoked. The results of all output section produced elements are appended to the CVIP at all times (but note there are output section elements like certain commands, meta-commands, and comments that do not produce any contribution to the CVIP), and the CVIP becomes the CV upon the completion of a statement. .A statement is demarked either by an operator (which is indicated though descriptive syntax by ";" or implicitly as the last element of an output section being executed). What is syntactically explicitly or implicitly present as a statement terminator is encoded as a call to a routine that replaces the CV with the CVIP after running down all CV resources.

Here are some descriptive syntax examples of output sections of growing complexity and a brief description of the progression of executing output section elements onto the CVIP, and finally the transition of the CVIP into the CV:

A. Null/Single Output Section Element Forms (all these forms transition immediately from CVIP to CV)

1.
   The above (null) is the undefined output section default, and places the cell's name with a text descriptor into CVIP.
2. ~
   The above is the alternate to undefined output section default, and places the cell's name with a text descriptor into CVIP.

3. "

The above is a null output section and does not impact the CVIP or CV.

4. "here is the only element allowed in the cell

The above is a SUPERQUOTE (meaning no parsing of its content and the only allowed element in output section) and is placed as text data along with a text descriptor into the CVIP.

5. Here is some text.

The above is a single text element of "Here is some text." and is placed as text data along with a text descriptor into the CVIP.

6. 19

The above is a single text element of "19" and is placed as text data along with a text descriptor into the CVIP.

7. ~19

The above is the infinitely extensible range integer 19 (here internally represented by only 16 bits but can extend indefinitely by 16 bit units) and is placed as integer data along with an integer descriptor into the CVIP.

8. ~123456789012345678901234567890

The above is a larger (infinitely extensible) integer expressed initially by a 96 bit integer and is placed as integer data along with an integer descriptor into the CVIP.

9. ~47.89

The above is the double float (64 bits) number 47.89 and is placed as double float data along with a double float descriptor into the CVIP.

10. ~sound:Type=N,Size=X:xxxxxxxxxx . . .

The above is a stylized representation of in-line sound data an appropriate descriptor followed by the data is appended onto the CVIP.

11. ~!record sound

The above is a command form, in this case it records sound from the current sound-in channel—an appropriate descriptor followed by the recorded data is appended onto the CVIP.

12. ~!!request room lights to be turned on now

The above is a meta-command form, in this case to a human operator nothing is placed onto the CVIP.

13. ~!!!this is a comment

The above is a comment form nothing is placed onto the CVIP.

14. ~cellA

The above is an invoke of cellA the result of invoking cellA (its CV) is returned as the newest part of the CVIP for the invoking cell.

15. ~~~filePath

The above is a deferred reference to file found at filePath an appropriate descriptor followed by the data (file path) is appended onto the CVIP.

B. Multiple Output Section Element Single Statement Examples, Including Element Operators (all these forms incrementally concatenate onto the CVIP as each element is processed and then transition from CVIP to CV upon execution of the last element)

16. ~(cellA+5)*cellB

The above is a simple algebraic equation involving invoking cellA and cellB—depending on what cellA and cellB returns, extensible integer or double floating math will be performed, intermediate results make up the CVIP and the result becomes the CV.

17. here is text from a file~~filePath>>>cellC

The above form concatenates two forms of elements, turns them into the CV, and stores them into the cell identified by the filing tree headed by cellC (which may consist only of cellC).

18. ~$$it+cellC

The above concatenates the CV ($$IT) with whatever is returned by invoking cellC, and makes that combination the new CV.

19. please input 1 for birds 2 for mammals to return to the previous menu to exit

~sound:Type=mulaw,Size=64192:xxxxxxxxxx . . .

The above concatenates the multi-line text (a GUI prompt) with a sound that verbalizes the same text (about 8 seconds worth). This is a multi-media example, where if evoked, the text is set asynchronously to the GUI, while the sound is also sent asynchronously to the sound-out channel and if invoked the pair constitutes the invoked cell's CV and is returned to the invoker as the newest part of the invokers CVIP (but not output at this stage).

20. make this the current value, but don't output:;

The above uses the suppression operator (":;"), so regardless if evoked or invoked, nothing is output, the above just becomes the new CV.

C. An Output Section Multi-Statement Multi-Media Example (All multi-statement forms incrementally concatenate onto the CVIP as each element is processed and then transition from CVIP to CV upon execution of the last element of a statement. Each statement is syntactically separated by ";". The element always has an implied ";", meaning it specifies a last statement if not part of another statement)

21. ~sound:Type=mulaw,Size=18900:xxxxxxxxxx . . .

Please record your message for ~getUserName; !touch-tone mode get 1; !record sound>>>cellB The above first statement's first element places sound into the CVIP that voices the text that follows, minus the user name. The second element makes text "Please record your message for" the next element of the CVIP. Then the third element invokes ~getUserName to return the text for the user's name plus the sound pronunciation of the users name and appends both of those to the CVIP. The ";" terminates the statement, consuming the previous CV, turning the CVIP into the new CV, and causing the CV to be output to the GUI, and also concurrently outputs the corresponding two speech sound elements to the sound out device as well as sending the two text elements to the GUI (these constitute a single statement). The user sees (if on a workstation with GUI): "Please record your message for Dorothy." and hears the same (if by the workstation speaker or on the phone). The second statement prepares a touch-tone controller to allow a single touch-tone to terminate the recording if by phone, or a button click if by microphone/GUI on workstation. The third statement records sound from the sound device (typically workstation microphone, or phone) into the identified target cell as returned by a file tree look-up by invoking cellB, the sound is terminated by a touch-tone, or a button-click on a GUI, or by silence at the end after a settable amount of time if the user is passive/absent).

6. Partial Redundancy

A clump, being a binary image in a virtual address space, can be copied identically into another virtual space with the same address range, or the binary image can be stored on various mass storage media along with address range information sufficient to read it back into a virtual space with the correct range. (This image copying is an alternative to the storage or transmission of the clump translated into lineal code, discussed in Appendix A.) Thus the image of a clump from any given period of time may be preserved, as a record of the clump prior to changes ensuing in the succeeding period.

It may in many cases be desirable to maintain multiple standing copies of a clump on the same or related equipment. Such related clump images are referred to as alpha-clump, beta-clump, gamma-clump, etc. For example, one may wish to preserve an image of a clump from a certain moment in time (say, gamma), while a second image (alpha) is active and undergoing changes for a specified time interval, at the end of which a third image (beta) is copied from alpha and becomes active, while alpha is checked for coherency, and if coherent is exchanged with gamma, so that gamma is available to become active in the following time interval. During such sequences, the several images of the clump are partially redundant with one another.

Other instances of partial redundancy arise when a network structure, such as a "database", is distributed over multiple node equipment in different locations, such that the clumps at the various locations are "parallel", but not identical. For example, the clumps resident in different locations, though distinct, may be partially redundant, as for example they may contain the same general outline of information, but with greater detail filled in for each location to which it especially pertains. For another example, a change may be recorded first in one location, and then distributed to and copied into the others; or, information recorded in the same cellular network position in one location may be different from the corresponding information in another location. As a general method of implementation, annotation can be made in each cell for partial redundancy, and the class thereof, using symbolic reference to other clumps. Some useful classes of partial redundancy are:

(1) The full detail is found in a parallel clump in the specified location.

(2) This is the "master" representation; any time it changes, update the parallel representations elsewhere in the specified locations.

(3) This is a "slave" representation; do not modify except in response to the "master" in the specified location.

(4) This is a "slave" representation; do not modify except, as it may be "stale", after a certain time, check with and re-conform to the "master" in the specified location.

(5) Keep this current; if it changes update all parallel representations in the specified locations.

(6) This is local information; other representations in the specified locations may differ in this regard.

Methods analogous to those employed in under-specification (discussed below) may readily be employed to extend the scope of partial redundancy to cover relationship structures in addition to literal data contents.

7. Under-Specification & Deferred Resolution

Cells or parts of cells may be under-specified in anticipation of deferred resolution of the specifics. Under-specification produces a method for providing "variables" not limited to variable contents, but also encompassing variable relationships or unknown structures. Under-specified elements can be keyed as to a future time or event that will trigger resolution of the ambiguity by eliciting the missing information from a suitable source. Triggering events may be ranked by degree of temporizing, such as: 1) before concluding the current session of cell-building by an operator or programming agent; 2) at the beginning of the next operator-controlled session of cell-building; 3) before introducing a processionist into the clump, network of cells, or region thereof; 4) upon an operator issuing or a processionist encountering a specific command to resolve the ambiguity; 5) upon the detection of the ambiguity by a branch-following or tree-climbing operation searching through the cellular network; and 6) at such time as the ambiguity is encountered by a processionist—as for example if and when the branch selection mechanism (such as the branch evaluator) directs a processionist onto a branch that is not yet completely specified as to its destination.

Some simple network elements suitable for under-specification include:

(1) output contents, (2) a branch to an unspecified but preexisting cell (consequently the branch being necessarily an ordinary branch);

(3) an ordinary branch to a not-yet-existing cell;

(4) a super branch to a not-yet-existing cell;

(5) an ordinary branch to a not-yet-existing cell that will eventually branch to a specified existing cell;

(6) a super branch to a not-yet-existing cell that will eventually branch to a specified existing cell, with that final branch being distinguished as either (a) a super branch or (b) an ordinary branch.

(7) a series of branches and cells, as in 5 & 6 respectively, including a total of N cells;

(8) a series of branches and cells, as in 3 & 4 respectively, including a total of M cells;

(9) a group of interconnected cells situated as the cells in 3 & 4 respectively, with a specified or unspecified number of cells comprising the group;

(10) a group of interconnected cells situated as the series of branches and cells, as in 7, with a specified or unspecified number of cells comprising the group (the group therefore filling a gap between two specified points);

(11) a group of cells as in 10, but filling the gap from a specified starting point, to multiple specified points;

(12) a cell or group as above, the cell or group being modeled on an existing cell or group of cells, or on a specified structural formula.

As illustrative examples from which the other solutions may be readily inferred, we consider "triggering event" case (F), which is the—"worst case," in connection respectively with "elements" (2), (3), and (6) above.

Element (2)—The under-specification is structured as an ordinary branch from a cell to a special cell called $unspecified 1508 (common to all such instances) which activates a cell builder interface set up to elicit from the operator (programming agent or user) the identity of the actual target cell selected from among existing cells. Upon the triggering event, i.e, the branch being taken to $unspecified, the missing information is elicited by the cell builder in dialogue with the user or programming agent, the branch is updated accordingly to point to the actual target cell, and the processionist that took the branch to $unspecified 1508 is then re-directed there. (Note that any value carried by the processionist to the triggering event is preserved to arrive at the completed destination.)

Element (3)—The under-specification is structured as an ordinary branch from a cell to an individual cell called a "dummy" cell whose characteristics are designated as not-yet-specified, except that it is located in the space of a special cell which is provided as the common superspace of all such dummy cells of this kind. The dummy is set to activate a cell builder. Upon the triggering event, i.e, the branch being taken to the particular dummy cell, the missing information is elicited, the characteristics of the dummy are filled in accordingly including movement of the cell to an appropriate location and naming of the cell, and the processionist that took the branch to the dummy is then re-directed there, evoking the completed cell.

Element (6) with that final branch being a super branch—This refers to a situation where a cell "A" has at least one existing fully-specified subspace cell "B", but the path from the cell "A" to the subspace cell "B" is incomplete due to the interposition of an under specified intermediary cell that is (destined to be) the immediate subspace of cell "A" and the immediate superspace of "B". The under-specification is structured as a subspace branch to an individual cell called a "bridge" cell whose characteristics are designated as not-yet-specified except that a super branch to "B" is present in the branch table, the backward recession branch points to cell "A", and it is pointed to by an ordinary branch from a special anchor cell. The bridge is set to activate a cell builder. Upon the triggering event, i.e., the branch being taken to the particular bridge cell, the missing information is elicited, the characteristics of the bridge are filled in accordingly including naming of the cell, and the branch from the special anchor cell is eliminated. The processionist that took the branch to the bridge is then re-directed to the entry zone of the completed cell, thereby evoking it.

It should be further noted that in all cases of under-specification of cells, the cells may be marked with restrictions as to which particular characteristics of a cell are to be elicited and filled in, and which alternate specialized versions of the cell builder and linker are to be utilized in order to elicit only the particularly desired specifications in the appropriate context, as well as selected characteristics that are prespecified so that they do not need to be elicited by the cell builder and linker.

Another form of deferred resolution is the specification in items of the branch table of symbolic references to a cell's paths, rather than virtual locations, for cells believed to exist in the same clump. Since a path may be ambiguous (as opposed to a full path from $Anchor), or a cell may have moved between the time of the under-specification and the time of the resolution, deferred resolution entails the activation of a cell finder (see Appendix B) that will either resolve the reference into a virtual location, or else report an ambiguous result to the programming agent for interactive resolution. A similar sequence ensues when a path is specified, or a path is left to be computed as a text string, for use as a referent for invocation (i.e, from the output section of a cell), and the path turns out to be ambiguous or to refer to a cell that has moved.

8. Cloning and Inheritance

Cloning refers to the copying of a cell or interconnected group of cells so that the copies differ only by their location in the cellular network. Variation may additionally be introduced in the process of cell reproduction, according to specified rules, Reproduction of an individual cell may be accomplished in an automated and repetitious process, generating series of cells with certain consistent relations among generations in the series. In one form of copying, the copy is attached to a branch from the prototype. For example, iteration of a copy operation on the current cell may be used to generate a series of successive subspace cells ("vertical" cloning), or a rank of siblings ("horizontal" cloning). If variation is introduced, the variation may be from the original cell, or from the most recent varied copy in the sequence, or especially for sibling generation it may be from the superspace cell of the original cell.

Generation of a sequence of cells may proceed with specification at each iteration of variation by an interactive programming agent, or in step with the full interactive specification of individual cells, each connected by a branch with the cell iteratively generated on each step.

Copying of a group of interconnected cells may proceed with or without variation introduced at the step of copying each cell, either by rule or from specification by an interactive programming agent, or using another cell as a model.

9. Exemplary Network Utilities

A variety of network utilities may be implemented using the techniques described above to help maintain the network. A common set of elementary cell-building activities provide for modifying a cell by interactive use of a cell builder and linker control panel or agent interface, or by embedded commands in the output section of another cell, or as the implicit result of storage to the cell by a storage operation embedded in the output section of another cell. These actions involve various subsets of the full set of activities which comprise all the operations necessary to build a cell in the most general case and connect it to the network of cells. The inverse of certain activities must also be provided for—for example, the deletion of a branch or of a cell. More operationally complex but conceptually simple activities may be composed—for example, moving a cell with respect to its network position, or deleting a cell with a reasonable disposition of all branches pointing at it.

Individual cells are not fully "re-entrant" in the first embodiment to the extent they may have protected state and the locking mechanism is applied for that purpose; however, the network and most identifiable domains and regions of it are preferably re-entrant. This reentrancy is consistent with the general capacity for concurrent activity, according to which multiple processionist may from-time-to-time be inserted or engendered at various points in the cellular network, and similarly extracted (or extinguished), at various times.

Any operation on a cell by activities prescribed or implied in its own output section is likely to result in paradoxes or discontinuities, except in special cases identified by exact analysis in view of the details of a particular implementation and cell specialization. (Example: a cell contains a storage operation referencing itself, or invokes a cell that contains a command that attempts to modify it.) Most such potential errors, or at least their destructive consequences, are precluded by the system of cell locks implemented. Wasteful or nonterminating behavior is an inherent potential of a system having the flexibility allowed by the first embodiment of the present invention; detecting and proscribing or terminating it must be left to specialized tools suited to each particular context in which the behavior is undesirable, in order to allow flexibility in other situations.

A lucid view of and operation on the network of cells is provided for by special tools, various adequate sets of which may be provided as required in each particular implementation. It should be noted that a clump is independent of these tools and viewers, which attach to it and to particular cells within it as needed to accomplish their immediate mission, communicating and coordinating with other tools concurrently active. These tools may include:

1. A cell builder and linker, and various specializations of it, each existing in as many multiple copies as convenient.

2. Cell viewers and controls of the cell builder and linker, including a graphical user interface ("GUI") available in various specializations (cell builder and linker control panels), a command line interface ("CLI"). and incremental activity interfaces ("IAI") subserving explicit commands and implicit operations that modify cells. The GUI and CLI are best implemented as compositions from among the set of elementary operations directable through the IAI, which may form the basis for an automated programming agent interface.

3. A cell finder (see Appendix B)

4. A cell (network) browser, providing a tree-like view of the cellular network by following super branches, while indicating, and capability of optionally following, ordinary branches as well.

5. A back-link viewer capable of listing which cells have branches to a particular cell.

6. A cell mover, capable of changing the network position of a cell.

7. A cell deletion tool, capable of resolving resulting disconnections.

8. A session control, capable of insertion and extraction of processionists, and providing a default channel for standard input and output.

9. An input and output route establishing and re-directing control.

10. A clump monitor and control unit, governing the allocation of system resources among processionists and cells, mapping the resultant configurations, and providing for periodic clump clean-up activities (such as de-husking, described above; resource recovery and recycling).

11. A network monitor and control unit, governing interaction with clumps on other equipments augmenting or extending the cellular network.

12. An interface to the other resources and capabilities of host equipment, including appropriate versions of CLI or GUI associated with or incorporated in each of the above.

13. Translators that depict a cell, or cellular network or domain or region thereof, in various pictorial representations or lineal descriptions. Reverse translators for certain of these representations (such as the lineal code), as well as modelers of incremental changes that translate a change in a representation into the corresponding change in the cellular network, and vice versa.

Appendix A

Lineal Code and Lineal Translation Rules

A clump or any portion thereof comprising several cells pointing at for evoking or invoking one another can be translated unambiguously into a lineal representational form which may be transmitted as a string of symbols, and may subsequently be used to specify the re-creation of the configuration of cells that it represents. As a consequence, a configuration may be specified de novo in this form and then used to direct the construction of the configuration in an automated manner. For example, such a representational string may be placed in the output section of a cell as the only contents thereof, and then syntactic parsing or other interpretation thereof, upon initiation by the operator or a command residing in another cell evoked or invoked, produces a sequence of directions to the cell builder to build and interconnect the cells as specified in the string.

In addition to construction of a cellular configuration from the lineal sequence, it is possible to use it to generate specialized and optimized programs in conventional programming forms, such as machine language, provided appropriate explicit restrictions are observed. For example, a cellular configuration could be formed and tested to behave in a desired way. If the cellular form should no longer be required, and the priority shifts to economy and speed, the cellar configuration would be translated into lineal code, and that in turn translated into a machine language program by an appropriate compiler program, sacrificing in the process the degrees of freedom and complexity not deemed necessary to the final behavior. Alternately, the lineal sequence itself could be interpreted by an appropriate interpreter program to emulate the behavior of the corresponding cellular configuration under stated boundary conditions.

The choice of particular symbols may be arbitrary provided the essential forms are adhered to, but for the sake of illustration we employ a selection of characters from the 7-bit ASCII code, some of which individually or in sequence are assigned special roles.

Let "{N O S R}" represent a cell. This form is referred to as the "space" of the cell. The space of a cell gives the specification of the cell including its components. The letters N, O, S, R here label the places where components may be specified. [The characters "{" and "}" are referred to as left-brace and right-brace respectively].

In the place N put the cell's name, followed by any list of peculiarities, such as modulators of the cell, activation controls and hardware discriminators, and modulators of the super branch to this cell; all separated from the name and one another by commas; the whole sequence delimited by a semicolon (in event it is non-blank and in case something is specified following in the O place). A name may be composed of any sequence of characters except left brace, right brace, semicolon, colon or comma, although other restrictions may be applied for ease of referring to names in contexts where certain characters have conventional meanings as operators or conjunctions among names. (The cell's name may be blank, indicated by white space immediately following the brace.)

In the place O put the contents of the output section (understood as beginning with the first non-white character past N). Unless beginning with tilde or underscore, this is taken as literal text comprising the first or only output item, up until the occurrence of a tilde or an unpaired right brace; otherwise or subsequent to that tilde, take the text to represent one or a sequence of items of output; finally terminate the O place with a tilde or semicolon. If beginning with a quote mark, the literal (called a "super quote") is taken as continuing until the occurrence of an unpaired right brace construed as delimiting both the O place and the entire space of the cell, thus excluding the S and R places. Also, the O place may be empty, in which case the cell's name, or its fill path from the anchor, will be used as the output. Or, if the O is not empty, it may be specified as blank, in which case the cell will yield no output. The code for blank output is ~;

In the place S let stand any sequence of other spaces, representing cells that are subspace cells of the cell, and any pseudo-spaces of the cell, representing branches to cells other than super branches.

The form of a subspace is {T} and represents a branch to a cell whose template stands in place T. It follows recursively that a subspace may enclose its own subspaces, which in turn enclose their own subspaces, ad infinitum, as well as other spaces (pseudo-spaces) at each depth.

A subspace corresponds to the super branch to the subspace cell. (Append a carrot ^ to the name to indicate a "stray" subspace, as previously defined.)

The form of an ordinary branch is {P:C} where P is the place where stands the arbitrary (optional) name of the pseudo-space of the cell, and C is the place where stands the name of the actual cell that the corresponding branch points to, followed by any list of modulators of the branch to this cell, separated from the name and one another by commas. This corresponds to an ordinary branch; substitute two colons for the colon to designate a wild branch as opposed to a tame branch.

(It should be noted that in some implementations, the representation of O and S places may intermix, such that items suitable for O and items suitable for S may appear in interspersed order, without affecting behavior of either section)

In the place R put a list of any convergence and forwarding rules, preferably separated by semicolons or commas. (If none specified, assume "default" rules as in the table of convergence and forwarding rules, previously described.)

Following the right brace of the cell's space, the cell's name may be repeated, delimited by a semicolon if needed for clarity. Hence for the sake of easy comprehensibility both the beginning and end respectively of the specification of a cell may be indicated by the pair:

{cellname;

}cellname;

Absent such double-labeling, the pairs of braces may be matched by working in from both ends of the outermost space, or by the well-known methods of syntactic parsing. An expression in lineal code is interpreted from left to right, ignoring line breaks and expanses of white space not included in literal text. (It should be noted that in such double-labeling inheres the possibility that named spaces may intercross such that nesting of paired braces is frankly inconsistent; this is flagged as an error, unless special rules of interpretation are in effect.)

Let { ... } or { } indicate a space, which may be a subspace or a space that is branched to by an ordinary branch, without indicating the presence or absence of any particular components. Let { }:{ } stand for the spaces of two cells that are coupled, and let { }:{ }:{ }, etc. stand for several coupled cells. (If they are meant to be loosely coupled, substitute two colons for a colon.) Let conditions on the contingent entry of spaces and pseudo-spaces (which translate into conditional branches to cells) be represented by such forms as follow (with the text string being descriptive of the class of things that could fill its place):

?literalTOmatchInput{ } NOTE: lit. cannot begin with ? or contain { unless an escape character "\" is used, such as "\?" or "\{" (where "\\" would be used to represent "\" in the literal string)

?"literalTOmatchInput~{ } NOTE: lit. cannot contain ~ unless used with an escape character ("\~")

?variableTOmatchInput{ } NOTE: variable is in effect a reference to a cell by its name path, or else another implementation-defined "variable."

?~expressionResultingInLiteralTOmatchInput{ } NOTE: contains no relational or logical operators.

?~relationalOrLogicalExpressionResultingInTruthValue{ } NOTE: contains relational or logical operators.

?~=truthFunction{ } NOTE: may be reference to cell by invocation.

If the contingency is exclusive rather than nonexclusive, substitute two question marks for one in the foregoing cases. Note that "?{ }" or "??{ }" or "???{ }" indicate a blocked branch; and "{ }" indicates an unconditional branch (which is inherently a nonexclusive contingency).

While the lineal order {N O S R} was given above as the template for a space and the corresponding cell, it is nevertheless allowable to interpose elements of O and S in the lineal representation of a cell. (Note that behavior in the cell is not altered by such interpositions, nor is the cell structure different except that the interposition index is present in its branch table and is non-zero for the branch corresponding to each interposed unit.) In particular, units of S each comprising an individual space (without any prefixed contingency) may be interposed among the lineal contents of O, either between output items or anywhere within a string of literal text. Similarly, units of S each comprising an individual space with its prefixed contingency, may be interposed among the lineal contents of O, but only between output items (because the lineal expression of a contingency is not distinguishable from literal text, while a space is discernible by its left and right braces which are excluded from literally representable text in the O place except in a super-quote form).

The lineal position in the O place sequence of the interposition of each such interposed unit is represented by the interposition index of the corresponding entry in the branch table (i.e, of the corresponding branch). Thus any interposition present in lineal code may be unambiguously preserved when translated into the construction of a cell, and back again into lineal code. While the interposition index, if present (and non-zero) doesn't affect the behavior in the cell or the particular branch, it is available to serve such purposes as hyper-textual representation. The term "metaline" is used to refer to a version of lineal code that is useful for hyper-textual representation and interactive editing, due to the utilization of the (optional) interposition index,. as well as other specializations.

Additional interposition indices associated with cells (if and as specified in a particular implementation) may be utilized to record the intercrossing of named spaces (i.e, overlapping of spaces each of whose paired braces have matching labels), provided appropriate interpretive rules are operative, and within a domain where each pair of matching labels used in this way is unique to one cell. (i.e, cells are uniquely named within the domain.) For example, assuming as in the simplest case that cells have no role except the storing of literal text (segments of which are here represented by 1,2,3), the formula Could be interpreted into three cells individually specified respectively as {x; 1~xy}x;

{y; ~xy"3}y;

{xy; 2}xy;

And relying on the recording of the interposition indices in the resulting cells, the original formula could be re-constructed.

The preferred naming convention for making reference to a particular cell is the dotted path notation, for global or relative reference, or simply the cell name, for local reference described above. In addition, parts of the O (i.e, "output") place of a space may be distinguished as individual operands within the cell, here called x, for example:

x[j] the j-th item in cell x, whose O is a data structure x.[j] the j-th character or byte x.[j.k] the k-th bit of j-th byte x.[ ] the descriptors of cell x (see cell types, following)

x[l [m [n] v]w] the O of cell x treated as a 3-D array of items whose size and data type is specified in the cell's descriptors.

Privileged users, operators and agents may make use of the following (and similar) forms of reference to directly inspect specific regions of the virtual address space of a clump:

[j] location j in the virtual address space of the clump

[j..l] locations j thru l

[i, j, k] location j only if j falls between bounds i and k.

Elements of the lineal code, including those enumerated above, may conveniently be utilized to specify or direct the building of an individual cell by a cell builder and linker, or be used by a cell builder and linker (or an interpretive display program) to display characteristics of a cell for viewing by a user, and for prospective editing resulting in modification of the cell.

Cells may also be automatically converted into a lineal code representation. If the configuration to linearize is less than the entire clump, the full path is given from $Anchor to the cell where linearization is to commence. (If the linearization is to encompass less than all subspace cells of that cell, then the limits must also be specified.) Linearization from the selected point may proceed "depth-first" or "breadth-first," following super branches from cell to cell until every cell in the designated region has been processed into its lineal representation.

Depth-first linearization results in a nested expression of recursively paired braces bearing the cell names, with the spaces representing each subspace cell inside the spaces representing the corresponding superspace cell in every case, there beside any spaces representing branches to other than subspace cells. Within each space, subspaces and other spaces are arranged in the order corresponding to the order of branches to the respective subspace cells and other cells in the branch table of the cell represented by the space. Appendix C shows an example of the kind of lineal code resulting from this procedure.

Breadth-first linearization results in a list of lineal representations of individual cells, every cell represented by an entry of the form: The full path to the cell as a dotted sequence of cell names (following only super branches); followed by the cell represented as in depth-first (above) except that every subspace contains, in place of the representation of the subspace cell, the full path to it. Note that invoking references to cells (from the output section or from branch conditionals) include all branch positions in the full path to disambiguate cases where siblings along the path are identically named (i.e, .[1]a.[4]b.[9]c).

With either kind of linearization, the other attributes and components of a cell are represented, according to the {N O S R} template, between the braces, to the left of the S place and to the right of the S place—the S place being the position of representations of any subspaces and pseudo-spaces.

Appendix B

The Cell Finder

The Cell Finder receives a string specifying a dotted path, and then provides the addresses (beginning of the virtual locations) of any and all cells identified by the path. The path may be specified as definitive, relative, ambiguous, or general.

A definitive specification provides the exact path from a known point of reference, such as $Anchor, and results in a global identification of a unique cell. (Such path begins with a dot, if from $Anchor or an implicitly specified substitute within a specified domain; or with a notation of an explicit point of reference.)

A relative specification is made from the point of reference of a particular cell when and where the reference originates. (Such path begins with a cell name to be sought in a subspace, superspace or co-spatial of the reference point cell; the depth, inward or outward, is specified as a positive or negative integer, or defaults to limit the search for the beginning of the path to being a co-spatial or +1.) Depending on circumstance, the specification may in effect be definitive or ambiguous.

An ambiguous specification is one that can yield more than a single definitive result, when only a single result is sought. Thus further discrimination or interactive resolution of the ambiguity is required based on selection among the alternatives presented by the cell Finder.

A general specification is one intended to yield one or more results. The ellipsis—two (preferably three) or more dots at the beginning of a path string indicate that the search may start anywhere (in subspaces of the cell designated $Anchor).

An ellipsis in the midst of a path string (i.e., between two cell names) indicated that any sequence may intervene between those two named points along the path; or the number of allowable intervening cells may be restricted by such notation as "../5/..".

An ellipsis at the end of a path string (i.e, after the last of the cell names) indicates that any sequence may be followed past the last named point along the path, and thus provides a general specification.

Combining the two methods of specification in lineal code, described above, can be used to specify a part of the network, as for example: ".a.b.c{x}{y{z..}}}" designating the creation of the space of x and its subspaces (y, z, etc.) at the definitive preexisting point of global reference a.b.c, or ". . . {x . . . }" designating a space x (and whatever subspaces, etc.) whose network position is not yet specified, so that it could potentially be installed anywhere at a later time. (As a relocatable element, this may be implemented as initially connected in the clump by a branch from $Unspecified.)

Appendix C

Notes on Implementation and Lineal Code of Branch Evaluator

The branch evaluator is present in each cell that requires branch selection, or alternately exists as referenced shared code, of which there may be any number of copies present serving a group of cells (one copy is most efficient for current computer architectures). To be efficiently shared, the object code should be re-entrant. The lineal code expressing the branch evaluator algorithm is preferably interpreted into machine language for specialized, optimal performance, although it literally corresponds to cells. The branch evaluator if itself a serial algorithm, is worked by only one processor (or thread) for each traversing processionist. Note that multiple concurrent traversing processionists may share the BE without interference. Access is provided to additional processors as needed to be "dispatched" via pointers in the branch table. (As a consequence, the branch evaluator itself could in principle be implemented by a group of cells, with their branch selection subserved by a simpler "branch evaluator" that handles only bifurcations.)

In summary, the branch evaluator can be understood as follows: It may be part of a cell. It operates on the branch table of that cell. It can effect the evocation of other cells (or of the cell of which it is a part). The branch evaluator itself is expressed in the following algorithm in a lineal form that represents a group of interconnected cells.

Variables

Branch table branch ("item") number indices: C=currently considered branch, N=next, F=forward check for presence of TRUE exclusive. The advance of C and N are coordinated so as to assure that parallelism is available to select multiple branches when appropriate; before dispatching a processor on a branch, F steps ahead of N to check for the presence of a TRUE exclusive conditional that would preempt all other branches before it (i.e, those indexed by C and N), as well as any after it in the branch table. B is the total number of branches ("items") in the branch table Analysis of Initial Conditions B=0, as long as this is not a "storage only" type cell (which has no branch table), branch evaluator can handle its Forward branch table, but is not actually needed.

B=1, on first pass of C loop, will go via RESULT 1 or GAMMA, so in other respects it's treated the same as B>=2. (For the B=0 or 1 use of specialized versions of branch evaluator could achieve greater speed and economy; so also with various other special cases of particular collections of branch types.)

B>=2, is the normal case.

Tests, prefixed with ?? and meta-commands, beginning with !! are elaborated below. Comments, as opposed to commands or meta-commands, begin with !!!. Simple commands begin with "!" but the only one utilized here is an instruction to increment a number. (i.e, increment, x).

All contingencies are exclusive. {?? conforms with lineal code conventions for exclusives. (The exclusive behavior is also forced here by the fact that the processionist is restricted to being singular, so no divergence—i.e, parallel branching—is possible within the branch evaluator itself.) Stated conditions on contingent branches are functions of truth value, which could be implemented as cells invoked, although only the meaning of the test and not its implementation is specified here. A result with the value TRUE allows the branch to be taken, and thus the corresponding space entered and evoked. Cell (space) names are taken as global within the scope of the algorithm.

Note that a cellFrame has been established previously upon entry to the cell. This cellFrame is used by the processionist for the cell during the branch evaluator's execution as a scratchpad for the branch evaluator's variables (C, N, F, etc.) and allows the branch evaluator to be used reentrantly.

The following illustrates the branch evaluator algorithm using a lineal code representation:

```
{Branch evaluator; ~!!!start here;
    {initialize; ~1>>>C; 2>>>N; 0>>>F;
        ??~=end C {Done;~!!gototheexitzoneofthecell; !!!because no branching;}
        {C Loop; ~!!!consider the Cth item;
            ??~=Blocked C{C False Result 2; ~!increment, C; C + 1>>>N;
                ??~=end C {:Done}
                    {:C Loop}
            }C False Result 2;
            ??~=Unconditional C{:X}
            {C Test;~!!computetheconditionalforCthitem;
                ??~=True C{C True;
                    ??~=Exclusive C{Result 3;~??dispatchleadprocessoronbranchC}
                    {X;
                        ??~=end N{:Result 3; ~!!!because C + 1 spot is empty,seegamma}
                        {Y; ~!!consider the Nth item;
                            ??=Blocked N{N False Result 5; ~!increment, N;
                                ??~=end N {:Result 3}
                                { :N Loop} !!!*now in spread mode;
                            }N False Result 5;
                            ??~=Unconditional N {N True; ~!!!consider the Nth item;
                                ??~=Exclusive N{Result 4; ~!increment, C; {:Result 3}
                                {Result 1; {:two OK} }
                            }N True;
                            {N Test; ~!!computetheconditionalforNthitem;
                                ??~=True N{:N True}
                                {:N False Result 5]
                            }N Test;
                        }Y;
                    }X;
                }C True;
                {:C False Result 2}
            }C Test;
        }C Loop;
    }initialize;
    ?{N Loop; ~!!!consider the Nth item;
        ??~=Blocked N{Result 7; ~!increment, N;
            ??~=end N {:Result 3}
            {:N Loop}
        }Result 7;
        ??~=Unconditional N{N True Spread; ~!!!consider the Nth item;
            ??~=Exclusive N{Result 6; ~N>>>C; {:Result 3}
            }
            {Result 8; {:two OK}
                ~!!!knowing both C&N are true & non-exclusive;
                !!! + spread mode will end at "lead processor continues";
            }Result 8;
        }N True Spread;
```

-continued

```
            {N Test Inner; ~!!computetheconditionalforNthitem;
                    !!~=True N{:N True Spread}
                    {:Result 7}
            }N Test Inner;
    }N Loop;
    !!![the following is evoked from results 1 and 8]
    ?{two OK; ~!!! look out for true exclusives ahead before you request'p;
        ??~F=1 {:request processor, ~!!!because test was previously passed)
        {check ahead; ~N + 1>>>F;
            ??~=end F{:request processor}
            {check F; ~!!!consider the Fth item;
                ??~=exclusive F{F is exclusive; ~!!computetheconditionalforFthitem;
                    ??~+True F{ ~F>>>C; {:result 3; ~!!!lead'p will take Fth branch} }
                    {:skip it}
                }F is exclusive;
                {skip it; ~F + 1>>>F;
                    ??~=end F{ ~1>>>F; {:request processor} }
                {:check F}
            }skip it;
        }check F;
    }check ahead;
}two OK;
?{request processor; ~!!attempttodispatchaprocessoronbranchC;
    ??~=Failure{failure; ~!!! <2 processors are available, so consider serializing;
                    !!testifCthbranchpointstoas'scellofthecurrentcell;
            ??~=No{warning; Path not taken because <2 processors.~
                    {:lead processor continues} }
            {serialize; ~!!!Yes, Cth item is an implicit inner branch, so. . .;
                !!performserializationoperationoncellpointedtobyCthbranch;
                !!dispatchleadprocessoronbranchC; !!!i.e., to that cell;
                !!!and it will eventually come back to this point . . .;
                {here: ~!! restore cellFrame;
                        {:lead processor continue}}
            }serialize;
    }failure;
    {success;
            {lead processor continues; ~N>>>C; C + 1>>>N;
                ?end N{:Result 3}
                {:C Loop}
            }lead processor continues;
    }success;
}request processor;
}Branch evaluator;
```

In the following, expressions such as "C is true" mean that the contingency associated with the branch numbered C in the branch table of the cell currently running the branch evaluator has evaluated to TRUE in the existential situation.

(1) C is true & nonexclusive OR is unconditional, AND N is also that way, IMPLIES:

Attempt to dispatch a new processor on branch C; then advance (i.e. move ahead) both indices C and N and continue the main procession through the branch table (i.e, C loop), unless at the end, in which case lead processor takes it (and were done).

(But before requesting a new processor, TWO OK must check that there are not any true exclusives ahead by advancing index F ahead of N until F reaches the end of the branch table.)

Special Cases

If F hits a true exclusive, lead processor goes out that branch (and we're done with branch selection, and finished running the branch evaluator).

If a new processor is not available, we try to serialize, but if we can't then we post a warning notification and skip branch C altogether, advancing C and N, and continue the main procession through the branch table (i.e, C loop).

But if we find we can serialize, we do so by performing the serialize operation which does a one-shot modification to the cell pointed to by branch C, such that when reaching its exit the processor will come back to the point where it left off. Having accomplished the serialize operation, send the lead processor down branch C, knowing it will come back and continue the work of the lead processor in the branch evaluator.

(2) C is false OR blocked, IMPLIES move ahead.

(3) C true AND exclusive, IMPLIES lead processor take branch indicated by value of index C; therefore finished with this cell.

(4) C true or unconditional, AND, N true & exclusive, IMPLIES skip branch C and then lead processor take branch N—i.e, move ahead and then do as in (3).

(5) C is true & nonexclusive OR is unconditional, AND, N is false OR blocked, IMPLIES:

Skip N (i.e, advance N, leaving C as it was) thus entering "spread mode" which considers (6, 7, 8), already knowing that the Cth item is TRUE.

(6) New N is true & exclusive, IMPLIES "forget about Cth branch" (i.e, put the value of N into C), then do as in (3).

(7) New N is false or blocked, IMPLIES "skip Nth branch". i.e, increase the spread by incrementing N, and then continue looping in spread mode.

(8) New N is true or unconditional, IMPLIES (leaving "spread mode") do same as (1), i.e, attempt to dispatch a new processor on branch C, etc.

(*) "now in spread mode" means N is diverging ahead of C+1 position.

(+) "spread mode will end . . . " means N resumes C+1 position after it goes, via TWO OK, through "request processor" to "lead processor continues" where N>>>C and C+1>>>N.

Definitions of tests and meta-commands in the branch evaluator:

| The test . . . | is TRUE if . . . |
|---|---|
| endC | C is greater than the number of branches in the forward branch table. |
| Blocked C | Branch number C is designated "blocked". |
| Unconditional C | Branch number C is designated "unconditional". |
| Exclusive C | Branch number C is designated "exclusive conditional". |
| True C | The contigency on branch number C evaluated TRUE. |
| endN | N is greater than the number of branches in the forward branch table. |
| Blocked N | Branch number N is designated "blocked". |
| Unconditional N | Branch number N is designated "unconditional". |
| Exclusive N | Branch number N is designated "exclusive conditional". |
| True N | The contingency on branch number N evaluated TRUE. |
| endF | F is greater than the number of branches in the B'T. |
| Exclusive F | Branch number F is designated "exclusive conditional". |
| True F | The contingency on branch number F evaluated TRUE. |
| Failure | No more processors were available to the branch evaluator. |
| No | The test, if Cth branch points to a subspace cell of the current cell, did not produce a TRUE result. |
| ??~F = 1 | --is an example of an explicit comparison conditional. |
| ?{Two OK; | --this and similar cases represent a blocked space, indicating entry to it can only occur by reference to the enclosed cell name. (Blocked spaces in the branch evaluator are entered by evocation only, using an ordinary branch.) |
| | --the "tilde" character is used to indicate that what follows is not literal material, as would be assumed in the particular context, but rather operational material such as a command, meta-command, comment, operation, expression, name, etc. |

A meta-command like compute the conditional for Cth item computes, considering the existential situation, the conditional expression corresponding to branch number C at that moment. A subsequent True C test or True N test or True F test, reports the result of the corresponding computation as TRUE or else. The computation uses the individual conditional computing code module for the branch, which is reached via a relative address occupying the conditional computing code field of the item corresponding to the respectively C, N or F position in the branch table. (A conditional computing code section was installed at cell assembly time for each exclusive or nonexclusive conditional contingency). The computation also checks modulators associated with the particular branch, if any are, and forces a non-TRUE result if one of them is active.

The respective "end" tests report TRUE or else whether the respective index C or N or F is past the end of the branch table. The other tests simply look at the descriptors of the branch table item respectively indexed by C or N or F, and report TRUE or else according to whether the particular branch's type matches (i.e, Blocked, Unconditional, Exclusive).

The Failure test, and REQUEST PROCESSOR. The meta-command "!!attempt to dispatch a processor on branch C" checks to see that there are (preferably at least TWO more) processors available, before it allocates ONE of them to branch number C and dispatches it on that branch. !!Failure reports TRUE if <2 were available, in which case no action was taken.

The No test reports TRUE if the meta-command "?? test if Cth branch points to a subspace cell of the current cell" finds that branch C is not an subspace path, according to the descriptors of the item number C in the branch table.

"{Done; −! !go to the exit zone of the cell; . . . } Indicates the branch evaluator is through with branch evaluation for this cell, so processionist ("processor") continues on to exit zone of this cell, there having been no branches selected.

"{Result 3; −? ?dispatch lead processor on branch C}"— Indicates taking the unique or final branch by the lead processor, so finished with branching for the this cell.

The foregoing description is presented to enable any person skilled in the art to make nd use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

What is claimed is:

1. A cell-based computation and communications system comprising:

a memory system;

a cell network defined within the memory system, the cell network including a plurality of cells, each cell being associated with instructions defining the behavior of the cell;

the cell network including a plurality of linking cells defining structural links within the cell network, each linking cell having a plurality of forward link references to respective forward linked cells and a recession link reference to a respective recession linked cell; and a processing system to process instructions within the cell network which is capable of selectively processing instructions associated with different cells in parallel;

wherein the cell network includes instructions for engendering parallel processing in conjunction with following at least some of the forward link references and instructions for controlling convergence of parallel processing in conjunction with following at least some of the recession link references; and wherein each of the recession link references is defined as part of the structure of the cell network and is established separately from following the forward link references.

2. The system of claim 1 wherein a plurality of respective cells within the cell network are capable of being activated through following forward link references by both (i) an evocation wherein a recession link reference associated with the respective cell is followed upon completion of the activities directed by the respective cell; and (ii) an invocation wherein a return address is provided in connection with activating the respective cell and the return address is followed upon completion of the activities directed by the respective cell.

3. The system of claim 1 wherein the plurality of forward link references in at least some of the linking cells include conditional forward link references which are followed only when an associated condition is satisfied; and wherein the conditional forward link references in at least some of the linking cells include both (i) a non-exclusive conditional forward link reference which is capable of being followed in parallel with other forward link references in the same cell; and (ii) an exclusive conditional forward link reference which, when followed, is followed to the exclusion of following other forward link references in the same cell in parallel.

4. The system of claim 2 wherein the plurality of forward link references in at least some of the linking cells include conditional forward link references which are followed only when an associated condition is satisfied; and wherein the conditional forward link references in at least some of the linking cells include both (i) a non-exclusive conditional forward link reference which is capable of being followed in parallel with other forward link references in the same cell; and (ii) an exclusive conditional forward link reference which, when followed, is followed to the exclusion of following other forward link references in the same cell in parallel.

5. A cell-based computation and communications system comprising:

a memory system;

a cell network defined within the memory system, the cell network including a plurality of cells, each cell being associated with instructions defining the behavior of the cell;

the cell network including a plurality of linking cells defining links within the cell network, each linking cell having a plurality of forward link references to respective forward linked cells and a recession link reference to a respective recession linked cell; and a processing system to process instructions within the cell network which is capable of selectively processing instructions associated with different cells in parallel;

wherein the cell network includes instructions for engendering parallel processing in conjunction with following at least some of the forward link references and instructions for controlling convergence of the parallel processing in conjunction with following at least some of the recession link references;

wherein a plurality of respective cells within the cell network are capable of being activated through following forward link references by both (i) an evocation wherein a recession link reference associated with the respective cell is followed upon completion of the activities directed by the respective cell; and (ii) an invocation wherein a return address is provided in connection with activating the respective cell and the return address is followed upon completion of the activities directed by the respective cell.

6. The system of claim 5 wherein the plurality of forward link references in at least some of the linking cells include conditional forward link references which are followed only when an associated condition is satisfied; and wherein the conditional forward link references in at least some of the linking cells include both (i) a non-exclusive conditional forward link reference which is capable of being followed in parallel with other forward link references in the same cell; and (ii) an exclusive conditional forward link reference which, when followed, is followed to the exclusion of following other forward link references in the same cell in parallel.

7. A cell-based computation and communications system comprising:

a memory system;

a cell network defined within the memory system, the cell network including a plurality of cells, each cell being associated with instructions defining the behavior of the cell;

the cell network including a plurality of linking cells defining links within the cell network, each linking cell having a plurality of forward link references to respective forward linked cells; and a processing system to process instructions within the cell network which is capable of selectively processing instructions associated with different cells in parallel;

wherein the cell network includes instructions for engendering parallel processing in conjunction with following at least some of the forward link references;

wherein the plurality of forward link references in at least some of the linking cells include conditional forward link references which are followed only when an associated condition is satisfied; and wherein the conditional forward link references in at least some of the linking cells include both (i) a non-exclusive conditional forward link reference which is capable of being followed in parallel with other forward link references in the same cell; and (ii) an exclusive conditional forward link reference which, when followed, is followed to the exclusion of following other forward link references in the same cell in parallel.

8. A method for controlling parallel processing in a cell-based computation and communications system, wherein the system includes a network of cells, each cell being associated with instructions defining the behavior of the cell, the network of cells including a plurality of linking cells defining structural links within the cell network, each linking cell having a plurality of forward link references to respective forward linked cells in the network and a recession link reference to a respective recession linked cell in the network, the method comprising the steps of:

following at least some of the forward link references and at least some of the recession link references in the network of cells;

executing at least some of the instructions associated with the cells referenced by the forward link references and the recession link references which are followed;

engendering parallel processing in conjunction with following at least some of the forward link references in the linking cells;

controlling convergence of the parallel processing in conjunction with following at least some of the recession link references in the linking cells; and establishing the recession link references independently from following the forward link references.

9. The method of claim 8 further comprising the steps of:

providing a plurality of respective cells within the cell network which are capable of being activated through following forward link references by both (i) an evocation wherein a recession link reference associated with the respective cell is followed upon completion of the activities directed by the respective cell; and (ii) an invocation wherein a return address is provided in connection with activating the respective cell and the return address is followed upon completion of the activities directed by the respective cell;

following at least some of the forward link references in the network by evocation; and following at least some of the forward link references in the network by invocation.

10. The method of claim 8 further comprising the steps of:

associating conditions with at least some of the forward link references such that an associated forward link reference is followed only when the corresponding condition is satisfied, wherein the conditions include both exclusive conditions and non-exclusive conditions;

selectively following a forward link reference associated with an exclusive condition to the exclusion of following other forward link references in the same cell in parallel; and selectively following a forward link reference associated with a non-exclusive condition while allowing other forward link references in the same cell to be followed in parallel.

11. The method of claim 9 further comprising the steps of:

associating conditions with at least some of the forward link references such that an associated forward link reference is followed only when the corresponding condition is satisfied, wherein the conditions include both exclusive conditions and non-exclusive conditions;

selectively following a forward link reference associated with an exclusive condition to the exclusion of following other forward link references in the same cell in parallel; and selectively following a forward link reference associated with a non-exclusive condition while allowing other forward link references in the same cell to be followed in parallel.

12. A method for controlling parallel processing in a cell-based computation and communications system, wherein the system includes a network of cells, each cell being associated with instructions defining the behavior of the cell, the network of cells including a plurality of linking cells defining links within the cell network, each linking cell having a plurality of forward link references to respective forward linked cells in the network and a recession link reference to a respective recession linked cell in the network, the method comprising the steps of:

following at least some of the forward link references and at least some of the recession link references in the network of cells;

executing at least some of the instructions associated with the cells referenced by the forward link references and the recession link references which are followed;

providing a plurality of respective cells within the cell network which are capable of being activated through following forward link references by both (i) an evocation wherein a recession link reference associated with the respective cell is followed upon completion of the activities directed by the respective cell; and (ii) an invocation wherein a return address is provided in connection with activating the respective cell and the return address is followed upon completion of the activities directed by the respective cell;

following at least some of the forward link references in the network by evocation;

following at least some of the forward link references in the network by invocation;

engendering parallel processing in conjunction with following at least some of the forward link references; and controlling convergence of the parallel processing in conjunction with following at least some of the recession link references.

13. The method of claim 12 further comprising the steps of:

associating conditions with at least some of the forward link references such that an associated forward link reference is followed only when the corresponding condition is satisfied, wherein the conditions include both exclusive conditions and non-exclusive conditions;

selectively following a forward link reference associated with an exclusive condition to the exclusion of following other forward link references in the same cell in parallel; and selectively following a forward link reference associated with a non-exclusive condition while allowing other forward link references in the same cell to be followed in parallel.

14. A method for controlling parallel processing in a cell-based computation and communications system, wherein the system includes a network of cells, each cell being associated with instructions defining the behavior of the cell, the network of cells including a plurality of linking cells defining links within the cell network, each linking cell having a plurality of forward link references to respective forward linked cells in the network, the method comprising the steps of:

following at least some of the forward link references in the network of cells;

executing at least some of the instructions associated with the cells referenced by the forward link references which are followed;

engendering parallel processing in conjunction with following at least some of the forward link references in the linking cells;

associating conditions with at least some of the forward link references such that an associated forward link reference is followed only when the corresponding condition is satisfied, wherein the conditions include both exclusive conditions and non-exclusive conditions;

selectively following a forward link reference associated with an exclusive condition to the exclusion of following other forward link references in the same cell in parallel; and selectively following a forward link reference associated with a non-exclusive condition while allowing other forward link references in the same cell to be followed in parallel.

* * * * *